(12) United States Patent
Rosson et al.

(10) Patent No.: US 11,187,859 B2
(45) Date of Patent: Nov. 30, 2021

(54) FIBER OPTIC CONNECTORS AND METHODS OF MAKING THE SAME

(71) Applicant: Corning Research & Development Corporation, Corning, NY (US)

(72) Inventors: Joel Christopher Rosson, Hickory, NC (US); Michael Wimmer, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/721,851

(22) Filed: Dec. 19, 2019

(65) Prior Publication Data

US 2020/0124805 A1 Apr. 23, 2020

Related U.S. Application Data

(63) Continuation of application No. PCT/US2018/040130, filed on Jun. 28, 2018, which is a continuation-in-part of application No. 16/018,918, filed on Jun. 26, 2018, now Pat. No. 10,379,298, and a continuation-in-part of application
(Continued)

(51) Int. Cl.
*G02B 6/38* (2006.01)

(52) U.S. Cl.
CPC .......... *G02B 6/3897* (2013.01); *G02B 6/389* (2013.01); *G02B 6/3831* (2013.01); *G02B 6/3849* (2013.01); *G02B 6/3869* (2013.01)

(58) Field of Classification Search
CPC .. G02B 6/3831; G02B 6/3849; G02B 6/3869; G02B 6/389
See application file for complete search history.

(56) References Cited

U.S. PATENT DOCUMENTS

| 3,074,107 A | 1/1963 | Mase et al. |
| 3,532,783 A | 10/1970 | Pusey et al. |

(Continued)

FOREIGN PATENT DOCUMENTS

| CN | 1213783 A | 4/1999 |
| CN | 1231430 A | 10/1999 |

(Continued)

OTHER PUBLICATIONS

Nawata, "Multimode and Single-Mode Fiber Connectors Technology"; IEEE Journal of Quantum Electronics, vol. QE-16, No. 6 Published Jun. 1980.
(Continued)

*Primary Examiner* — Sung H Pak
(74) *Attorney, Agent, or Firm* — Michael E. Carroll, Jr.

(57) ABSTRACT

Fiber optic connectors (10), cable assemblies (100) and methods for making the same are disclosed. In one embodiment, the fiber optic connector (10) comprises a ferrule assembly (52), a housing (20) and a cap (60). The housing (20) comprises a longitudinal passageway (22) between a rear end (21) and a front end (23), and a ferrule assembly side-loading pocket (40) for receiving the ferrule assembly (52). The ferrule assembly (52) and housing (20) cooperate to inhibit movement of the assembly during manufacturing. Fiber optic connector 10 may include other features as desired such as keying portion (20KP) or at least one locking feature (20L) integrally formed in the housing (20).

43 Claims, 42 Drawing Sheets

Related U.S. Application Data

No. 16/018,988, filed on Jun. 26, 2018, now Pat. No. 10,359,577, and a continuation-in-part of application No. 16/018,997, filed on Jun. 26, 2018, now Pat. No. 10,386,584, and a continuation-in-part of application No. 16/019,008, filed on Jun. 26, 2018, now Pat. No. 10,429,594, and a continuation-in-part of application No. 16/015,583, filed on Jun. 22, 2018, now Pat. No. 10,429,593, and a continuation-in-part of application No. 16/015,588, filed on Jun. 22, 2018, now Pat. No. 10,605,998, and a continuation-in-part of application No. PCT/US2017/064027, filed on Nov. 30, 2017, and a continuation-in-part of application No. PCT/US2017/064071, filed on Nov. 30, 2017, and a continuation-in-part of application No. PCT/US2017/064063, filed on Nov. 30, 2017, and a continuation-in-part of application No. PCT/US2017/064072, filed on Nov. 30, 2017, and a continuation-in-part of application No. PCT/US2017/064092, filed on Nov. 30, 2017, and a continuation-in-part of application No. PCT/US2017/064095, filed on Nov. 30, 2017, and a continuation-in-part of application No. PCT/US2018/039484, filed on Jun. 26, 2018, and a continuation-in-part of application No. PCT/US2018/039485, filed on Jun. 26, 2018, and a continuation-in-part of application No. PCT/US2018/039490, filed on Jun. 26, 2018, and a continuation-in-part of application No. PCT/US2018/039494, filed on Jun. 26, 2018, and a continuation-in-part of application No. PCT/US2018/039019, filed on Jun. 22, 2018, and a continuation-in-part of application No. PCT/US2018/039020, filed on Jun. 22, 2018, and a continuation-in-part of application No. PCT/US2017/063862, filed on Nov. 30, 2017, and a continuation-in-part of application No. PCT/US2017/063938, filed on Nov. 30, 2017, and a continuation-in-part of application No. PCT/US2017/063953, filed on Nov. 30, 2017, and a continuation-in-part of application No. PCT/US2017/063991, filed on Nov. 30, 2017.

(60) Provisional application No. 62/526,011, filed on Jun. 28, 2017, provisional application No. 62/526,018, filed on Jun. 28, 2017, provisional application No. 62/526,195, filed on Jun. 28, 2017.

(56) References Cited

U.S. PATENT DOCUMENTS

| | | | |
|---|---|---|---|
| 3,792,284 | A | 2/1974 | Kaelin |
| 3,912,362 | A | 10/1975 | Hudson |
| 4,003,297 | A | 1/1977 | Mott |
| 4,077,567 | A | 3/1978 | Ginn et al. |
| 4,148,557 | A | 4/1979 | Garvey |
| 4,167,303 | A | 9/1979 | Bowen et al. |
| 4,168,109 | A | 9/1979 | Dumire |
| 4,188,088 | A | 2/1980 | Andersen et al. |
| 4,336,977 | A | 6/1982 | Monaghan et al. |
| 4,354,731 | A | 10/1982 | Mouissie |
| 4,373,777 | A | 2/1983 | Borsuk et al. |
| 4,413,880 | A | 11/1983 | Forrest et al. |
| 4,423,922 | A | 1/1984 | Porter |
| 4,440,471 | A | 4/1984 | Knowles |
| 4,461,537 | A | 7/1984 | Raymer et al. |
| 4,515,434 | A | 5/1985 | Margolin et al. |
| 4,560,232 | A | 12/1985 | O'Hara |
| 4,615,581 | A | 10/1986 | Morimoto |
| 4,634,214 | A | 1/1987 | Cannon et al. |
| 4,634,858 | A | 1/1987 | Gerdt et al. |
| 4,684,205 | A | 8/1987 | Margolin et al. |
| 4,688,200 | A | 8/1987 | Poorman et al. |
| 4,690,563 | A | 9/1987 | Barton et al. |
| 4,699,458 | A | 10/1987 | Ohtsuki et al. |
| 4,705,352 | A | 11/1987 | Margolin et al. |
| 4,711,752 | A | 12/1987 | Deacon et al. |
| 4,715,675 | A | 12/1987 | Kevern et al. |
| 4,723,827 | A | 2/1988 | Shaw et al. |
| 4,741,590 | A | 5/1988 | Caron |
| 4,763,983 | A | 8/1988 | Keith |
| 4,783,137 | A | 11/1988 | Kosman et al. |
| 4,842,363 | A | 6/1989 | Margolin et al. |
| 4,844,570 | A | 7/1989 | Tanabe |
| 4,854,664 | A | 8/1989 | McCartney |
| 4,856,867 | A | 8/1989 | Gaylin |
| 4,902,238 | A | 2/1990 | Iacobucci |
| 4,913,514 | A | 4/1990 | Then |
| 4,921,413 | A | 5/1990 | Blew |
| 4,944,568 | A | 7/1990 | Danbach et al. |
| 4,960,318 | A | 10/1990 | Nilsson et al. |
| 4,961,623 | A | 10/1990 | Midkiff et al. |
| 4,964,688 | A | 10/1990 | Caldwell et al. |
| 4,979,792 | A | 12/1990 | Weber et al. |
| 4,994,134 | A | 2/1991 | Knecht et al. |
| 4,995,836 | A | 2/1991 | Toramoto |
| 5,007,860 | A | 4/1991 | Robinson et al. |
| 5,016,968 | A | 5/1991 | Hammond et al. |
| 5,028,114 | A | 7/1991 | Krausse et al. |
| 5,058,984 | A | 10/1991 | Bulman et al. |
| 5,067,783 | A | 11/1991 | Lampert |
| 5,073,042 | A | 12/1991 | Mulholland et al. |
| 5,076,656 | A | 12/1991 | Briggs et al. |
| 5,085,492 | A | 2/1992 | Kelsoe et al. |
| 5,088,804 | A | 2/1992 | Grinderslev |
| 5,095,176 | A | 3/1992 | Harbrecht et al. |
| 5,129,023 | A | 7/1992 | Anderson et al. |
| 5,131,735 | A | 7/1992 | Berkey et al. |
| 5,134,677 | A | 7/1992 | Leung et al. |
| 5,136,683 | A | 8/1992 | Aoki et al. |
| 5,142,602 | A | 8/1992 | Cabato et al. |
| 5,146,519 | A | 9/1992 | Miller et al. |
| 5,155,900 | A | 10/1992 | Grois et al. |
| 5,180,890 | A | 1/1993 | Pendergrass et al. |
| 5,189,718 | A | 2/1993 | Barrett et al. |
| 5,210,810 | A | 5/1993 | Darden et al. |
| 5,212,752 | A | 5/1993 | Stephenson et al. |
| 5,214,732 | A | 5/1993 | Beard et al. |
| 5,224,187 | A | 6/1993 | Davisdon |
| 5,231,685 | A | 7/1993 | Hanzawa et al. |
| 5,245,683 | A | 9/1993 | Belenkiy et al. |
| 5,263,105 | A | 11/1993 | Johnson et al. |
| 5,276,750 | A | 1/1994 | Manning |
| 5,313,540 | A | 5/1994 | Ueda et al. |
| 5,317,663 | A | 5/1994 | Beard et al. |
| 5,321,917 | A | 6/1994 | Franklin et al. |
| 5,367,594 | A | 11/1994 | Essert et al. |
| 5,371,823 | A | 12/1994 | Barrett et al. |
| 5,375,183 | A | 12/1994 | Edwards et al. |
| 5,381,494 | A | 1/1995 | O'Donnell et al. |
| 5,390,269 | A | 2/1995 | Palecek et al. |
| 5,394,494 | A | 2/1995 | Jennings et al. |
| 5,394,497 | A | 2/1995 | Erdman et al. |
| 5,408,570 | A | 4/1995 | Cook et al. |
| 5,416,874 | A | 5/1995 | Giebel et al. |
| 5,452,388 | A | 9/1995 | Rittle et al. |
| 5,519,799 | A | 5/1996 | Murakami et al. |
| 5,553,186 | A | 9/1996 | Allen |
| 5,557,696 | A | 9/1996 | Stein |
| 5,569,050 | A | 10/1996 | Lloyd |
| 5,588,077 | A | 12/1996 | Woodside |
| 5,600,747 | A | 2/1997 | Yamakawa et al. |
| 5,603,631 | A | 2/1997 | Kawahara et al. |
| 5,608,828 | A | 3/1997 | Coutts et al. |
| 5,631,993 | A | 5/1997 | Cloud et al. |
| 5,647,045 | A | 7/1997 | Robinson et al. |
| 5,682,451 | A | 10/1997 | Lee et al. |
| 5,694,507 | A | 12/1997 | Walles |
| 5,748,821 | A | 5/1998 | Schempp et al. |
| 5,761,359 | A | 6/1998 | Chudoba et al. |

(56) References Cited

U.S. PATENT DOCUMENTS

| | | |
|---|---|---|
| 5,781,686 A | 7/1998 | Robinson et al. |
| 5,782,892 A | 7/1998 | Castle et al. |
| 5,789,701 A | 8/1998 | Wettengel et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,224,268 B1 | 5/2001 | Manning et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,305,849 B1 | 10/2001 | Roehrs et al. |
| 6,356,390 B1 | 3/2002 | Hall |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,409,391 B1 | 6/2002 | Chang |
| 6,422,764 B1 | 7/2002 | Marrs |
| 6,427,035 B1 | 7/2002 | Mahony |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,848,838 B2 | 2/2005 | Doss et al. |
| 6,856,748 B1 | 2/2005 | Elkins et al. |
| 6,899,467 B2 | 5/2005 | McDonald et al. |
| 6,909,821 B2 | 6/2005 | Ravasio et al. |
| 6,944,387 B2 | 9/2005 | Howell et al. |
| 7,011,454 B2 | 3/2006 | Caveney et al. |
| 7,025,507 B2 | 4/2006 | De Marchi |
| 7,033,191 B1 | 4/2006 | Cao |
| 7,079,734 B2 | 7/2006 | Seddon et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,178,990 B2 | 2/2007 | Caveney et al. |
| 7,184,634 B2 | 2/2007 | Hurley et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,228,047 B1 | 6/2007 | Szilagyi et al. |
| 7,241,056 B1 | 7/2007 | Kuffel et al. |
| 7,266,265 B2 | 9/2007 | Gall et al. |
| 7,270,487 B2 | 9/2007 | Billman et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell, Jr. et al. |
| 7,341,382 B2 | 3/2008 | Dye |
| 7,366,416 B2 | 4/2008 | Ramachandran et al. |
| 7,444,056 B2 | 10/2008 | Allen et al. |
| 7,463,803 B2 | 12/2008 | Cody et al. |
| 7,467,896 B2 | 12/2008 | Melton et al. |
| 7,489,849 B2 | 2/2009 | Reagan et al. |
| 7,497,896 B2 | 3/2009 | Bromet et al. |
| 7,542,645 B1 | 6/2009 | Hua et al. |
| 7,565,055 B2 | 7/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,653,282 B2 | 1/2010 | Blackwell, Jr. et al. |
| 7,654,747 B2 | 2/2010 | Theuerkorn et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,740,409 B2 | 6/2010 | Bolton et al. |
| 7,742,670 B2 | 6/2010 | Benjamin et al. |
| 7,753,596 B2 | 7/2010 | Cox |
| 7,762,726 B2 * | 7/2010 | Lu .................. G02B 6/3816<br>385/53 |
| 7,785,015 B2 | 8/2010 | Melton et al. |
| 7,802,926 B2 | 9/2010 | Leeman et al. |
| 7,806,599 B2 | 10/2010 | Margolin et al. |
| 7,844,148 B2 | 11/2010 | Jenkins et al. |

(56) References Cited

U.S. PATENT DOCUMENTS

| | | |
|---|---|---|
| 7,844,160 B2 | 11/2010 | Reagan et al. |
| RE42,094 E | 2/2011 | Barnes et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,942,590 B2 | 5/2011 | Lu et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,376,629 B2 | 2/2013 | Cline et al. |
| 8,408,811 B2 | 4/2013 | De et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,520,996 B2 | 8/2013 | Cowen et al. |
| 8,534,928 B2 | 9/2013 | Cooke et al. |
| 8,556,522 B2 | 10/2013 | Cunningham |
| 8,622,634 B2 | 1/2014 | Arnold et al. |
| 8,635,733 B2 | 1/2014 | Bardzilowski |
| 8,662,760 B2 | 3/2014 | Cline et al. |
| 8,678,668 B2 | 3/2014 | Cooke et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,821,036 B2 | 9/2014 | Shigehara |
| 8,998,502 B2 | 4/2015 | Benjamin et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,207,410 B2 | 12/2015 | Lee et al. |
| 9,285,550 B2 | 3/2016 | Nhep et al. |
| 9,297,974 B2 | 3/2016 | Valderrabano et al. |
| 9,322,998 B2 | 4/2016 | Miller |
| 9,383,539 B2 | 7/2016 | Power et al. |
| 9,405,068 B2 | 8/2016 | Graham et al. |
| 9,482,819 B2 | 11/2016 | Li et al. |
| 9,513,444 B2 | 12/2016 | Barnette, Jr. et al. |
| 9,551,842 B2 | 1/2017 | Theuerkorn |
| 9,684,138 B2 | 1/2017 | Lu |
| 9,618,718 B2 | 4/2017 | Islam |
| 9,638,871 B2 | 5/2017 | Bund et al. |
| 9,645,331 B1 | 5/2017 | Kim |
| 9,651,741 B2 | 5/2017 | Isenhour et al. |
| 9,664,862 B2 | 5/2017 | Lu et al. |
| 9,684,136 B2 | 6/2017 | Cline et al. |
| 9,696,500 B2 | 7/2017 | Barnette et al. |
| 9,762,322 B1 | 9/2017 | Amundson |
| 9,766,416 B1 | 9/2017 | Kim |
| 9,772,457 B2 | 9/2017 | Hill et al. |
| 9,810,855 B2 | 11/2017 | Cox et al. |
| 9,810,856 B2 | 11/2017 | Graham et al. |
| 9,829,668 B2 | 11/2017 | Claessens et al. |
| 9,857,540 B2 | 1/2018 | Ahmed et al. |
| D810,029 S | 2/2018 | Robert et al. |
| 9,891,391 B2 | 2/2018 | Watanabe |
| 9,933,582 B1 | 4/2018 | Lin |
| 9,983,374 B2 | 5/2018 | Li et al. |
| 10,038,946 B2 | 7/2018 | Smolorz |
| 10,061,090 B2 | 8/2018 | Coenegracht |
| 10,114,176 B2 | 10/2018 | Gimblet et al. |
| 10,180,541 B2 | 1/2019 | Coenegracht et al. |
| 10,209,454 B2 | 2/2019 | Isenhour et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,353,156 B2 | 7/2019 | Hill et al. |
| 10,401,575 B2 | 9/2019 | Daily et al. |
| 10,401,578 B2 | 9/2019 | Coenegracht |
| 10,409,007 B2 | 9/2019 | Kadar-Kallen et al. |
| 10,444,442 B2 | 10/2019 | Takano et al. |
| 10,451,811 B2 | 10/2019 | Coenegracht et al. |
| 10,451,830 B2 | 10/2019 | Szumacher et al. |
| 10,488,597 B2 | 11/2019 | Parikh et al. |
| 10,520,683 B2 | 12/2019 | Nhep |
| 10,656,347 B2 | 5/2020 | Kato |
| 10,802,236 B2 | 10/2020 | Kowalczyk et al. |
| 10,830,967 B2 | 11/2020 | Pimentel et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0081077 A1 | 6/2002 | Nault |
| 2002/0122653 A1 | 9/2002 | Donaldson et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2004/0047566 A1 | 3/2004 | McDonald et al. |
| 2004/0072454 A1 | 4/2004 | Nakajima et al. |
| 2004/0076377 A1 | 4/2004 | Mizukami et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0019031 A1 | 1/2005 | Ye et al. |
| 2005/0036786 A1 | 2/2005 | Ramachandran et al. |
| 2005/0054237 A1 | 3/2005 | Gladd et al. |
| 2005/0084215 A1 | 4/2005 | Grzegorzewska et al. |
| 2005/0123422 A1 | 6/2005 | Lilie |
| 2005/0129379 A1 | 6/2005 | Reagan et al. |
| 2005/0175307 A1 | 8/2005 | Battey et al. |
| 2005/0232552 A1 | 10/2005 | Takahashi et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0088247 A1 | 4/2006 | Tran et al. |
| 2006/0093278 A1 | 5/2006 | Elkins et al. |
| 2006/0120672 A1 | 6/2006 | Cody et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0077010 A1 | 4/2007 | Melton et al. |
| 2007/0098343 A1 | 5/2007 | Miller et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0232743 A1 | 9/2008 | Gronvall et al. |
| 2008/0240658 A1 | 10/2008 | Leeman et al. |
| 2008/0264664 A1 | 10/2008 | Dinh et al. |

(56) References Cited

U.S. PATENT DOCUMENTS

| | | |
|---|---|---|
| 2008/0273837 A1 | 11/2008 | Margolin et al. |
| 2009/0041412 A1 | 2/2009 | Danley et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0008909 A1 | 1/2010 | Siadak et al. |
| 2010/0014813 A1 | 1/2010 | Ito et al. |
| 2010/0014867 A1 | 1/2010 | Ramanitra et al. |
| 2010/0015834 A1 | 1/2010 | Siebens |
| 2010/0054680 A1 | 3/2010 | Lochkovic et al. |
| 2010/0092136 A1 | 4/2010 | Nhep |
| 2010/0172616 A1 | 7/2010 | Lu et al. |
| 2010/0197222 A1 | 8/2010 | Scheucher |
| 2010/0247053 A1 | 9/2010 | Cowen et al. |
| 2010/0272399 A1 | 10/2010 | Griffiths et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2011/0019964 A1 | 1/2011 | Nhep et al. |
| 2011/0047731 A1 | 3/2011 | Sugita et al. |
| 2011/0108719 A1 | 5/2011 | Ford et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0299814 A1 | 12/2011 | Nakagawa |
| 2012/0002925 A1 | 1/2012 | Nakagawa |
| 2012/0008909 A1 | 1/2012 | Mertesdorf et al. |
| 2012/0106912 A1 | 5/2012 | McGranahan et al. |
| 2012/0183268 A1 | 7/2012 | De et al. |
| 2012/0251063 A1 | 10/2012 | Reagan et al. |
| 2012/0252244 A1 | 10/2012 | Elkins, II et al. |
| 2013/0004122 A1 | 1/2013 | Kingsbury |
| 2013/0034333 A1 | 2/2013 | Holmberg et al. |
| 2013/0064506 A1 | 3/2013 | Eberle et al. |
| 2013/0109213 A1 | 5/2013 | Chang |
| 2013/0170834 A1 | 7/2013 | Cho et al. |
| 2013/0236139 A1 | 9/2013 | Chen et al. |
| 2014/0016902 A1 | 1/2014 | Pepe et al. |
| 2014/0050446 A1 | 2/2014 | Chang |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0153876 A1 | 6/2014 | Dendas et al. |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0294395 A1 | 10/2014 | Waldron et al. |
| 2014/0328559 A1 | 11/2014 | Kobayashi et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0144883 A1 | 5/2015 | Sendelweck |
| 2015/0185423 A1 | 7/2015 | Matsui et al. |
| 2015/0253528 A1 | 9/2015 | Corbille et al. |
| 2015/0268423 A1 | 9/2015 | Burkholder et al. |
| 2015/0268434 A1 | 9/2015 | Barnette, Jr. et al. |
| 2015/0293310 A1 | 10/2015 | Kanno |
| 2015/0316727 A1* | 11/2015 | Kondo ............... G02B 6/4292 385/84 |
| 2015/0346436 A1 | 12/2015 | Pepe et al. |
| 2016/0015885 A1 | 1/2016 | Pananen et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154186 A1 | 6/2016 | Gimblet et al. |
| 2016/0161688 A1 | 6/2016 | Nishimura |
| 2016/0161689 A1 | 6/2016 | Nishimura |
| 2016/0209599 A1 | 7/2016 | Van Baelen et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0306122 A1 | 10/2016 | Tong et al. |
| 2017/0038538 A1 | 2/2017 | Isenhour et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0176252 A1 | 6/2017 | Marple et al. |
| 2017/0176690 A1 | 6/2017 | Bretz et al. |
| 2017/0219782 A1 | 8/2017 | Nishimura |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261699 A1 | 9/2017 | Compton et al. |
| 2017/0285279 A1 | 10/2017 | Daems et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0081127 A1 | 3/2018 | Coenegracht |
| 2018/0267265 A1 | 9/2018 | Zhang et al. |
| 2019/0004251 A1 | 1/2019 | Dannoux et al. |
| 2019/0004252 A1 | 1/2019 | Rosson |
| 2019/0004256 A1 | 1/2019 | Rosson |
| 2019/0004258 A1 | 1/2019 | Dannoux et al. |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0187396 A1 | 6/2019 | Finnegan et al. |
| 2020/0012051 A1 | 1/2020 | Coenegracht et al. |
| 2020/0049922 A1 | 2/2020 | Rosson |
| 2020/0057222 A1 | 2/2020 | Dannoux et al. |
| 2020/0057723 A1 | 2/2020 | Chirca et al. |
| 2020/0116952 A1 | 4/2020 | Rosson |
| 2020/0116953 A1 | 4/2020 | Rosson |
| 2020/0241211 A1 | 7/2020 | Shonkwiler et al. |
| 2020/0371306 A1 | 11/2020 | Mosier et al. |
| 2020/0393629 A1 | 12/2020 | Hill et al. |

FOREIGN PATENT DOCUMENTS

| | | |
|---|---|---|
| CN | 1646962 A | 7/2005 |
| CN | 1922523 A | 2/2007 |
| CN | 101195453 A | 6/2008 |
| CN | 201704194 Y | 2/2010 |
| CN | 201704194 U | 1/2011 |
| CN | 203224645 U | 10/2013 |
| CN | 203396982 U | 1/2014 |
| CN | 104064903 A | 9/2014 |
| DE | 03537684 A1 | 4/1987 |
| DE | 3737842 C1 | 9/1988 |
| DE | 19805554 A1 | 8/1998 |
| EP | 0012566 A1 | 6/1980 |
| EP | 122566 A2 | 10/1984 |
| EP | 130513 A2 | 1/1985 |
| EP | 462362 A2 | 12/1991 |
| EP | 0469671 A1 | 2/1992 |
| EP | 547778 A1 | 6/1993 |
| EP | 0547788 A1 | 6/1993 |
| EP | 468671 B1 | 1/1996 |
| EP | 762171 A1 | 3/1997 |
| EP | 855610 A2 | 7/1998 |
| EP | 0856751 A1 | 8/1998 |
| EP | 856761 A1 | 8/1998 |
| EP | 940700 A2 | 9/1999 |
| EP | 949522 A2 | 10/1999 |
| EP | 957381 A1 | 11/1999 |
| EP | 997757 A2 | 5/2000 |
| EP | 1065542 A1 | 1/2001 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1122566 B1 | 7/2005 |
| EP | 1678537 A1 | 7/2006 |
| EP | 1759231 A1 | 3/2007 |
| EP | 1810062 A1 | 7/2007 |

(56) References Cited

FOREIGN PATENT DOCUMENTS

| | | |
|---|---|---|
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3064973 A2 | 9/2016 |
| EP | 3101740 A1 | 12/2016 |
| EP | 3207223 A1 | 8/2017 |
| EP | 3245545 A1 | 11/2017 |
| EP | 3265859 A1 | 1/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| GB | 2022284 A | 12/1979 |
| GB | 2154333 A | 9/1985 |
| GB | 2169094 A | 7/1986 |
| JP | 52030447 A | 3/1977 |
| JP | 58142308 A | 8/1983 |
| JP | 61-145509 A | 7/1986 |
| JP | 62054204 A | 3/1987 |
| JP | 6320111 B2 | 2/1988 |
| JP | 63089421 A | 4/1988 |
| JP | 63078908 U | 5/1988 |
| JP | 03-063615 A | 3/1991 |
| JP | 03207223 A | 9/1991 |
| JP | 05106765 A | 4/1993 |
| JP | 05142439 A | 6/1993 |
| JP | 05297246 A | 11/1993 |
| JP | 06-320111 A | 11/1994 |
| JP | 07318758 A | 12/1995 |
| JP | 08050211 A | 2/1996 |
| JP | 08054522 A | 2/1996 |
| JP | 08062432 A | 3/1996 |
| JP | 08292331 A | 11/1996 |
| JP | 09135526 A | 5/1997 |
| JP | 09159867 A | 6/1997 |
| JP | 09203831 A | 8/1997 |
| JP | 09325223 A | 12/1997 |
| JP | 09325249 A | 12/1997 |
| JP | 10170781 A | 6/1998 |
| JP | 10332953 A | 12/1998 |
| JP | 11064682 A | 3/1999 |
| JP | 11271582 A | 10/1999 |
| JP | 11281861 A | 10/1999 |
| JP | 11326693 A | 11/1999 |
| JP | 11352368 A | 12/1999 |
| JP | 2000002828 A | 1/2000 |
| JP | 2001116968 A | 4/2001 |
| JP | 2001290051 A | 10/2001 |
| JP | 2002520987 A | 7/2002 |
| JP | 2002-250987 A | 9/2002 |
| JP | 2003009331 A | 1/2003 |
| JP | 2003070143 A | 3/2003 |
| JP | 2003121699 A | 4/2003 |
| JP | 2003177279 A | 6/2003 |
| JP | 2003302561 A | 10/2003 |
| JP | 2004361521 A | 12/2004 |
| JP | 2005024789 A | 1/2005 |
| JP | 2005031544 A | 2/2005 |
| JP | 2005077591 A | 3/2005 |
| JP | 2005114860 A | 4/2005 |
| JP | 2005520987 A | 7/2005 |
| JP | 2006023502 A | 1/2006 |
| JP | 2006146084 A | 6/2006 |
| JP | 2006259631 A | 9/2006 |
| JP | 2006337637 A | 12/2006 |
| JP | 2007078740 A | 3/2007 |
| JP | 2007121859 A | 5/2007 |
| JP | 2009265208 A | 11/2009 |
| JP | 2010152084 A | 7/2010 |
| JP | 2011033698 A | 2/2011 |
| JP | 2013041089 A | 2/2013 |
| JP | 2013156580 A | 8/2013 |
| JP | 2014085474 A | 5/2014 |
| JP | 05537852 B2 | 7/2014 |
| JP | 05538328 B2 | 7/2014 |
| JP | 2014134746 A | 7/2014 |
| JP | 3207223 U | 11/2016 |
| KR | 10-2013-0081087 A | 7/2013 |
| WO | 1994025885 A1 | 11/1994 |
| WO | 1998036304 A1 | 8/1998 |
| WO | 2001027660 A2 | 4/2001 |
| WO | 01/92927 A2 | 12/2001 |
| WO | 2001092937 A1 | 12/2001 |
| WO | 0225340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/117060 A1 | 9/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012037727 A1 | 3/2012 |
| WO | WO-2012037727 A1 * | 3/2012 ............. G02B 6/387 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013177016 A1 | 11/2013 |
| WO | 2014151259 A1 | 9/2014 |
| WO | 2014167447 A1 | 10/2014 |
| WO | 2014/179411 A1 | 11/2014 |
| WO | 2014197894 A1 | 12/2014 |
| WO | 2015144883 A1 | 10/2015 |
| WO | 2015197588 A1 | 12/2015 |
| WO | 2016/059320 A1 | 4/2016 |
| WO | 2016/100078 A1 | 6/2016 |
| WO | 2016095213 A1 | 6/2016 |
| WO | 2016/115288 A1 | 7/2016 |
| WO | 2016156610 A1 | 10/2016 |
| WO | 2016168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/006176 A1 | 1/2019 |
| WO | 2019005190 A2 | 1/2019 |
| WO | 2019005191 A1 | 1/2019 |
| WO | 2019005192 A1 | 1/2019 |
| WO | 2019005193 A1 | 1/2019 |
| WO | 2019005194 A1 | 1/2019 |
| WO | 2019005195 A1 | 1/2019 |
| WO | 2019005196 A1 | 1/2019 |
| WO | 2019005197 A1 | 1/2019 |
| WO | 2019005198 A1 | 1/2019 |
| WO | 2019005199 A1 | 1/2019 |
| WO | 2019005200 A1 | 1/2019 |

(56) References Cited

FOREIGN PATENT DOCUMENTS

| WO | 2019005201 A1 | 1/2019 |
|---|---|---|
| WO | 2019005202 A1 | 1/2019 |
| WO | 2019005203 A1 | 1/2019 |
| WO | 2019005204 A1 | 1/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Clearfield, "Fieldshield Optical Fiber Protection System: Installation Manual." for part No. 016164. Last Updated Dec. 2014. 37 pgs.
Clearfield, "FieldShield® SC and LC Pushable Connectors," Last Updated Jun. 1, 2018, 2 pgs.
Clearfield, "FieldShield® SmarTerminal: Hardened Pushable Connectors" Last Updated Jun. 29, 2018, 2 pgs.
International Search Report and Written Opinion PCT/US2017/063938 dated May 14, 2018.
International Search Report and Written Opinion PCT/US2017/063953 dated May 14, 2018.
International Search Report and Written Opinion PCT/US2017/063991 dated May 14, 2018.
International Search Report and Written Opinion PCT/US2017/064027 dated Oct. 9, 2018.
International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.
International Search Report and Written Opinion PCT/US2018/039019 dated Sep. 18, 2018.
International Search Report and Written Opinion PCT/US2018/039020 dated May 8, 2019.
International Search Report and Written Opinion PCT/US2018/039490 dated Oct. 4, 2018.
International Search Report and Written Opinion PCT/US2018/039494 dated Oct. 11, 2018.
International Search Report and Written Opinion PCT/US2018/040011 dated Oct. 5, 2018.
International Search Report and Written Opinion PCT/US2018/040104 dated Oct. 9, 2018.
International Search Report and Written Opinion PCT/US2018/040126 dated Oct. 9, 2018.
International Search Report and Written Opinion PCT/US2018/040130 dated Sep. 18, 2018.
Brown, "What is Transmission Welding?" Laser Plastic Welding website, 6 pgs, Retrieved on Dec. 7, 2018 from: http://www.laserplasticwelding.com/what-is-transmission-welding.
Infolite—Design and Data Specifications, 1 pg. Retrieved Feb. 21, 2019.
Notice of Allowance Received for U.S. Appl. No. 16/018,997 dated Oct. 4, 2018.
Office Action Pertaining to U.S. Appl. No. 16/018,918 dated Sep. 28, 2018.
Office Action Pertaining to U.S. Appl. No. 16/018,988 dated Oct. 31, 2018.
Office Action Pertaining to U.S. Appl. No. 16/109,008 dated Oct. 31, 2018.
Schneier, Bruce; "Applied Cryptography: Protocols, Algorithms, and Source Code in C," Book. 1995 Sec. 10.3, 12.2, 165 Pgs.
Coaxum, L., et al., U.S. Appl. No. 62/341,947, "Fiber Optic Multiport Having Different Types of Ports for Multi-Use," filed May 26, 2016.
Faulkner et al. "Optical networks for local lopp applications," J. Lightwave Technol.0733-8724 7(11), 17411751 (1989).
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Wang et al. "Opto-VLSI-based dynamic optical splitter," Electron. Lett.0013-5194 10.1049/el:20046715 40(22), 14451446 (2004).

* cited by examiner

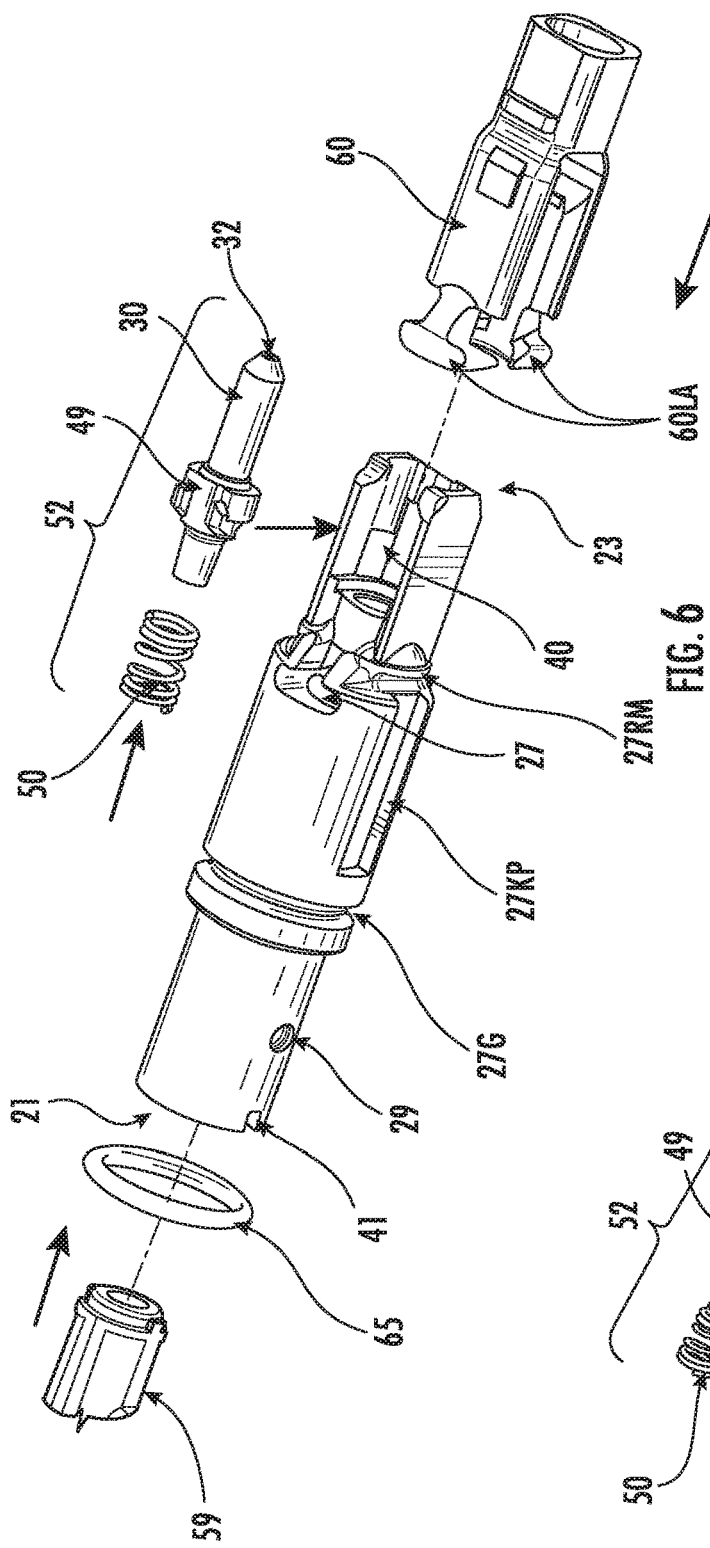
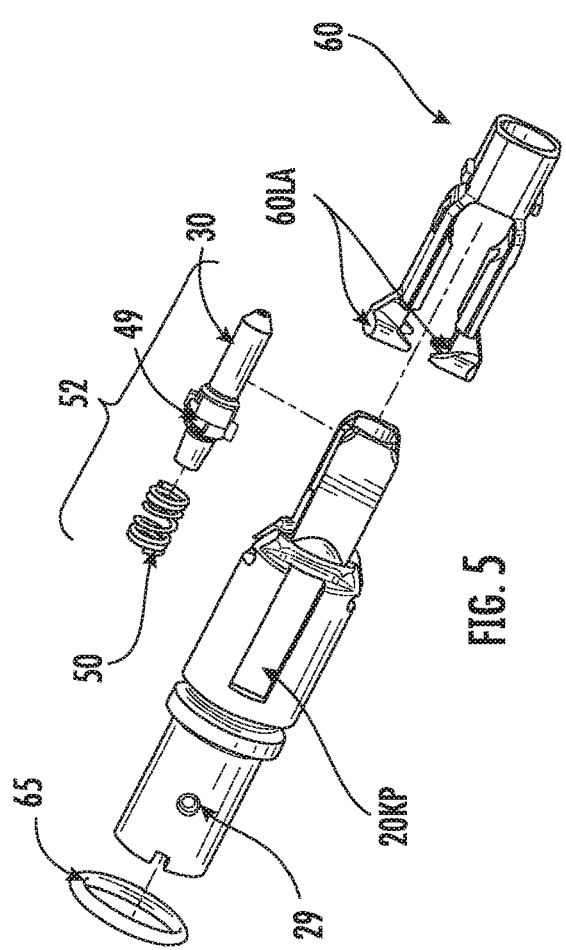

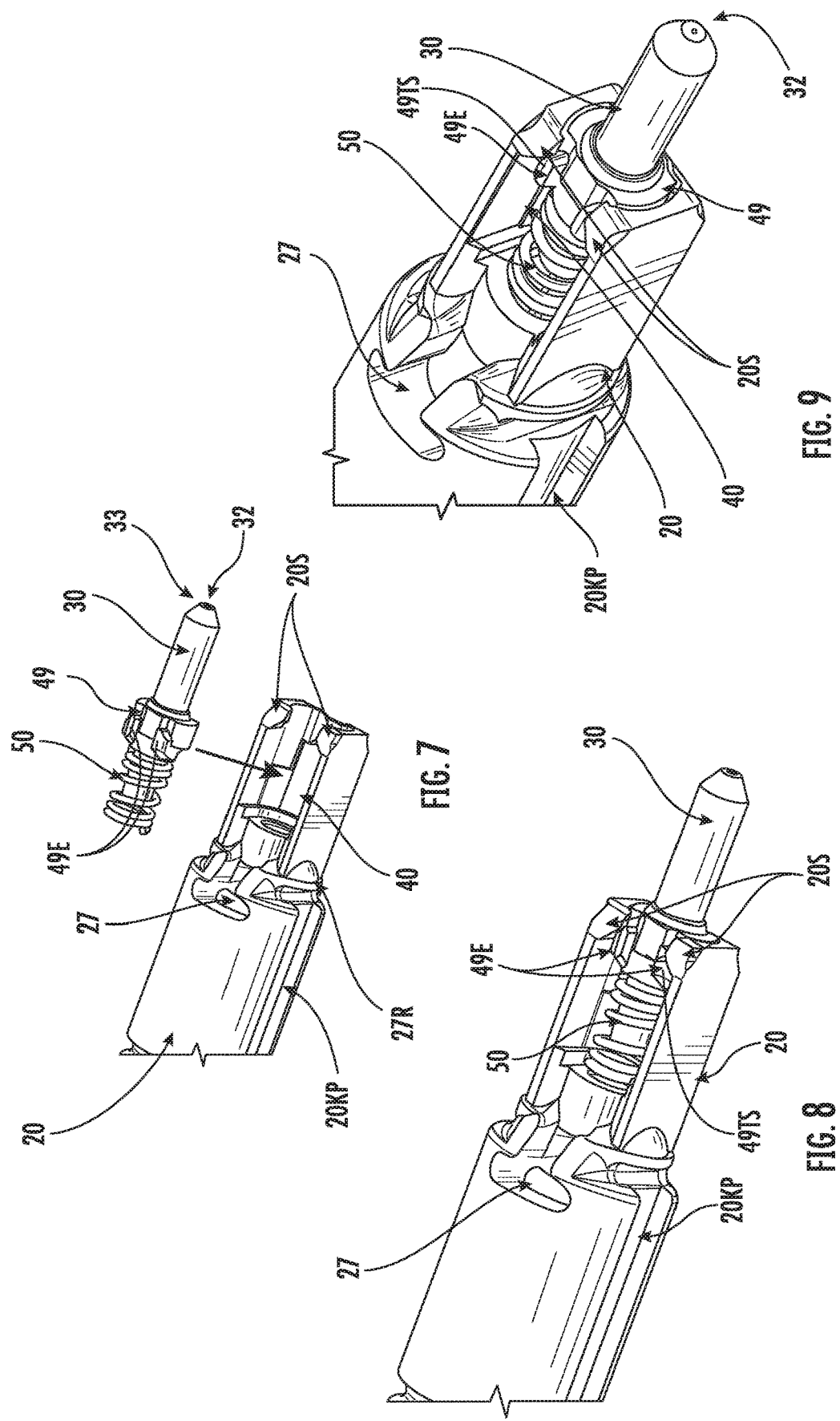

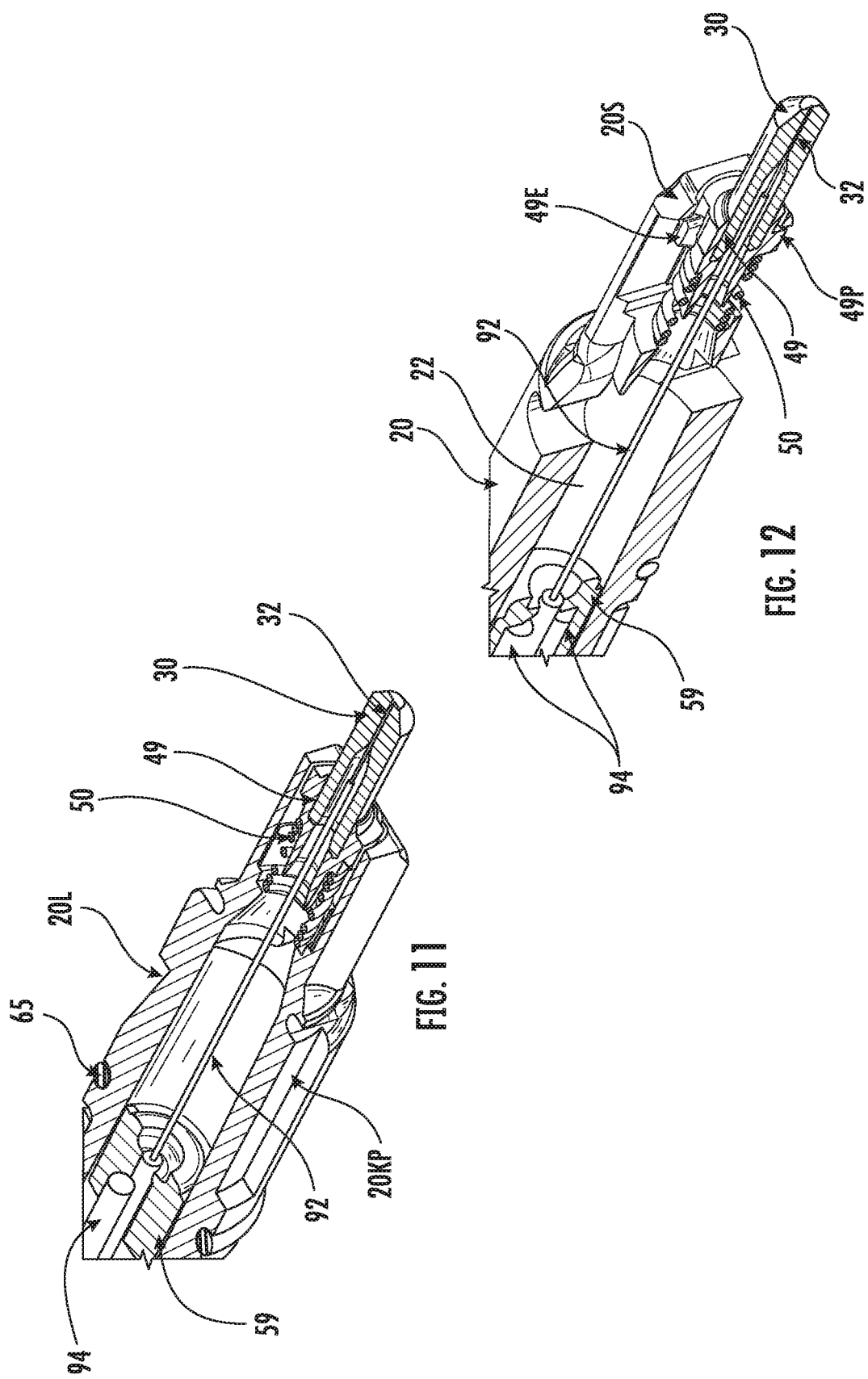

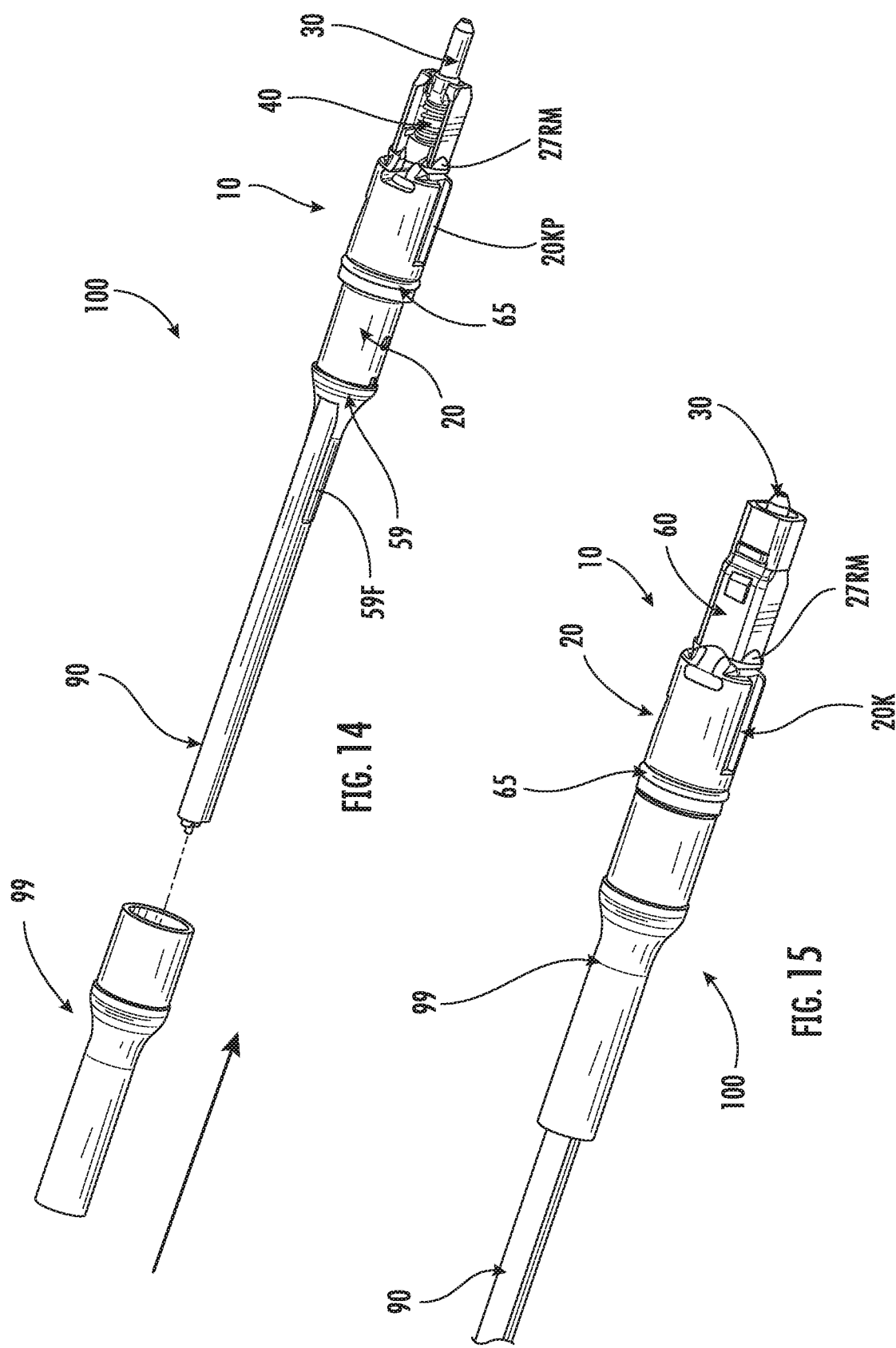

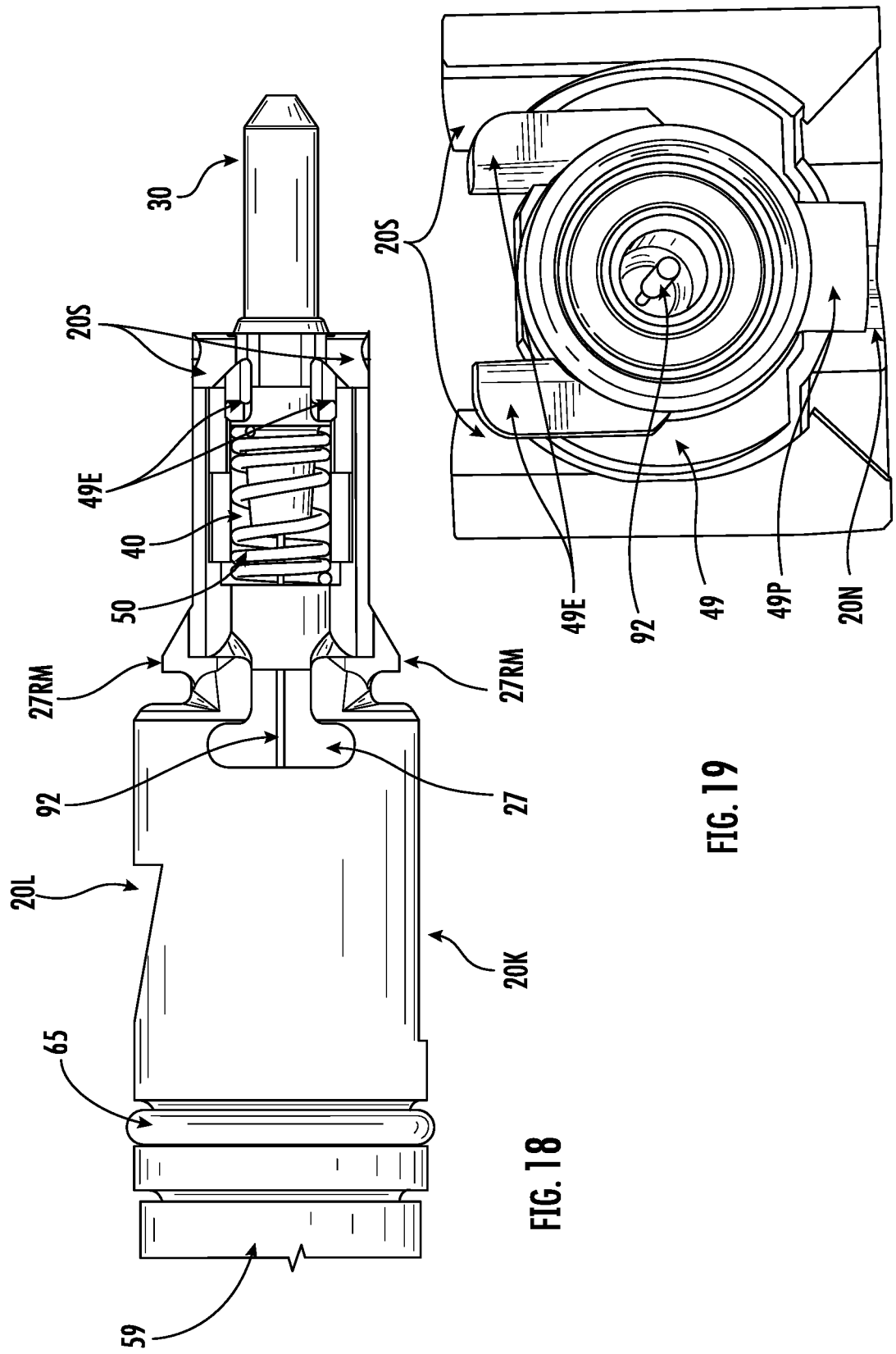

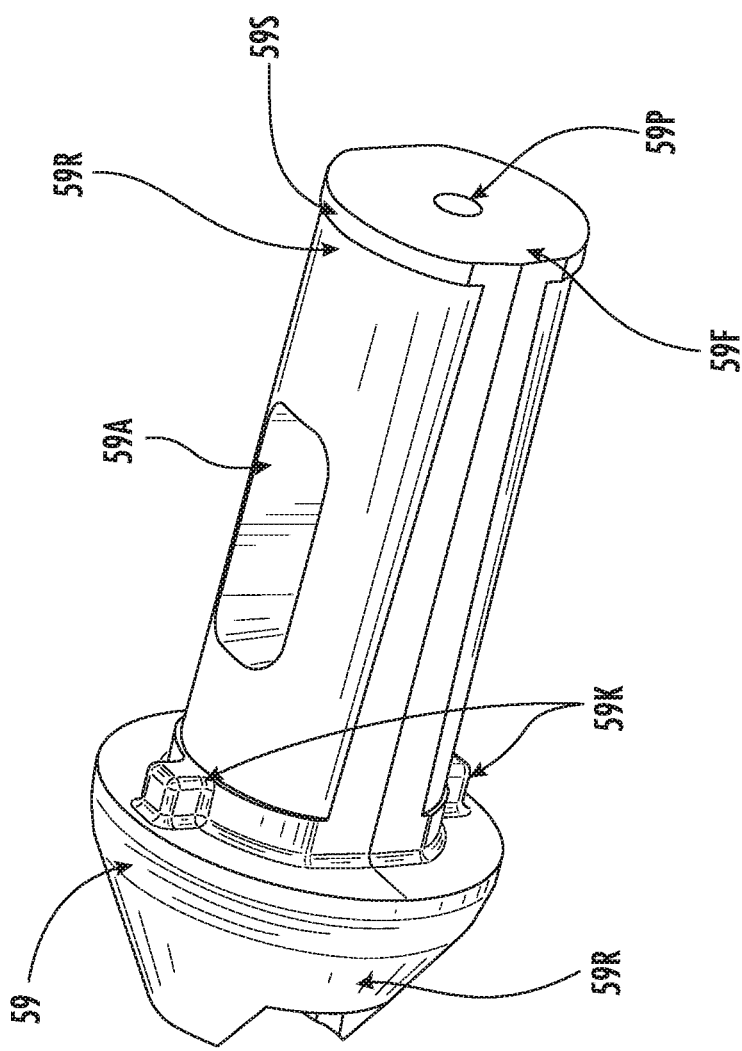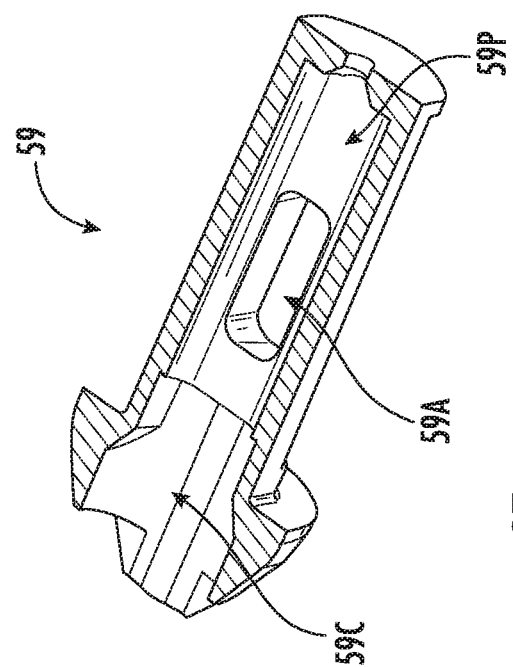

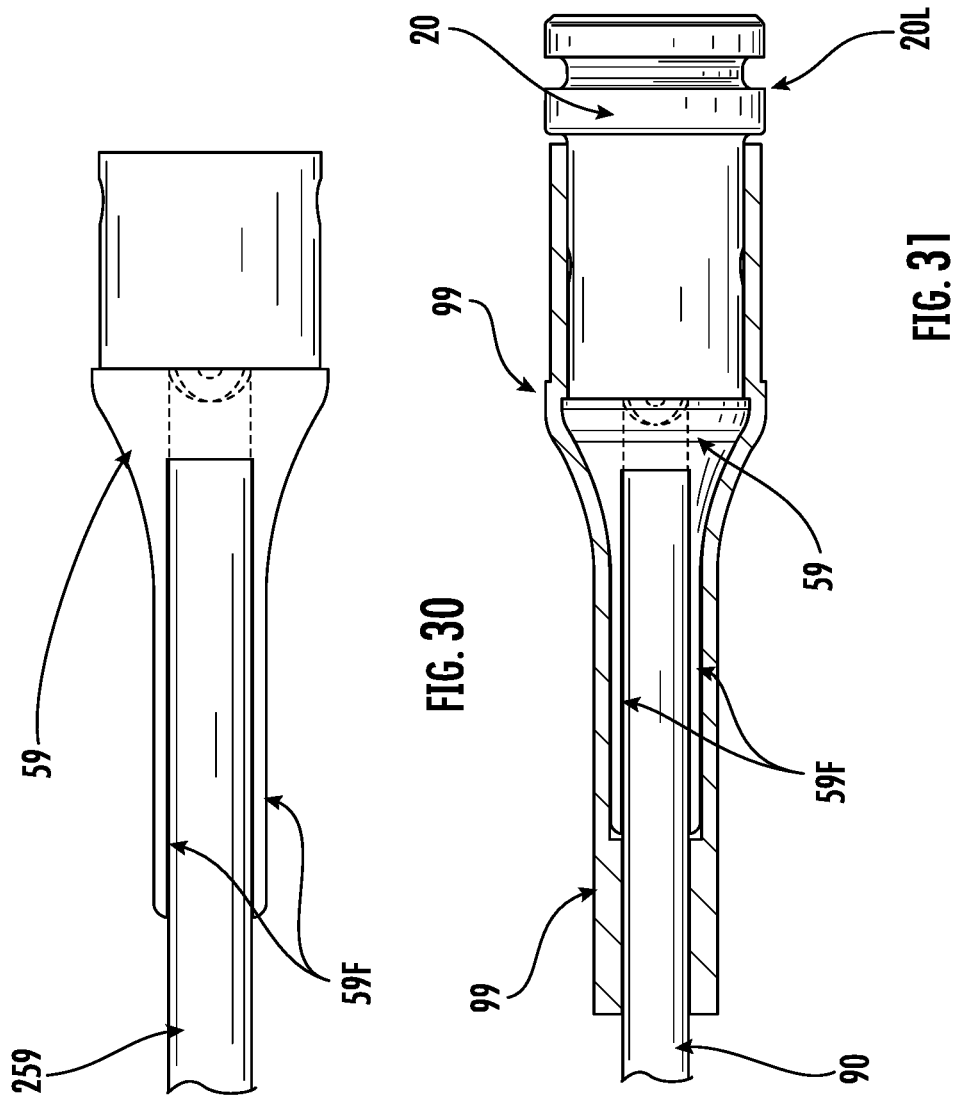

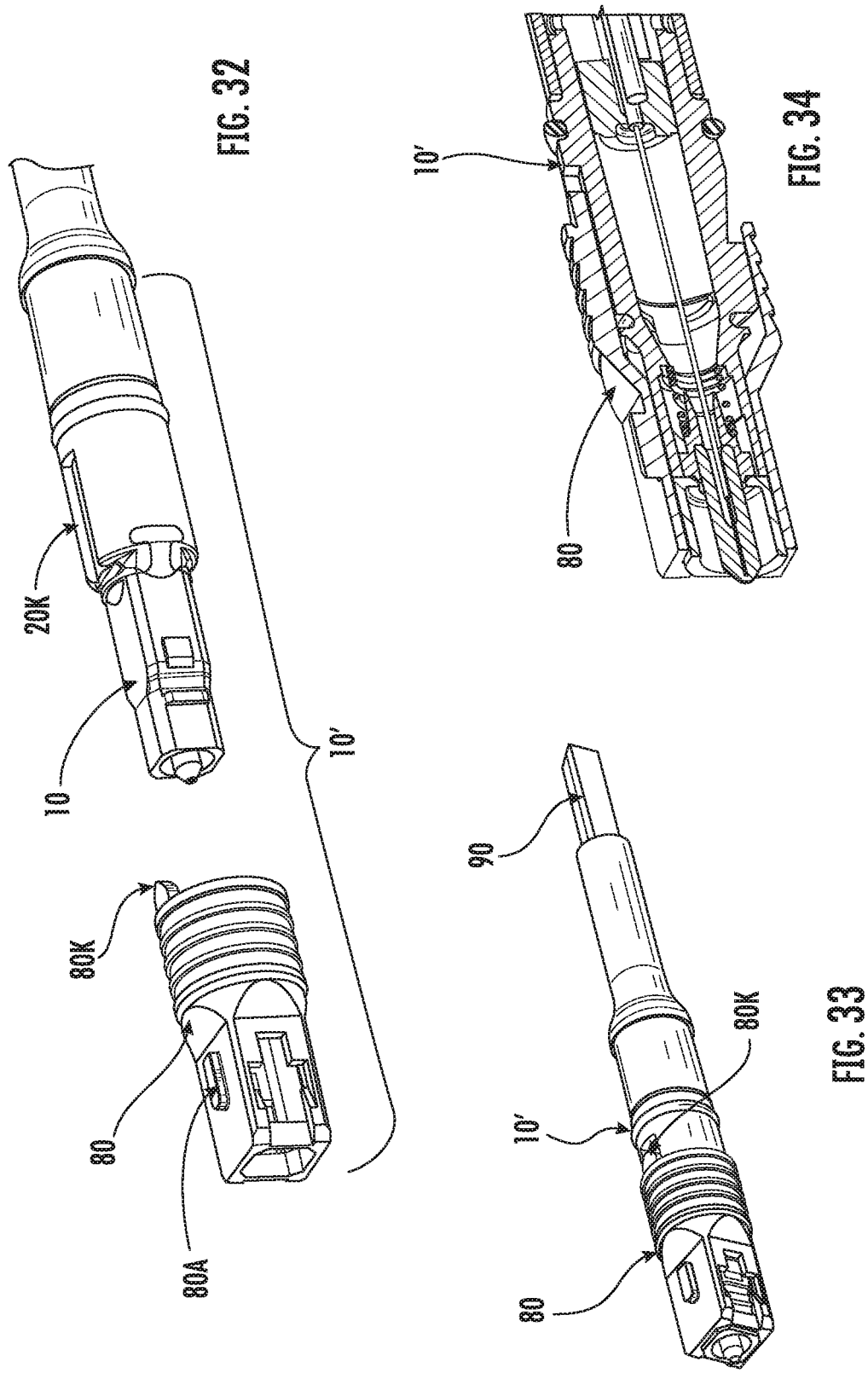

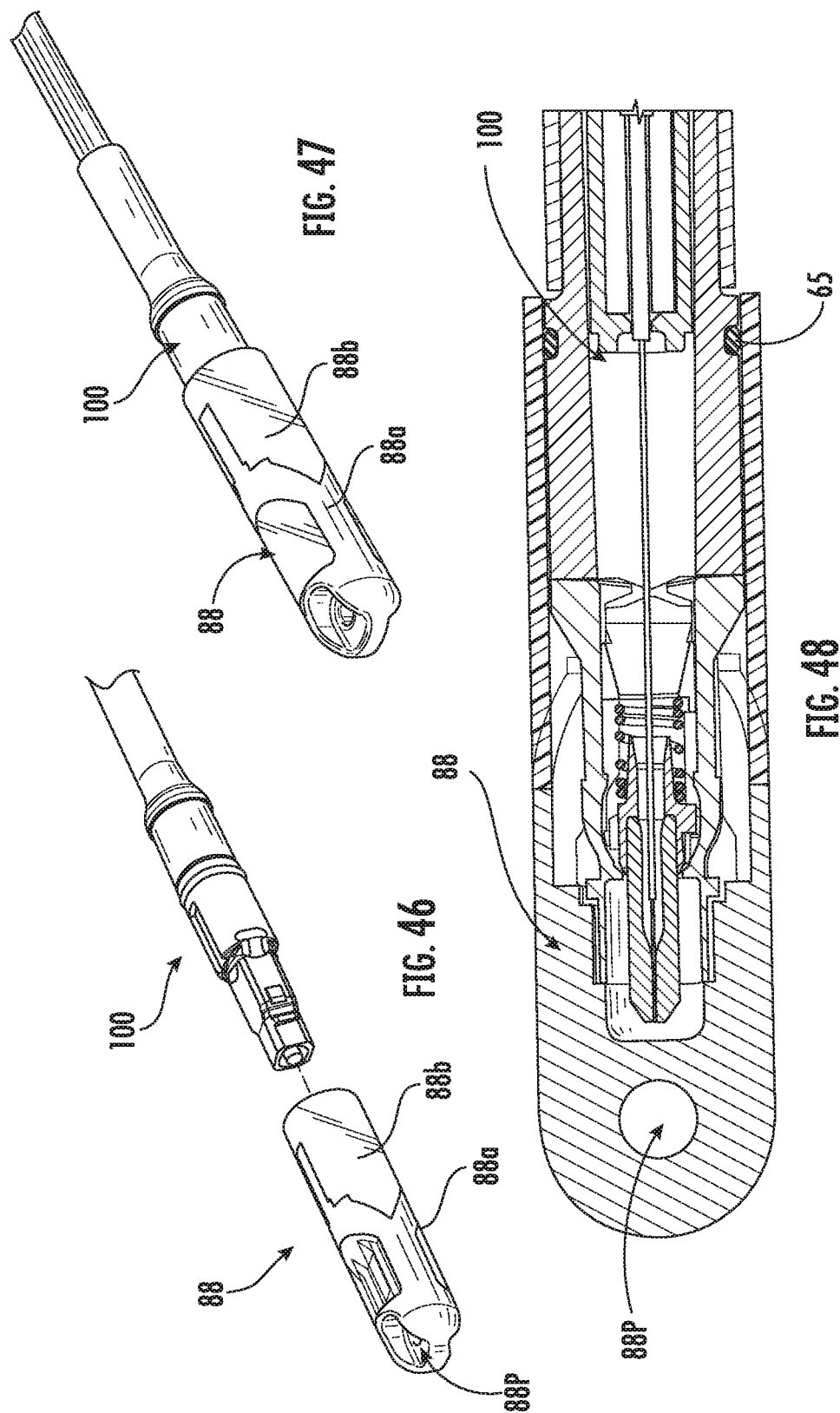

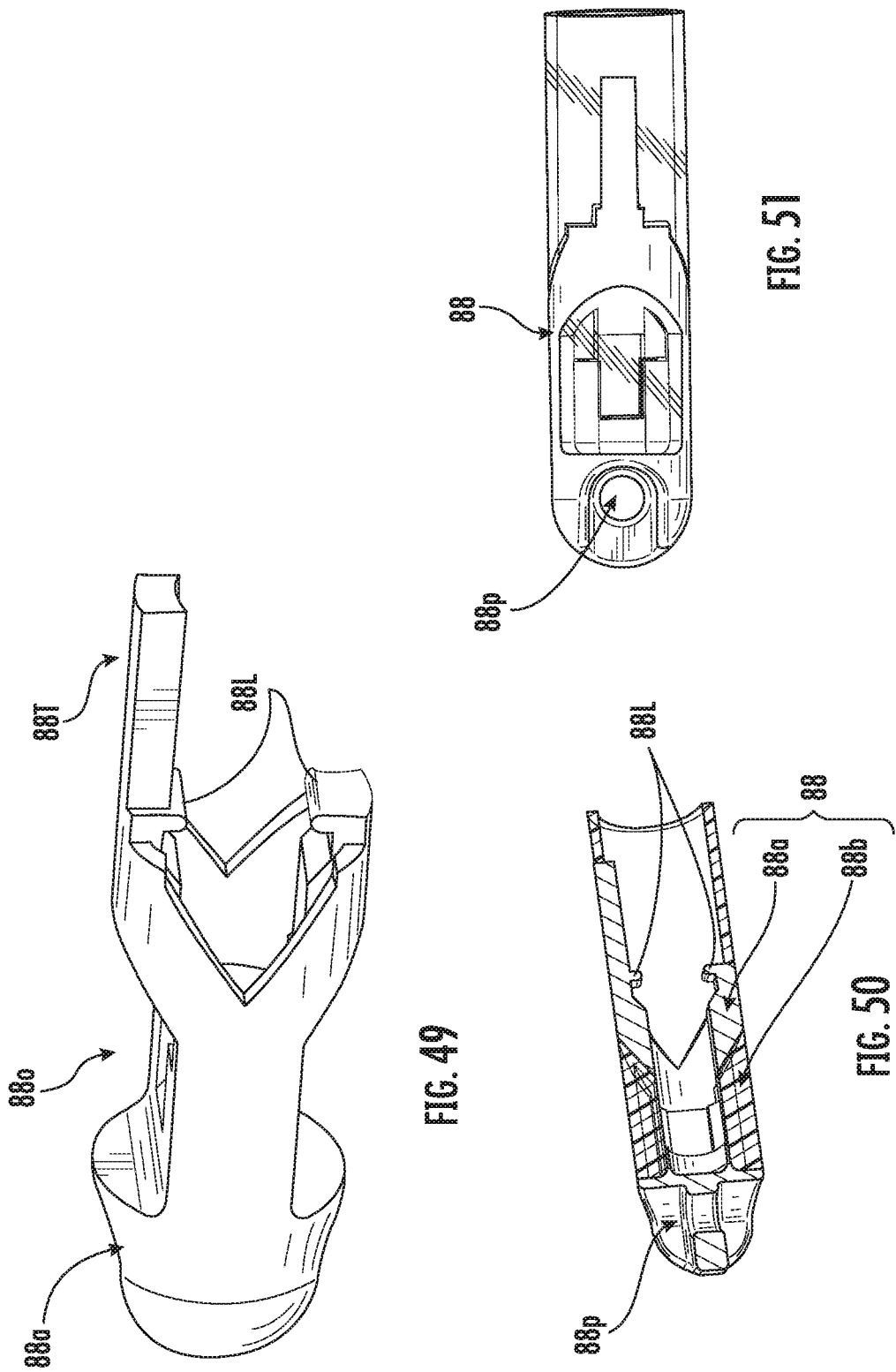

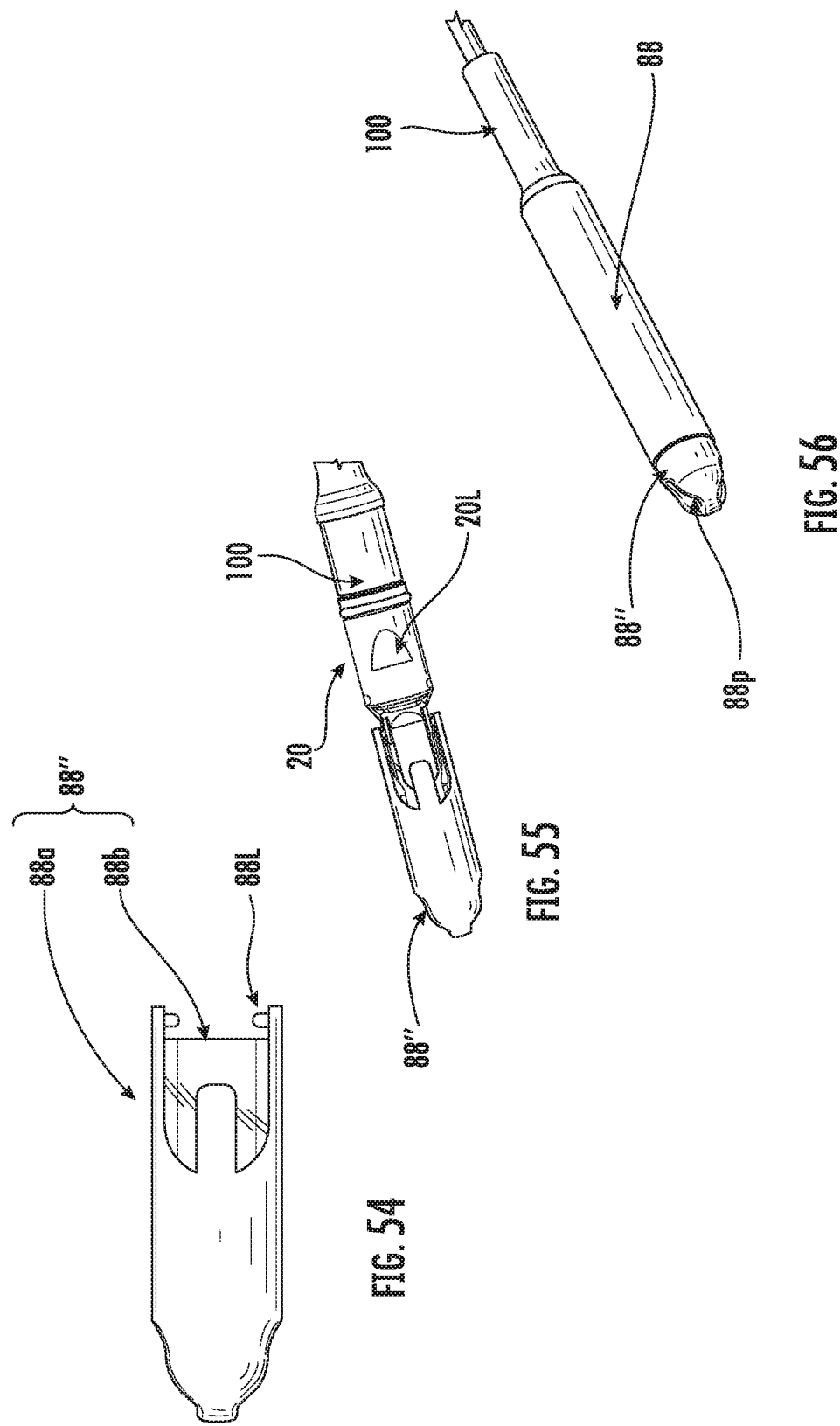

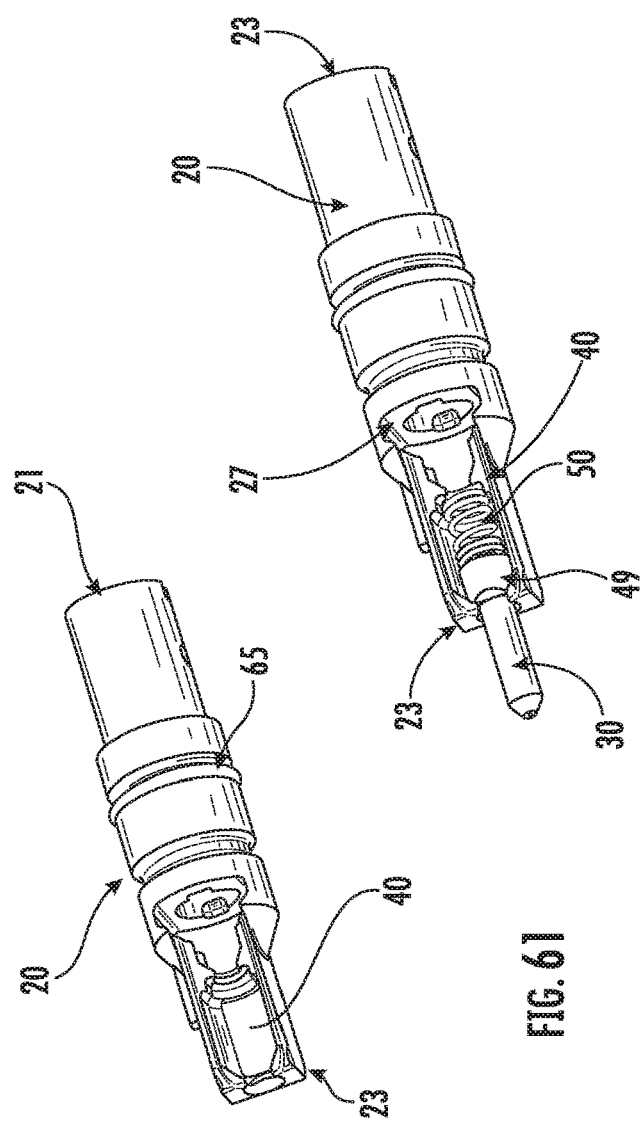
FIG. 61
FIG. 62
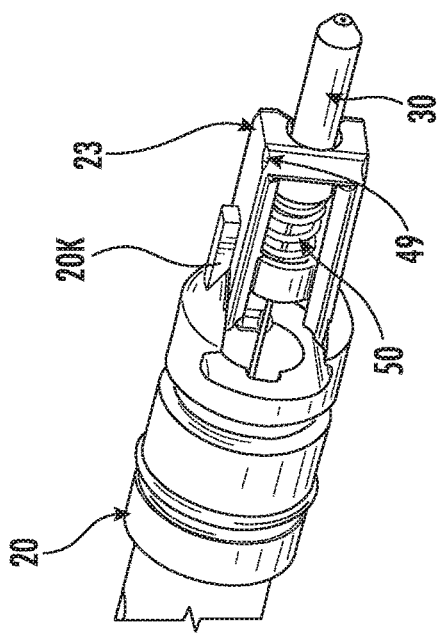
FIG. 63

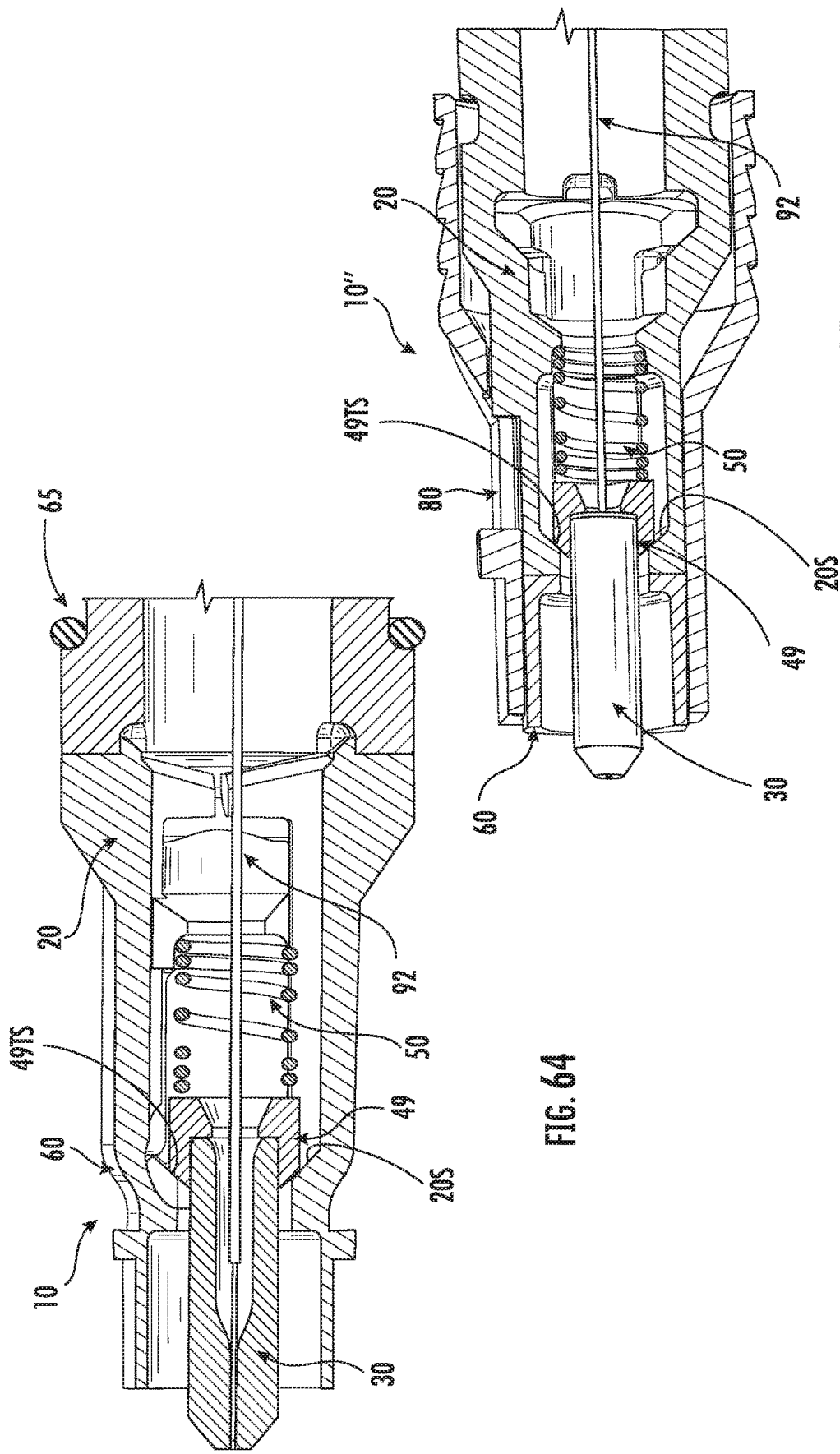

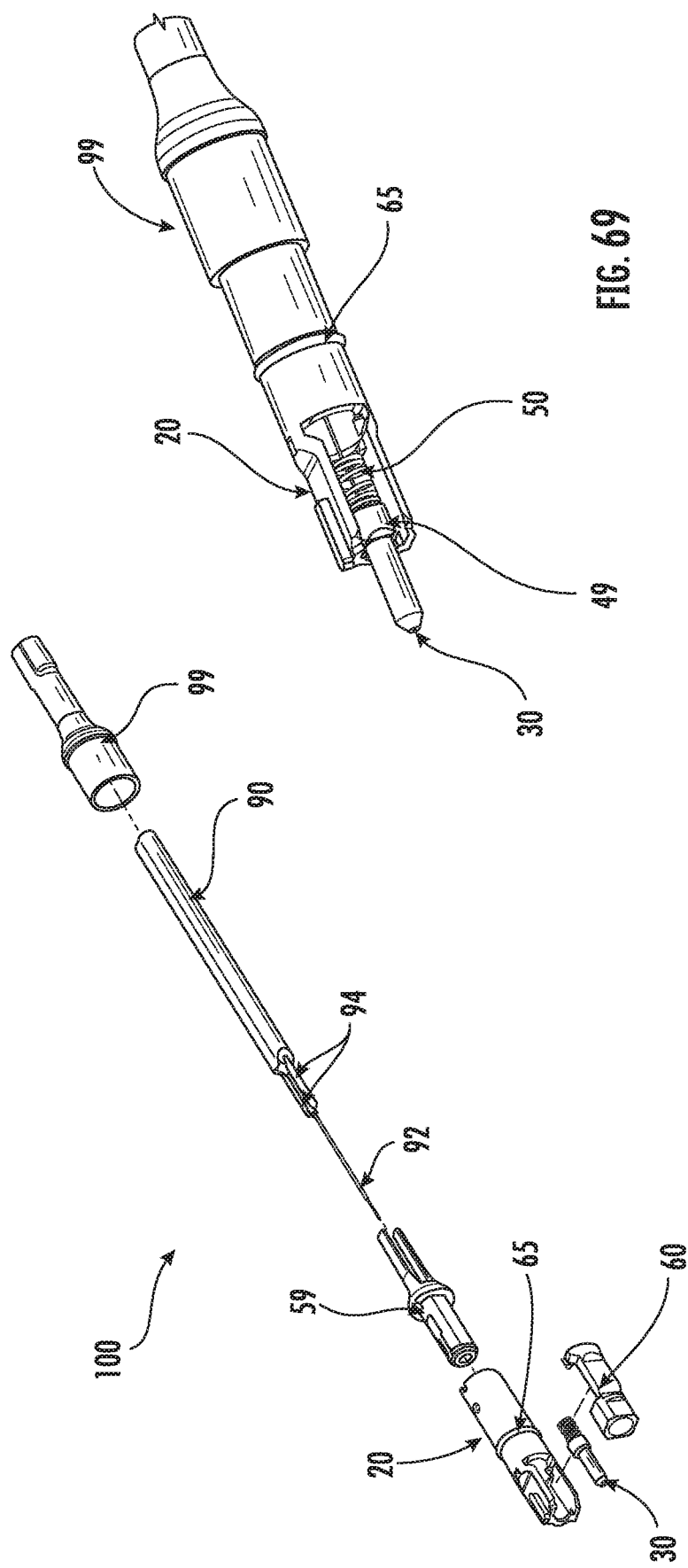

FIBER OPTIC CONNECTORS AND METHODS OF MAKING THE SAME

CROSS-REFERENCE TO RELATED APPLICATIONS

This application is a continuation of International Application No. PCT/US2018/040130, filed Jun. 28, 2018 which claims the benefit of priority to U.S. Application Nos. 62/526,011 filed on Jun. 28, 2017; 62/526,018 filed on Jun. 28, 2017; 62/526,195, filed on Jun. 28, 2017; Ser. No. 16/018,918 filed on Jun. 26, 2018; U.S. patent application Ser. No. 16/018,988 filed on Jun. 26, 2018; U.S. application Ser. No. 16/018,997 filed on Jun. 26, 2018; U.S. application Ser. No. 16/019,008 filed Jun. 26, 2018; U.S. application Ser. No. 16/015,583 filed Jun. 22, 2018; and U.S. application Ser. No. 16/015,588 filed on Jun. 22, 2018, the content of which is relied upon and incorporated herein by reference in entirety.

This applications also claims the benefit of priority under 35 USC § 365 of International Patent Application Serial Nos. PCT/US2017/063862 filed on Nov. 30, 2017; PCT/US2017/063938 filed on Nov. 30, 2017; PCT/US2017/063953 filed on Nov. 30, 2017; PCT/US2017/063991 filed on Nov. 30, 2017; PCT/US2017/064027 filed on Nov. 30, 2017; PCT/US2017/064071 filed on Nov. 30, 2017; PCT/US2017/064063 filed on Nov. 30, 2017; PCT/US2017/064072 filed on Nov. 30, 2017; PCT/US2017/064092 filed on Nov. 30, 2017; PCT/US2017/064095 filed on Nov. 30, 2017; PCT/US2018/039484 filed on Jun. 26, 2018; PCT/US2018/039485 filed on Jun. 26, 2018; PCT/US2018/039490 filed on Jun. 26, 2018; PCT/US2018/039494 filed on Jun. 26, 2018; PCT/US2018/039019 filed on Jun. 22, 2018; PCT/US2018/039020 filed on Jun. 22, 2018; all designating the United States of America, and the content of which is relied upon and incorporated herein by reference in its entirety.

FIELD

The disclosure is directed to fiber optic connectors along with methods for making fiber optic connectors. More specifically, the disclosure is directed to fiber optic connectors having improved or simplified designs along with methods of making.

BACKGROUND

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for outdoor environments hardened fiber optic connectors were developed. One of the most commercially successful hardened fiber optic connector is the OptiTap® connector sold by Corning Optical Communications LLC of Hickory, N.C., such as disclosed in U.S. Pat. Nos. 7,090,406 and 7,113,679 (the '406 and '679 patents). The OptiTap® connector is a hardened male plug connector for terminating a fiber optic cable and the assembly is configured for optical connection such as with a complementary receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as the well-known SC connector.

FIGS. 1A-IC are prior art depictions showing various stages of mating of a preconnectorized cable 1 having a plug connector 5 such as an OptiTap® connector with a receptacle 3. Receptacle 3 mates plug connector 5 with a standard SC connector (i.e., a non-hardened connector) at a second end (not visible in these views) using an adapter sleeve for aligning ferrules when mating plug connector 5 with the a non-hardened connector. Protection of the non-hardened connector side of the receptacle is typically accomplished by mounting the receptacle 3 through a wall of an enclosure or the like so that the non-hardened end of the receptacle is disposed inside the enclosure for environmental protection of the non-hardened connector. As shown by FIGS. 1A-1C, the other end of the receptacle 3 is accessible for receiving the plug connector 5 at the wall of the enclosure. Other applications may mount the receptacle 3 inside an enclosure on a bracket or the like.

Receptacle 3 allows an optical connection between the hardened connector such as the OptiTap® male plug connector with a non-hardened connector such as the SC connector at nodes in the optical network that typically transition from an outdoor space to an enclosed and protected space. Receptacle 3 is described in further detail in U.S. Pat. No. 6,579,014. Receptacle 3 includes a receptacle housing and an adapter sleeve disposed therein. The receptacle 3 receives a non-hardened connector at a second end as represented by the arrow pointing to the left. The receptacle 3 typically requires mounting through a wall of a closure, or inside the closure, such as a closure mounted on the side of subscribers premises, disposed in an underground vault or on a pole for protecting the non-hardened connector for outside plant deployments.

Network operators face many challenges for building, deploying and connecting subscribers to outside plant communication networks such as Fiber-to-the-Home (FTTH) or Fiber-to-the-location (FTTx) networks. Besides right of way access for the communication networks, network operators may have limited space to available on existing poles or in existing vaults for mounting devices. Initially, conventional hardened fiber optic connectors were typically mounted on robust and relatively stiff fiber optic cables, and slack storage for these fiber optic cables may also consume limited space or become unsightly in aerial deployments. Further as outside plant deployments evolved many network operators desired to route the fiber optic cable assembly with the connector through an existing wall of a subscriber premises and into the building or route the fiber optic cable assembly with the connector through a buried duct. Thus, network operators because sensitive to the size of the fiber optic connector for these types of deployment applications.

Consequently, there exists an unresolved need for fiber optic connectors that allow quickly and easy deployment and connectivity in a simple and efficient manner while still being cost-effective.

SUMMARY

The disclosure is directed to fiber optic connectors and methods of making fiber optic connectors as described and recited in the claim. The concepts disclosed allow a compact form-factor for an optical fiber connector suitable for numerous applications and variations as desired.

One aspect of the disclosure is directed to a fiber optic connector comprising a ferrule assembly, a housing, and a cap. The ferrule assembly comprising a ferrule comprising at least one fiber bore, a ferrule holder and a resilient member. The housing comprises a rear end and a front end with a longitudinal passageway extending from the rear end to the front end. The housing comprises a front portion and a rear portion, where the front portion comprise a ferrule assembly side-loading pocket. The cap covers the ferrule assembly side-loading pocket when attached to the housing.

Another aspect of the disclosure is directed to a fiber optic connector comprising a ferrule assembly, a housing, and a cap. The ferrule assembly comprising a ferrule comprising at least one fiber bore, a ferrule holder and a resilient member, where the ferrule holder comprises one or more tapered surfaces. The housing comprises a rear end and a front end with a longitudinal passageway extending from the rear end to the front end. The housing comprises a front portion and a rear portion, where the front portion comprise a ferrule assembly side-loading pocket. The cap comprises at least one latch arm, and the cap covers the ferrule assembly side-loading pocket when attached to the housing.

Still another aspect of the disclosure is directed to a fiber optic connector comprising a ferrule assembly, and a cap. The ferrule assembly comprising a ferrule comprising at least one fiber bore, a ferrule holder and a resilient member, where the ferrule holder comprises asymmetric alignment features, and one or more tapered surfaces. The housing comprises a rear end and a front end with a longitudinal passageway extending from the rear end to the front end. The housing comprises a front portion and a rear portion, where the front portion comprise a ferrule assembly side-loading pocket. The cap covers the ferrule assembly side-loading pocket when attached to the housing.

Yet another aspect of the disclosure is directed to a fiber optic connector comprising a ferrule assembly, a housing, and a cap. The ferrule assembly comprising a ferrule comprising at least one fiber bore, a ferrule holder and a resilient member, where the ferrule holder comprises asymmetric alignment features. The housing comprises a rear end and a front end with a longitudinal passageway extending from the rear end to the front end. The housing comprises a front portion and a rear portion along with a transition region disposed between the front portion and the rear portion of the housing, where the front portion comprise a ferrule assembly side-loading pocket, and the rear portion of the housing comprise a keying portion that extend into a portion of the transition region, and at least one locking feature integrally formed in the rear portion of the housing, and the at least one locking feature is disposed about 180 degrees from the keying portion. The cap covers the ferrule assembly side-loading pocket when attached to the housing.

A further aspect of the disclosure is directed to a fiber optic connector comprising a ferrule assembly, a housing, and a cap. The ferrule assembly comprising a ferrule comprising at least one fiber bore, a ferrule holder and a resilient member, where the ferrule holder comprises asymmetric alignment features comprising two alignment features having respective tapered surface disposed on a first side of the ferrule holder, and a third alignment feature disposed on at second side that is opposite the first side of ferrule holder. The housing comprises a rear end and a front end with a longitudinal passageway extending from the rear end to the front end. The housing comprises a front portion and a rear portion along with a transition region disposed between the front portion and the rear portion of the housing. The front portion of the housing comprising a ferrule assembly side-loading pocket. The rear portion of the housing comprises a female key that extends into a portion of the transition region, and at least one locking feature integrally formed in the rear portion of the housing, and the at least one locking feature is disposed about 180 degrees from the keying portion. The cap covers the ferrule assembly side-loading pocket when attached to the housing.

Another aspect of the disclosure is directed to a fiber optic connector comprising a ferrule assembly, a housing, a cap, a cable adapter and a cable. The ferrule assembly comprising a ferrule comprising at least one fiber bore, a ferrule holder and a resilient member, where the ferrule holder comprises asymmetric alignment features comprising two alignment features having respective tapered surface disposed on a first side of the ferrule holder, and a third alignment feature disposed on at second side that is opposite the first side of ferrule holder. The housing comprises a rear end and a front end with a longitudinal passageway extending from the rear end to the front end. The housing comprises a front portion and a rear portion along with a transition region disposed between the front portion and the rear portion of the housing. The front portion of the housing comprising a ferrule assembly side-loading pocket. The rear portion of the housing comprises a female key that extends into a portion of the transition region, and at least one locking feature integrally formed in the rear portion of the housing, and the at least one locking feature is disposed about 180 degrees from the keying portion. The cap covers the ferrule assembly side-loading pocket when attached to the housing. A cable adapter sized for fitting into the rear opening of the housing, and a cable comprising an optical fiber. The cable being attached to the cable adapter.

Fiber optic cables disclosed may also comprise a cable adapter is sized for fitting into the rear opening of the housing, or a locking feature for securing the fiber optic connector for mating with a suitable device.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 5 is a detailed exploded view of the fiber optic connector of FIG. 2 showing the assembly of the ferrule assembly keying feature;

FIG. 6 is a detailed exploded view showing the alignment of the ferrule holder with the ferrule pocket for assembly and along with the alignment of the cap to the front of the housing and alignment of the cable adapter at the rear for assembly;

FIG. 7 shows the resilient member positioned on the ferrule holder before assembling the ferrule assembly into the housing;

FIGS. 8 and 9 are detailed perspective views of the ferrule assembly disposed within the housing showing the cooperation between the ferrule holder and the housing features;

FIGS. 11-13 are longitudinal sectional views showing the fiber optic connector as a portion of the cable assembly;

FIGS. 14 and 15 are assembly views showing a heat shrink being attached over a portion of the housing and the fiber optic cable;

FIG. 18 is a side assembly view showing the cooperation of the ferrule holder features with the housing features when the ferrule holder is biased against the housing;

FIG. 19 is a transverse sectional views showing the cooperation of the ferrule holder features with the housing features;

FIG. 26 is a perspective view of another cable adapter that fits into a rear opening of the housing of the fiber optic connector;

FIG. 27 is a cross-sectional view the cable adapter of FIG. 26;

FIGS. 30 and 31 are views of a portion of another fiber optic cable assembly having a cable adapter with flexures for cable bend-strain relief;

FIGS. 32-35 are various views of a conversion housing that may be used with the fiber optic connector concepts disclosed herein for changing the mating footprint of the fiber optic connector;

FIGS. 46 and 47 respectively are a perspective views of a dust cap for the fiber optic connector of FIG. 2 and dust cap installed on the fiber optic connector;

FIG. 48 is a longitudinal sectional view of the rear front portion of the fiber optic cable with dust cap attached;

FIG. 49 is a perspective view of the skeleton of the dust cap of FIGS. 46 and 47 before the second materials is added;

FIGS. 50 and 51 respectively are cross-sectional and plan views of the dust cap of the FIGS. 46 and 47 having the second material added to the skeleton of the dust cap;

FIGS. 54 and 55 respectively are perspective views of another dust cap for the fiber optic connector and the dust cap installed on the connector;

FIG. 56 is a perspective view of a sealing member disposed over the dust cap and cable assembly of FIG. 55;

FIGS. 58-61 are various views showing details of the front end of the connector housing of the fiber optic connector depicted in FIG. 57;

FIGS. 62 and 63 depict perspective views of the ferrule assembly assembled into the housing of the fiber optic connector of FIG. 57;

FIGS. 64 and 65 are sectional views of the front end of the assembled fiber optic connector of FIG. 57;

FIGS. 67-70 are perspective views of yet another fiber optic connector similar to the fiber optic connector of FIG. 57 using a different cap.

DETAILED DESCRIPTION

Figures 1A, 1B, 1C:
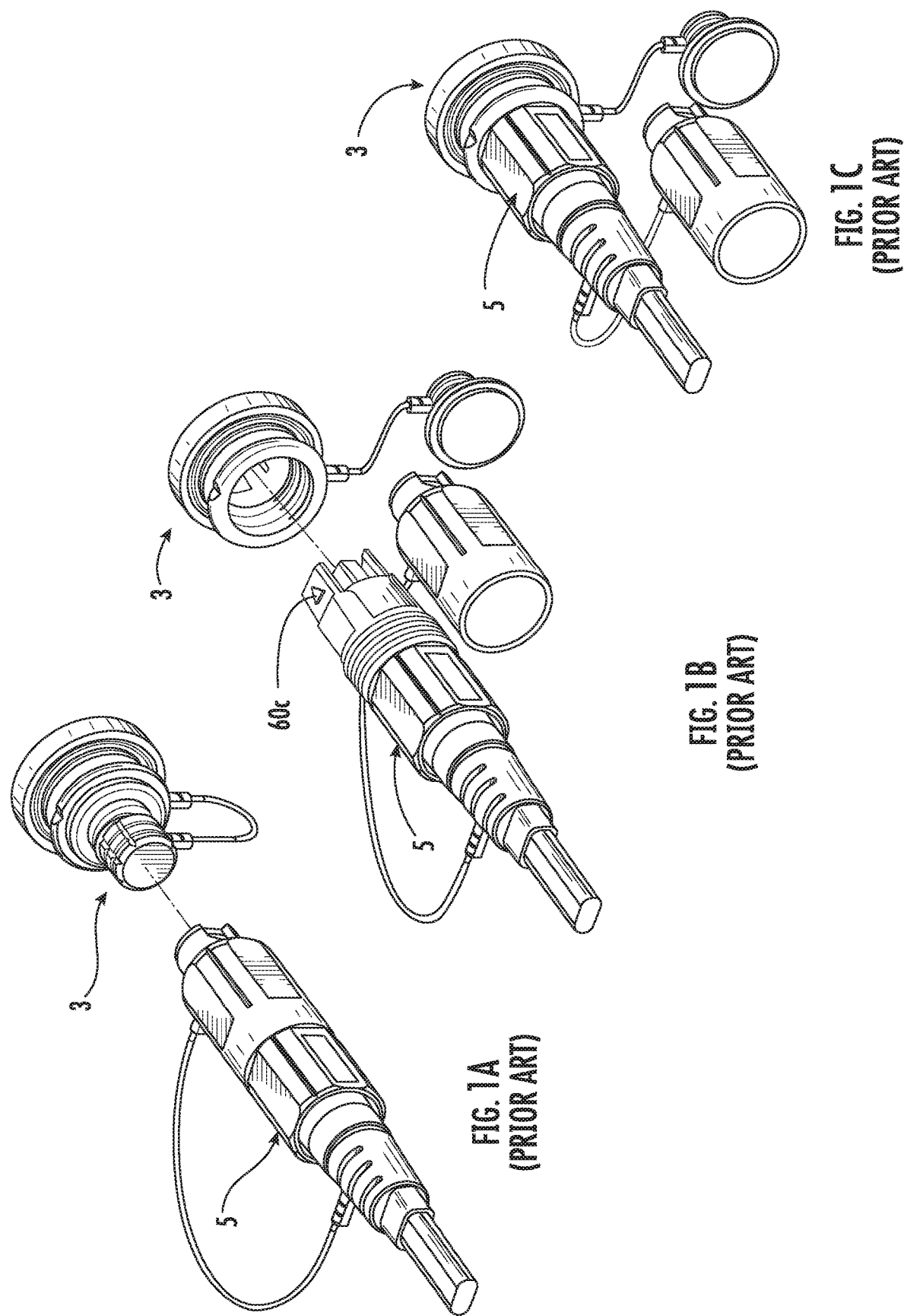
FIGS. 1A-1C are prior art depictions showing various stages of mating of a prior art preconnectorized cable having a conventional hardened plug connector with a receptacle.

Reference will now be made in detail to the embodiments of the disclosure, examples of which are illustrated in the accompanying drawings. Whenever possible, like reference numbers will be used to refer to like components or parts.

The concepts disclosed advantageously provide fiber optic connectors that allow streamlined manufacture and assembly along with easy and intuitive connectivity with other devices while still having a compact footprint. The fiber optic connectors disclosed are explained and depicted with several different embodiments and various other alternative components or optional features that may be incorporated into one or more of the fiber optic connector (hereinafter "connector") concepts as desired.

By way of explanation, several different variations of housings and other concepts are disclosed that can be modified to use with connector constructions where the ferrule assembly loads from a side-loading pocket at a front end of the housing and a cap attaches to the front end of the housing. The side-loading pocket is advantageous for providing fiber access for aligning and guiding the optical fiber into the ferrule assembly during manufacturing. Some embodiments may advantageously use fewer parts while providing robust and reliable optical performance. Other constructions may increase the part count of the connectors for various reasons.

In one aspect the fiber optic connectors (hereinafter "connector") disclosed advantageously comprise a housing that provides a first connector footprint that interfaces with other devices for making an optical connection. The first connector footprints may be defined by housings having a rear portion (RP) and a front portion (FP). First connector footprints may also be further defined by a transition region (TR) disposed between the rear portion (RP) and the front portion (FP) of the housing.

In one explanatory example, the housing comprises a part of the rear portion (RP) having a round cross-section (RCS) and a part of the front portion having a non-round cross-section (NRCS). The front portion (FP) or the rear portion (RP) of the housing may be further defined in various configurations as disclosed herein while retaining a part of the rear portion (RP) with the round cross-section (RCS) and a part of the front portion (FP) having a non-round cross-section (NRCS). By way of explanation, the rear portion (RP) may comprise a keying portion and the front portion (FP) may have a rectangular cross-section that also provides a first orientation feature for the connectors for alignment during mating and inhibit insertion into a non-compliant device or port. The keying portion of the connector cooperates with a key on a complimentary port for protecting the mating interface from the attempted insertion of a non-compliant connector. The keying portion on the housing may also aids the user during blind insertion of the connector into a port to determine the correct rotational orientation when a line of sight is not possible or practical.

Housings disclosed herein define the mating interface for a complimentary device suitable for mating with the connector and the connector footprints disclosed are useful for inhibiting insertion into a non-compliant port or device and damaging either the connector or the device along with assuring a suitable optical operation for the optical connection since the connector and device are matched. Moreover, the housings may have features that aid in the proper alignment or orientation of the connector with the complimentary device such as markings, keys, keyways, etc. without significantly changing the primitive form-factors of the housings that are disclosed herein. By way of example, even though a round cross-section may include another feature such as a key or a keyway it is still considered to be a round cross-section. Additionally, housing may have other features such as locking features for securing the optical mating of the connector with a complimentary device. The locking feature may provide a predetermined retention force of 50 pounds or more with a complimentary device before releasing.

By way of another example, non-round cross-section (NRCS) for housings disclosed herein may comprise a part of the front portion (FP) having a rectangular cross-section having rounded corners (RC). The rectangular cross-section with rounded corners (RC) is a non-round cross-section (NRCS) due to the rectangular cross-section. The rounded corners (RC) may be sized so they have a similar outer dimension (OD) as a dimension (D) for the round cross-section (RCS) or not. The rounded corners (RC) may provide stability and snug fit for the mated connector within a port or device when side-pull forces are experienced to inhibit undue optical attenuation by having the round corners transition between the front portion (FP) to the rear portion (RP). The housing footprints disclosed herein may be still further defined by other geometry of the housing(s). For instance, the front portion (FP) of the housing may further comprise another cross-section portion (ACSP). By way of explanation, the another cross-sectional portion (ACSP) may comprise a SC footprint. The SC footprint can, in part, be similar to the inner housing of a conventional SC connector. This particular housing footprint is useful for allowing the connectors disclosed herein to be backwards compatible into existing devices or ports using established connector footprints as desired.

The concepts described herein are suitable for making both indoor and outdoor fiber optic cable assemblies using the connectors disclosed such as drop or distribution cables. Further, the fiber optic connectors disclosed may allow for the use of one or more additional components for changing the connector form-factor or footprint defined by the particular housing. By way of example, a conversion housing may cooperate with the housing of the connector for changing the fiber optic connector from the first connector footprint defined by the housing to a second connector footprint at least partially defined by the conversion housing. Consequently, the connectors disclosed herein may be converted to be compatible as other well-known commercial connectors for Fiber-to-the-Home applications such as an SC connector or an OptiTap® connector such as available from Corning Optical Communications of Hickory, N.C. Of course the concepts disclosed herein may be used with other fiber optic connector types whether hardened or not and are not limited to these particular connector conversions. Likewise, the connector designs disclosed may be hybrid designs with both optical and electrical connectivity. Electrical connectivity may be provided by contacts on or in a portion of the housing of the connector and may be useful for power or data as desired for applications such as FTTx, 5G networks, industrial applications or the like. These and other additional concepts are discussed and disclosed in illustrative detail with reference to FIGS. herein.

Figure 23:
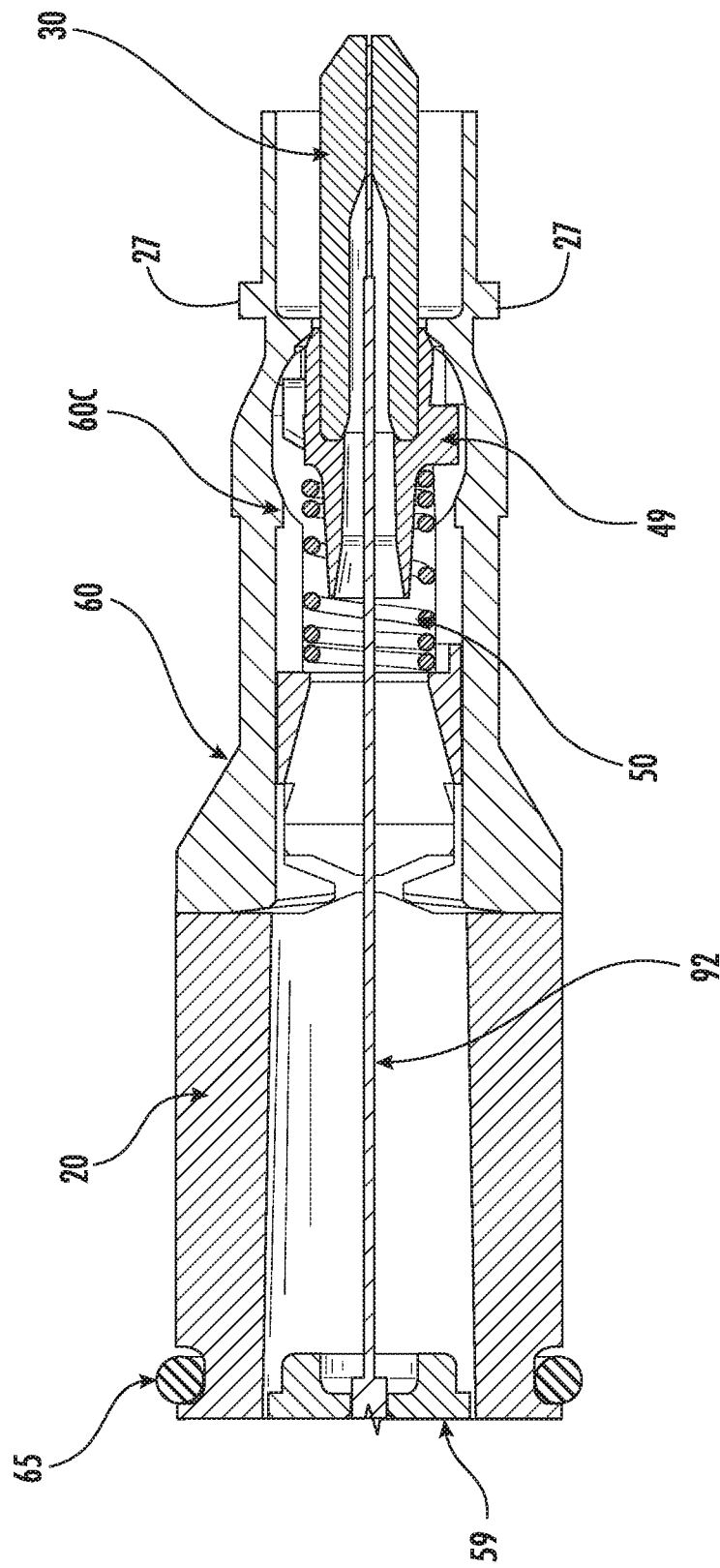
FIG. 23 is a close-up longitudinal sectional view of the fiber optic connector of FIG. 2 depicting the wall details of the cap for controlling the displacement of the ferrule holder.
Figure 24:
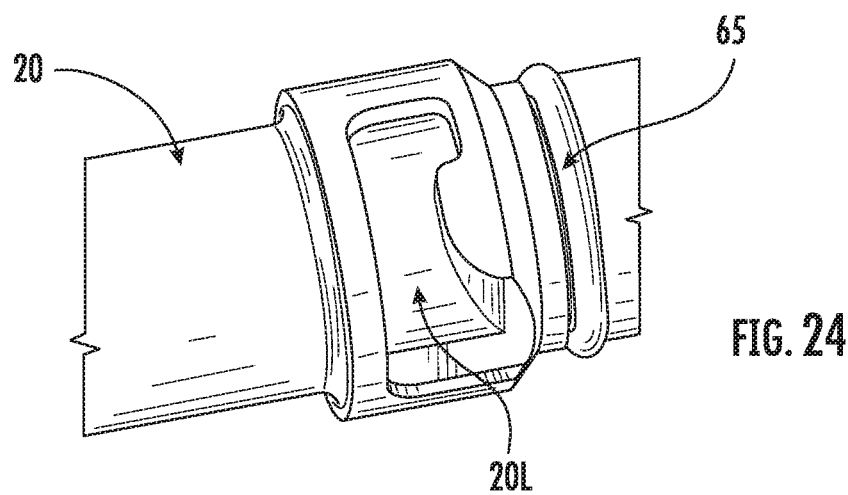
FIGS. 24 and 25 are perspective views of alternative housings depicting other locking feature designs for use with the fiber optic connectors disclosed.
Figure 25:
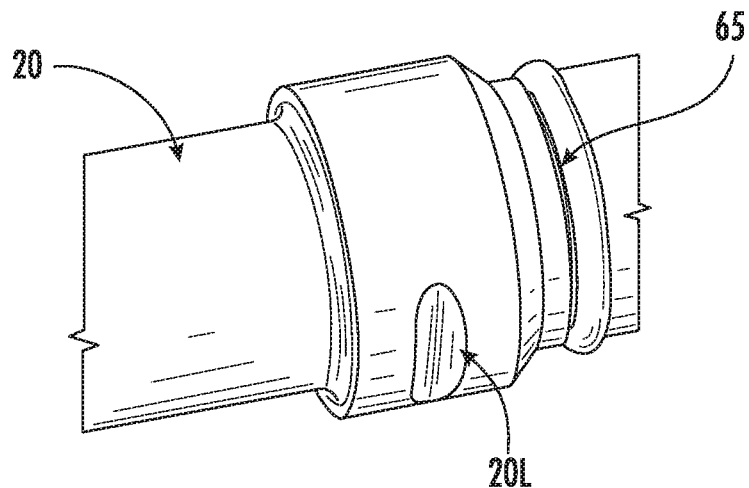

Several different constructions of fiber optic cable assemblies 100 (hereinafter "cable assemblies") comprising a connector 10 and variations of connector 10 are disclosed herein. FIGS. 2-23 depict various views of a first explanatory connector 10 according to the concepts disclosed. FIGS. 24 and 25 disclose concepts related to alternative locking features 20L for use with housings 20 disclosed as appropriate. FIGS. 26-29 disclose another cable adapter that may be used with connectors 10 disclosed herein. FIGS. 32-35 depicts connector 10 having a conversion housing for changing the connector footprint of connector 10 to an SC connector footprint. FIGS. 38-45 disclose cable assemblies 100 comprising connectors 10 having a first connector footprint where the connectors 10 may be convertible to connectors 10' having a second connector footprint using a conversion housing 80,82. FIGS. 46-56 depict dust caps for connectors 10. FIGS. 57-66 depict a design of another connector 10, and FIGS. 67-71 depict a design of yet another connector 10.

Figure 2:
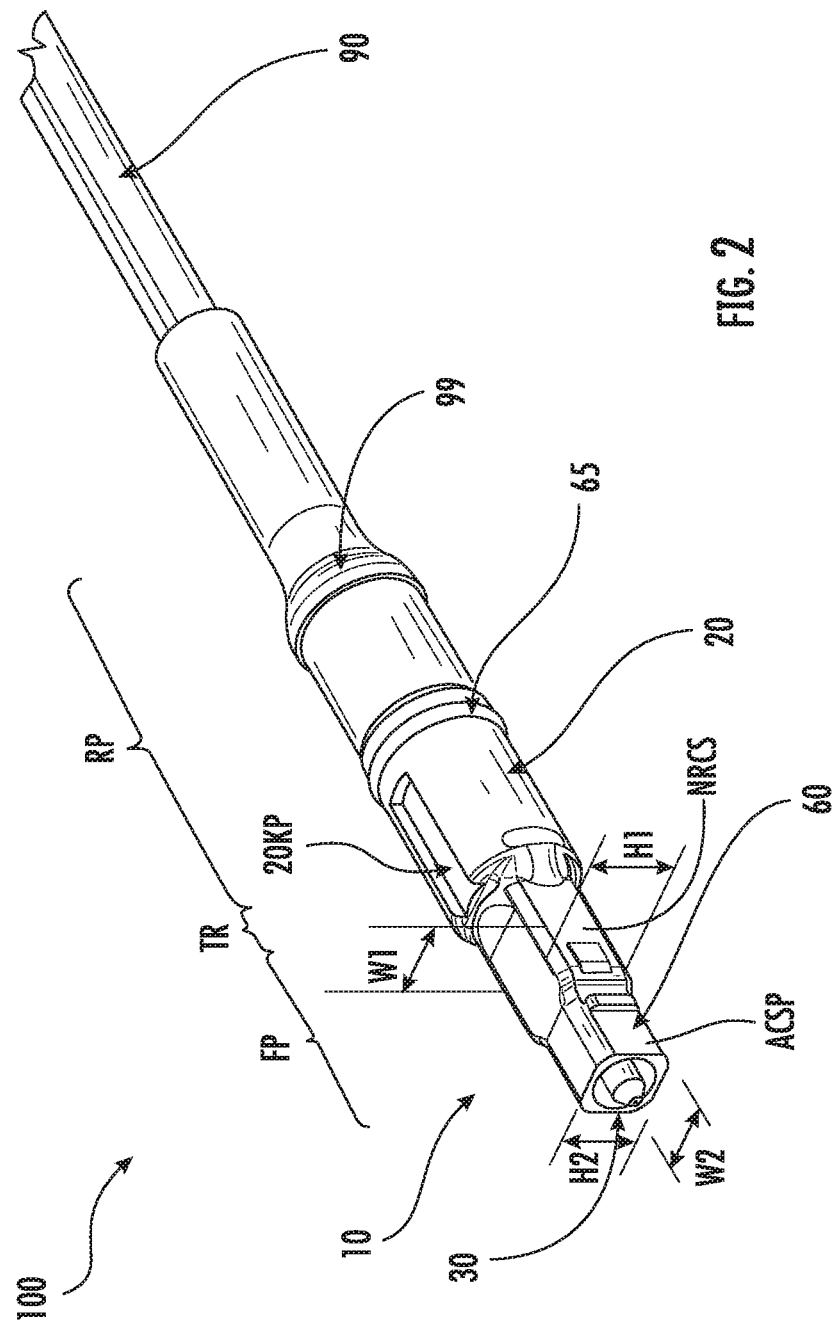
FIG. 2 is a perspective view of a fiber optic cable assembly having a fiber optic connector with a housing according to one aspect of the disclosure.
Figure 3:
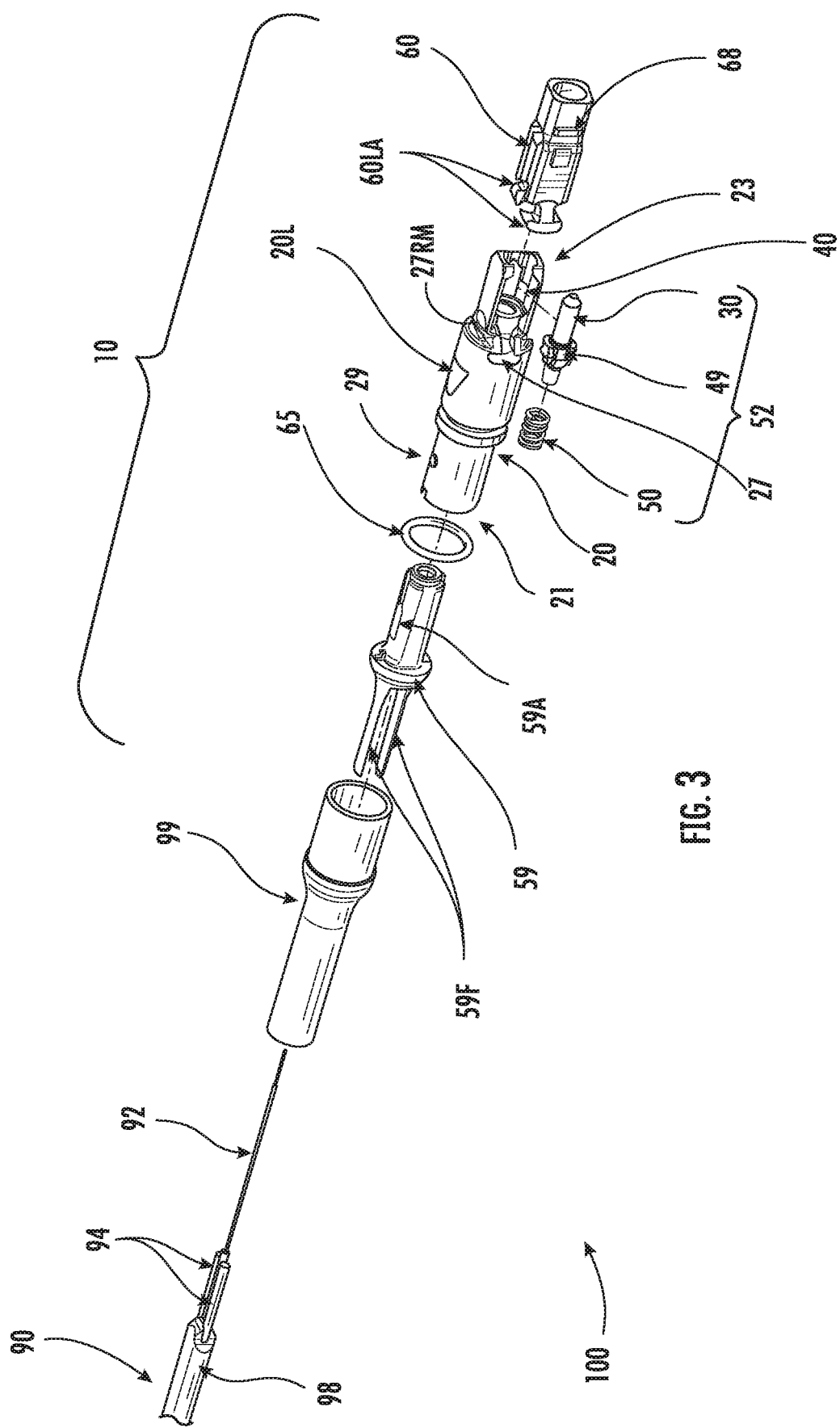
FIG. 3 is a partially exploded view of the fiber optic cable assembly of FIG. 2 shown with the locking feature pointed upward for showing the ferrule loading pocket.

Returning to the first explanatory fiber optic connector 10, FIG. 2 is a perspective view and FIG. 3 is an exploded view of an explanatory cable assembly 100 comprising a fiber optic cable 90 (hereinafter "cable") attached to connector 10. Connector 10 comprises housing 20, a ferrule assembly 52 and a cap 60. Ferrule assembly 52 comprises a ferrule 30, a ferrule holder 49 and a resilient member 50. Cap 60 attaches at a front side of housing 20, and aids in defining the connector footprint at the front portion (FP) of the connector 10.

Ferrule holder 49 may comprise one or more tapered surfaces 49TS for aligning the ferrule assembly 52 when biased to the forward position against housing 20 by resilient member 50. In the embodiment of FIG. 2, ferrule holder 49 comprises asymmetric alignment features for aligning and seating the ferrule holder assembly 52, thereby inhibiting the movement of the ferrule assembly 52 during manufacturing. This aligning and seating of the ferrule holder assembly 52 in housing allows the housing 20 to be used as a fixture during manufacturing and provide repeatability to the manufacturing for connector specifications such as apex offset and optical performance.

Figure 17:
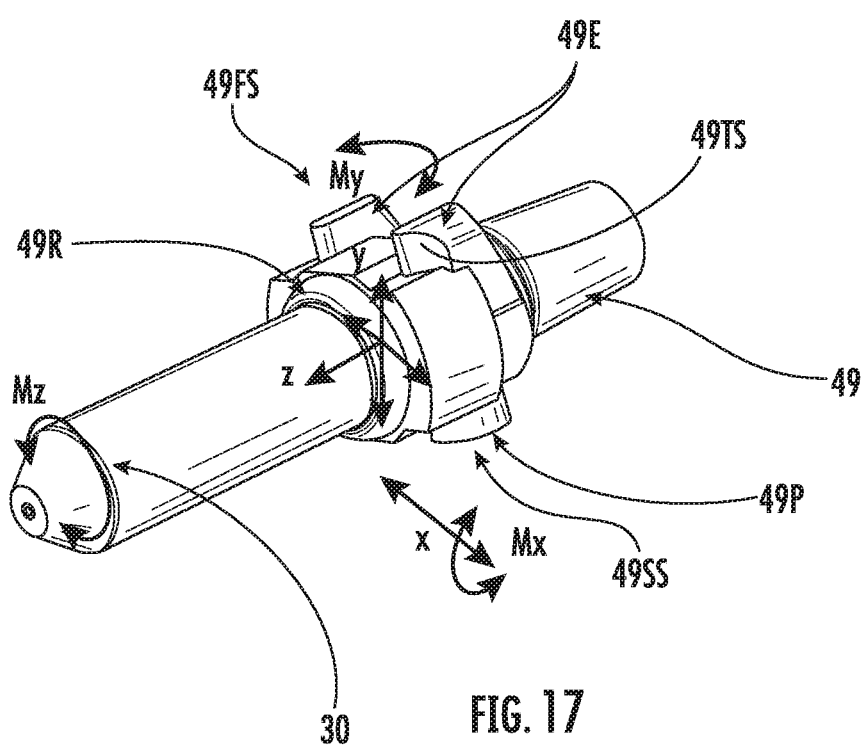
FIG. 17 is a perspective view of the ferrule holder and ferrule of FIG. 2.

Specifically as depicted in FIG. 17, ferrule holder 49 has three alignment features as discussed below. Two alignment features 49E are disposed on a first side 49FS of ferrule holder 49 and a third alignment feature 49P that is disposed on a second side 49SS opposite side of ferrule holder 49. The two alignment features 49E disposed on the first side 49FS of ferrule holder 49 are similar. The third alignment feature 49P is disposed in the middle of the second side 49SS of ferrule holder 49 and is different than the alignment features 49E disposed on the first side. The concepts disclosed herein may be used with other ferrule holders that may or may not be asymmetric as well.

Housing 20 of connector 10 also comprises a ferrule assembly side pocket 40 for allowing the ferrule assembly 52 to be inserted into housing 20 from the side of housing 20. Using housing 20 with one or more open sides provides improved access and vision to the passageway 22 of the housing at the front portion FP for assembly. The ferrule assembly side pocket 40 of housing 20 comprises an open passageway to the longitudinal passageway or axis of housing 20 so that the ferrule 30 may be assembled from the side of the housing unobstructed. When assembled, cap 60 covers the ferrule assembly side pocket 40.

Figure 13:
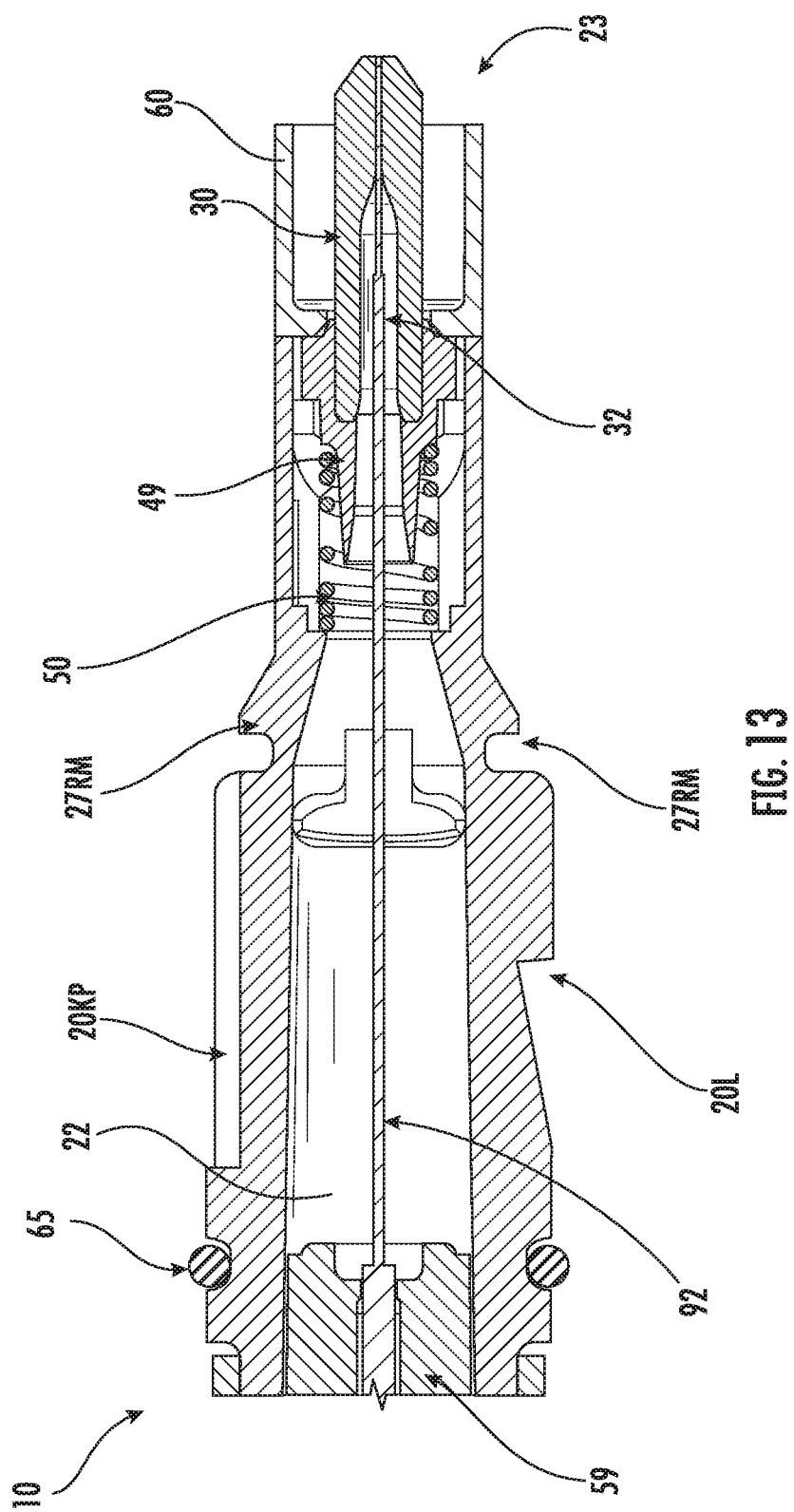

Housing 20 comprises a rear end 21 and a front end 23 with a longitudinal passageway 22 extending from the rear end 21 to the front end 23 as shown in FIG. 13. Passageway 22 allows one or more optical fibers 92 of cable 90 to pass through the housing 20 for insertion into a fiber bore 32 of ferrule 30 such as depicted in FIGS. 11-13.

Connector 10 may also comprise a cable adapter 59 inserted into an opening 21A at the rear end 21 of housing 20 as depicted in FIG. 3. Cable adapter 59 allows the connectors 10 to be adapted to different cables such as round, flat, different sizes by merely selecting the appropriate sized cable adapter 59 for the desired cable type. Cable 90 may comprise at least one optical fiber 92, one or more strength components 94 and a cable jacket 98, but other cable constructions are possible for use with the connectors disclosed.

As shown, housing 20 comprises a part of the rear portion RP of the connector 10 having a round cross-section RCS and a part of the front portion of the connector 10 having a non-round cross-section NRCS.

FIG. 2 shows the different regions of connector 10 formed by the housing 20 and cap 60. As used herein, the transition region TR is disposed between the rear end 21 and the front end 23 where the housing 20 makes a transformational shift in the primitive cross-sectional shapes from a part of a rear portion RP to a part of the front portion FP. As used herein, a primitive cross-section means the outer perimeter of the cross-section without regard for the internal features of the cross-section. Further, portions of the cross-sections may include other features that modify the shape of the primitive cross-sections as desired such as a keying feature, retention feature or a locking feature, while still practicing the concepts of the transition region TR or front/rear portions as disclosed herein. For instance, a front portion FP may have rounded corners or chamfered corners while still being a rectangular cross-section.

Transition region TR is disposed between the rear portion RP and the front portion FP of the connector 10. In this embodiment, the front portion FP of the connector 10 is formed by housing 20 and cap 60 and comprises a rectangular cross-section that provides a first orientation feature for the connectors for alignment during mating. The non-round cross-section NRCS has the rectangular cross-section with a width W1 and a height H1 as shown in FIG. 2. The rectangular cross-section provides the first orientation feature since the rectangular portion may only be inserted into a complimentary device or port in certain orientations due to its rectangular shape, thereby inhibiting incorrect insertion or insertion into non-compliant devices or ports. The geometry of housing 20 and cap 60 comprises the non-round cross-section NRCS comprising a rectangular cross-section having rounded corners.

The front portion FP formed by housing 20 and cap 60 depicted has more than one primitive cross-sectional shape over its length. Specifically, the front portion FP of housing 20 also comprises another cross-section portion ACSP. By way of explanation, the another cross-sectional portion (ACSP) may comprise a SC footprint. The SC footprint can, in part, be similar to the inner housing of a conventional SC connector. This particular housing footprint at the front portion FP of the connector is useful for allowing the connectors disclosed to be backwards compatible into existing devices or ports using well-established connector footprints as desired. Other embodiments may have connectors configured for LC connector or other known connector footprints as desired.

As best shown in FIG. 2, the front portion FP of housing 20 may comprise another cross-section portion ACSP with a primitive cross-section that is different than the non-round cross-section NRCS. More specifically, the non-round cross-section NRCS changes to another cross-section portion ACSP as shown. As depicted, the another cross-section portion comprises a rectangular cross-section with a width W2 that is less than W1 and a height H2 is similar to height H1. By way of example, height H2 may be equal to height H1. In one embodiment, the another cross-section portion ACSP has a primitive cross-section that is similar to a cross-section near a front end of a SC connector.

As shown, housing 20 also comprises a keying portion 20KP disposed in the rear portion RP of housing 20. As shown, the keying portion 20KP is a subtractive keying portion from the primitive geometric round shape such as the female key or keyway shown in FIG. 2. However, the concepts for the housings 20 may be modified for using connector designs disclosed, and not all of the subtractive keying portion need to be a keyway. For instance, the keying portion 20KP may be defined as a cut section from a part of the rear portion RP of the housing 20 such as cutting a side to be flat, thereby providing a generally D-shaped cross-section to part of the rear portion RP of the housing 20 that has a primitive round cross-section. The keyway portion 20KP may extend into the transition region TR as well as depicted. Further, the keying portion 20KP may also be used with a key on the front portion FP of the housing 20 or not as desired.

Likewise, the rear portion RP of housing 20 may have more than one primitive cross-section shape over its length as desired. Moreover, rear portion RP may include one or more retention features or locking features that alter or modify the cross-section while providing retention or locking in an adapter, port or other suitable device. For instance, housing 20 may also include locking feature 20L comprise features integrated into the housing 20.

Figure 10:
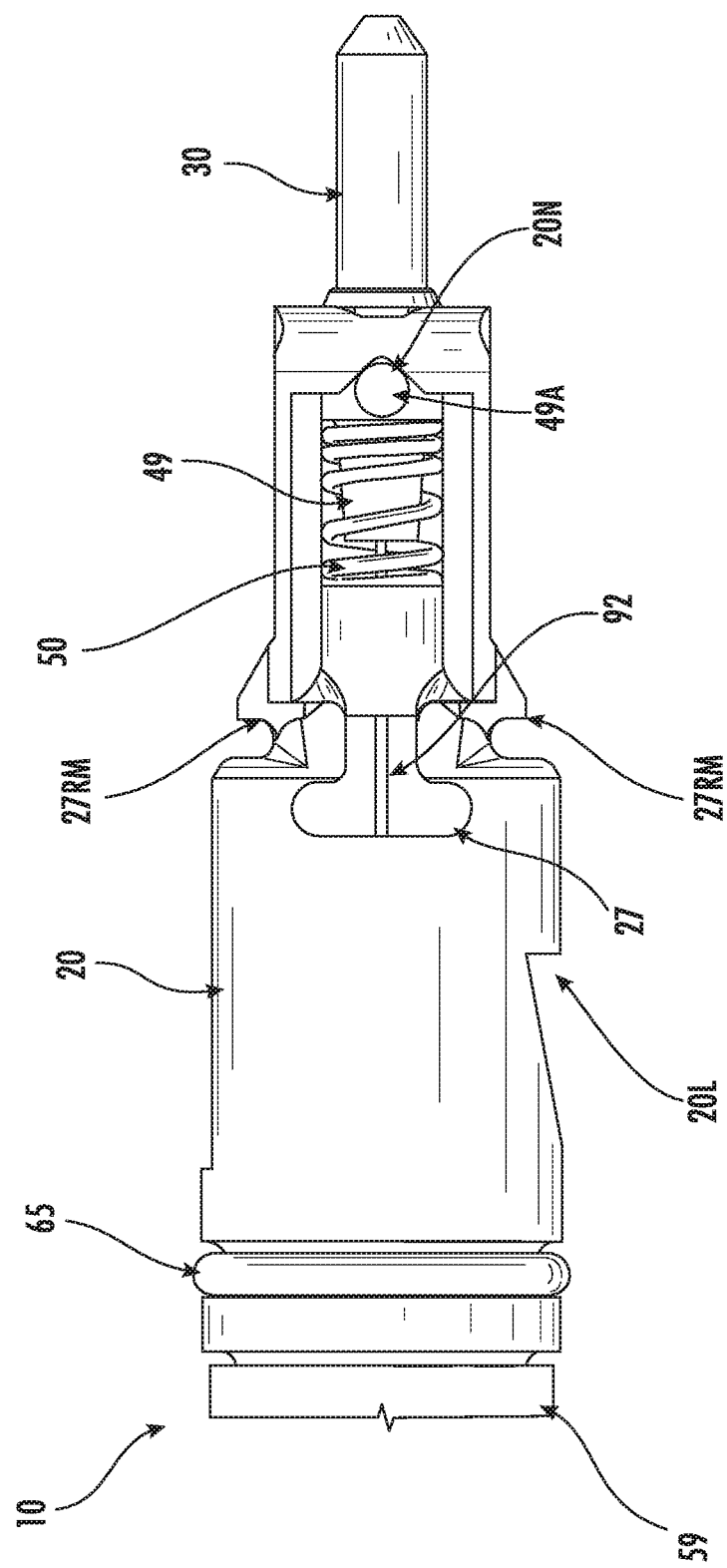
FIG. 10 is a side view of the sub-assembly of FIGS. 8 and 9 showing the ferrule holder cooperation with the housing with the keying feature pointing upward and the locking feature pointed downward.

FIG. 3 depicts a locking feature 20L of housing 20 orientated to point upwards in this view. As best shown in FIG. 10, locking feature 20L is a ramp with a ledge for securing connector 10 in a complimentary port or device in this embodiment. In this case, locking feature 20L has subtractive geometry from the primitive round cross-section RCS of the rear portion RP of housing 20 as discussed herein.

Figure 28:
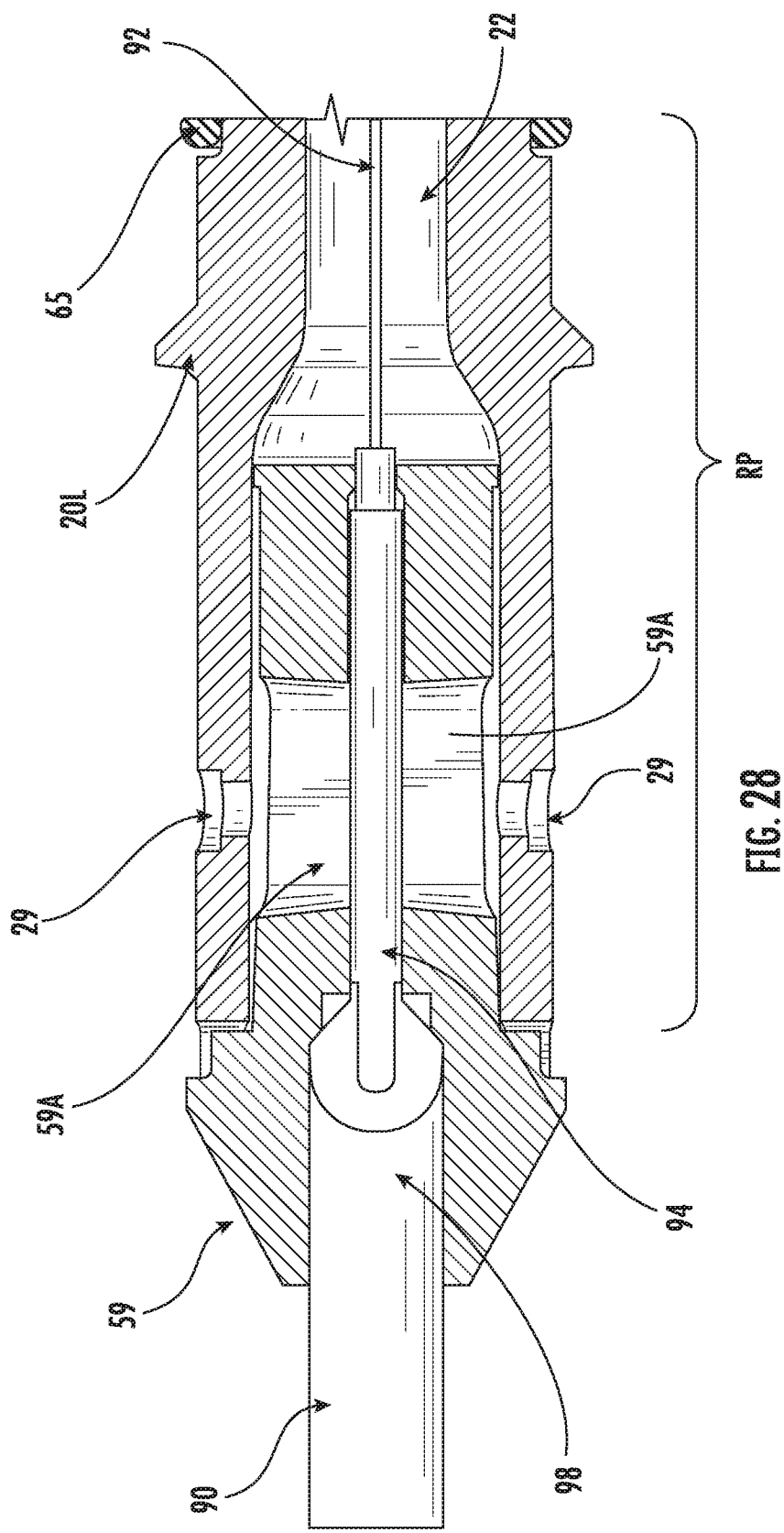
FIG. 28 is a longitudinal sectional view of the rear portion of an explanatory fiber optic cable assembly showing the fiber optic cable within the cable adapter taken in a vertical direction to depict how the cable may be attached to the fiber optic connectors disclosed herein.

Other geometries are possible for locking feature 20L. For instance, locking feature 20L may comprise features integrated into the housing such as one or more of a groove, a reverse bayonet such as depicted in FIG. 24, a scallop such as shown in the housing 20 of FIG. 25, a shoulder such as shown in FIG. 28. The shoulder comprises an enlarged annular portion with a flat surface on the rear side.

In these examples, the locking features 20L advantageously are integrated into the housing 20 and do not require extra components and may be used with any of the disclosed concepts. In some embodiments, the locking features 20L are subtractive portions from the primitive geometry of the rear portion RP such as a notch or ramp formed in the round rear portion RP. Consequently, having the locking features integrated into the housing 20 (e.g., monolithically formed as part of the housing) may allow denser arrays of connectors in complimentary devices. Moreover, these locking features integrated into the housing 20 may be forward or rearward of the sealing location of connectors 10. For example, the integrated locking features of housing 20 are disposed forward of at least one groove 20G that seats O-ring 65 in housing 20 of FIG. 2. Locking feature 20L may cooperate with features of a complimentary mating device for securing the mating of the connector 10 with the complimentary mating device.

Housing 20 may also have features that aid in the proper alignment or orientation of the connector with the complimentary device such as markings, keys, keyways, etc. without changing the primitive form-factors of the housings that are disclosed and claimed herein. Additionally, housing may have other keying features for mating with a complimentary device such as shown in connector 10 of FIG. 67.

The position of features on the housing 20 may have specific locations (i.e., clocking of the features on the housing) relative to other features. By way of example, the keying portion 20KP is disposed about 180 degrees from the at least one locking feature 20L in the embodiment of FIG. 2. In other words, keying portion 20KP is located at the 12 o'clock position and the locking feature 20L is located at the 6 o'clock position on the rear portion RP of housing 20. Other arrangements are possible where the keying portion 20KP is disposed less than 180 degrees from the at least one locking feature 20L.

Housing 20 of FIG. 2 may have other features in the rear portion RP. As shown in FIG. 3, housing 20 comprises one or more openings 27 disposed at the 3 o'clock position and the 9 o'clock position. Openings 27 are sized for receiving portions of one or more latch arms 60LA on cap 60. Latch arms 60LA may be seated generally flush on the rear portion RP of housing 20 when attached.

Cable adapter 59 may be keyed to the rear end 21 of housing 20. Illustratively, housing 20 comprise a cable adapter key 21 on the periphery of opening 21A at rear end 21. Likewise, cable adapter 59 comprises a cable adapter key 59K for cooperating with cable adapter key 21 on housing 20. In addition to the openings 27, housing 20 may include one or more mounting features 27MF as discussed in further detail with conversions and dust caps of connector 10.

Housings 20 disclosed herein have relatively compact form-factors such as having a length L of about 40 millimeters (mm) or less and a cross-section dimension of about 15 mm or less such as 12 mm or less, but other suitable dimensions are possible for the housing.

Figure 4:
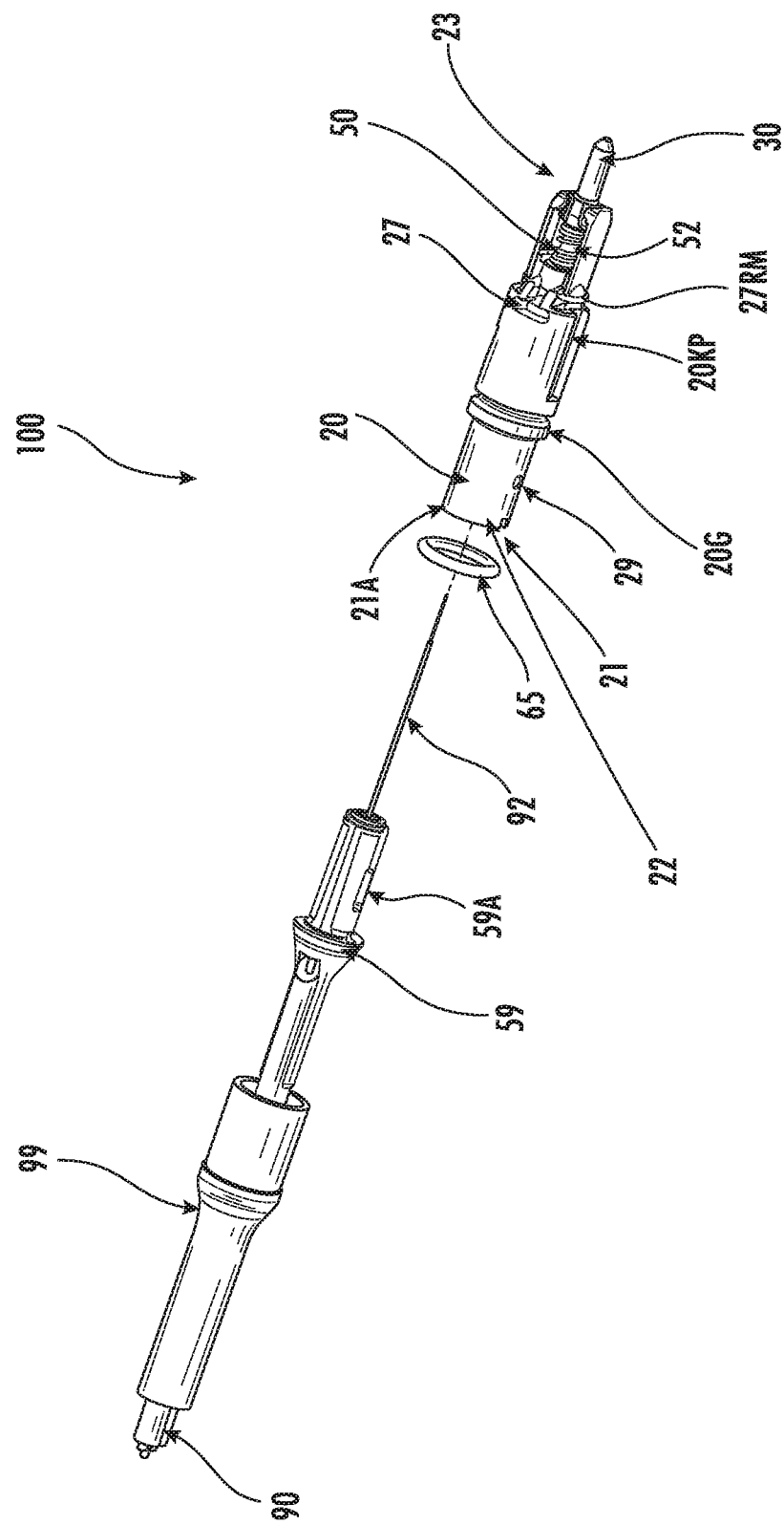
FIG. 4 is a partially assembled perspective view of the fiber optic connector of FIG. 2 with the ferrule assembly placed into the housing before installing the cap.

FIGS. 4-16 depict the assembly of connector 10 along with further construction details. FIG. 4 depicts a partial assembly view showing the ferrule subassembly 52 inserted into the ferrule assembly side pocket 40 of housing 20 and the cable 90 positioned in cable adapter 59 for insertion into opening 21A at the rear end 21 of housing 20. FIGS. 5 and 6 show detailed perspective views of the housing 20 and the assembly of components. Ferrule subassembly 52 is assembled by securing ferrule 30 in the front end of ferrule holder 49, and resilient member 50 is positioned over a post of the ferrule holder 49 at the rear end.

As best shown in FIG. 7, ferrule assembly 52 is assembled into the resilient member pocket 40 by inserting the assembly in the transverse direction to the ferrule carrier passageway as represented by the arrow. By way of explanation, the ferrule holder assembly 52 is rotated so that the ears 49E are aligned with the stops 20S and the protrusion 49P faces the notch 20N of housing 20 as shown in FIG. 10. Then the ferrule holder assembly is inserted into the ferrule assembly side pocket 40 of the housing 20 so it is properly seated and held in place by resilient member 50 as shown in FIGS. 8-10. Other structure on housing 20 may also be used to help keep the ferrule holder assembly 52 seated and in place such as a notch for the resilient member 50 to seat. Optical fiber 92 of cable 90 is threaded thru the housing 20, the ferrule holder 49 and into ferrule 30. Optical fiber 92 is secured to ferrule 30 in a suitable fashion such as an adhesive and the end face of ferrule 30 is polished. Cap 60 may be installed before polishing ferrule 30. Cap 60 helps secure the ferrule assembly for polishing and may also be used as datum during the manufacturing process. Other embodiments of ferrule holder 49 may have other suitable constructions as desired.

Housings 20 may also have suitable features or structures for sealing connectors 10. The sealing plane should be located at a suitable location along the housing 20 for providing suitable environmental protection as necessary for the desired environment Illustratively, housing 20 may include one or more grooves 20G for receiving an appropriately sized O-ring 65. Housings 20 may include other feature or structures for aiding in sealing. For instance, the housing 20 may have a suitable surface for receiving a portion of a heat shrink 99 or the like for sealing between a portion of the cable 90 and the connector 10. Any suitable heat shrink 99 may be used such as a glue-lined heat shrink. Moreover, other structures or features are possible for aiding in providing a robustly sealed cable assembly 100.

Ferrule subassembly 52 is configured to cooperate with the housing 20 for inhibiting the rotation of the ferrule subassembly 52 with respect to the housing 20 when biased to a forward position by resilient member 50. In this embodiment, ferrule holder 49 of the ferrule assembly 52 has alignment geometry that cooperates with alignment geometry on the housing 20 for positioning and fixing the ferrule assembly 52. This provides a fixed position when seated (Z=0) for aiding the assembly so the optical fiber 92 may be inserted into the ferrule 30 during manufacturing.

FIGS. 8-10 show the cooperating features of the ferrule holder 49 and housing 20. Specifically, ferrule holder 49 comprises ears 49E and an alignment protrusion 49A such as a pin that cooperate with features the housing 20 as shown in FIG. 17. Ears 49E and an alignment protrusion 49A such as a pin that cooperate with features the housing 20 for inhibiting the movement of the ferrule subassembly 52 with respect to housing 20 when seated by resilient member 50 against the housing 20 (Z=0). Housing 20 comprises stops 20S and a notch 20N for cooperating with the ears 49E and alignment protrusion 49A of the ferrule holder 49 as shown. More specifically, ferrule holder 49 has two ears 49E spaced apart at on a first side of the ferrule holder 49 and the alignment protrusion 49A is located on the opposite second side of the ferrule holder 49 disposed in the middle of the opposite second side. As shown in FIGS. 8 and 9, ears 49E may have a tapered surfaces 49TS for engaging cooperating tapered surfaces of stops 20S of housing 20, thereby controlling the position at Z=0 and influencing the position as the ferrule assembly 52 is translated rearward during mating and the like. FIG. 10 shows alignment protrusion 49A on the opposite side of ferrule holder 49 disposed in the notch 20N of housing 20 at Z=0. As shown, notch 20N has a generally V-shape that cooperates with the round shape of the alignment protrusion. Movement of the ferrule holder is discussed in more detail with respect to FIG. 17.

FIGS. 11-13 are longitudinal sectional views showing further details for front end of connector 10 of cable assembly 100. FIGS. 10 and 11 depicts a partially assembled connector that does not yet have cap 60 attached, and FIG. 13 is a longitudinal sectional view showing connector 10 with the cap 60 attached.

Figure 16:
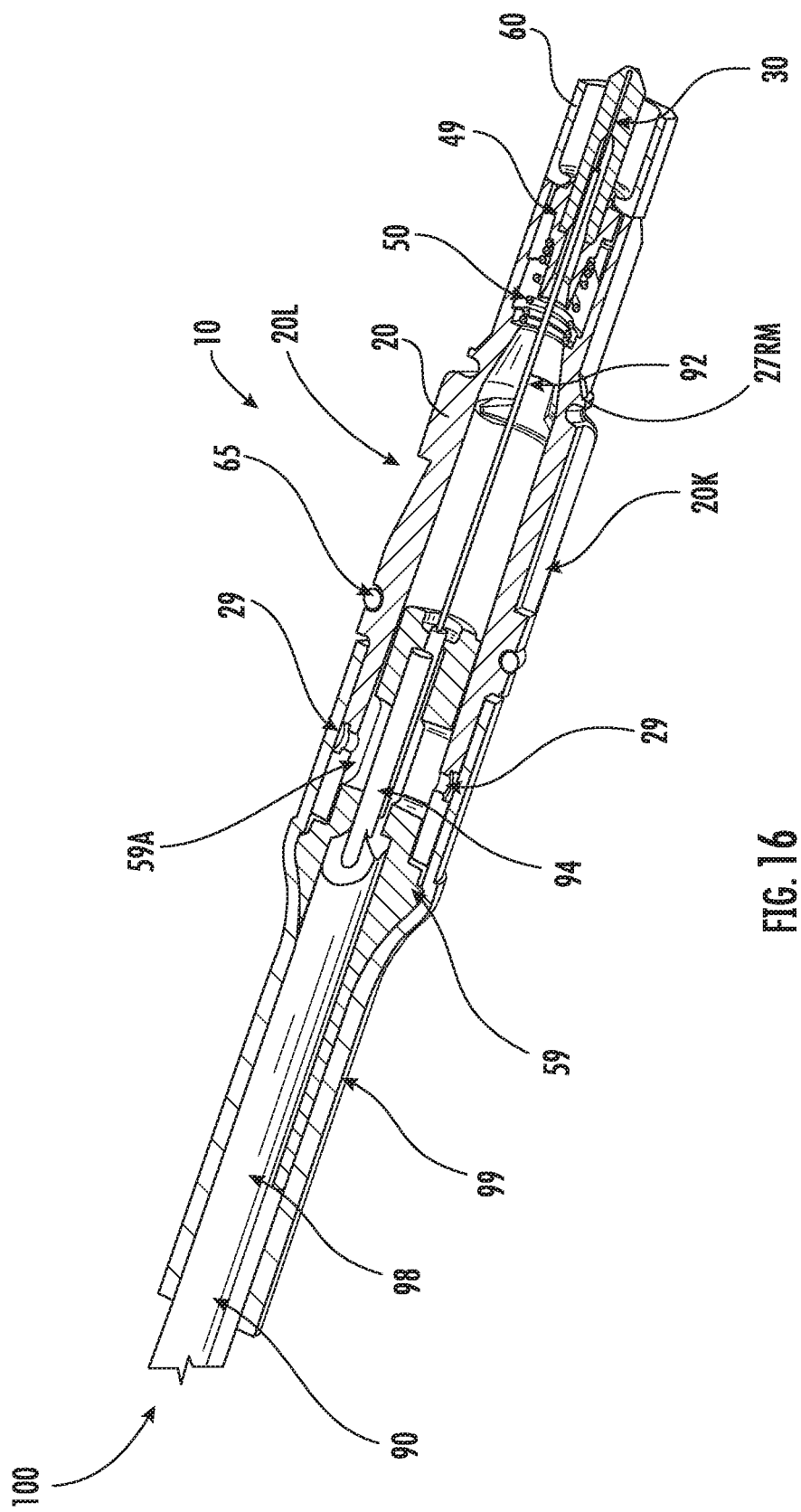
FIG. 16 is a longitudinal sectional view of the fiber optic cable assembly of FIG. 2 showing details of the construction.

FIGS. 14 and 15 depict the cable assembly 100 with the cable adapter 59 inserted into housing 20. As shown in FIG. 14, cable adapter 59 may include one or more flexures 59F at the rear portion for providing cable bending strain-relief if desired instead of using a conventional boot. The flexures as depicted are suitable for flat cables that have a preferential bend-characteristic such as non-round cables. However, other cable adapters are suitable for use with the connectors 10 as disclosed herein. FIG. 14 represents the sealing element such as heat shrink 99 that was threaded onto the cable 90 being slid forward over a portion of the housing 20 and cable 90 in FIG. 15. Heat shrink 99 weatherproofs the interface between connector 10 and cable 90. As depicted in FIG. 14, housing 20 may have a stepped down portion at the rear end 21 for receiving a portion of heat shrink 99. FIGS. 15 and 16 show views of the connector 10 attached to cable 90 with the cap 60 installed. Details of the cable adapter 59 attachment to housing 20 are discussed below with respect to FIGS. 26-29.

FIG. 17 depicts the ferrule holder 49 and ferrule 30 along with the possible degrees of freedom. FIGS. 18 and 19 show views of the ferrule holder 49 biased forward against housing 20. As shown in FIG. 18, the taper on the tapered leading surface of ears 49E engage the tapered surfaces of stops 20S on housing 20 and alignment feature 49P engages notch 20N to inhibit the ferrule holder 49 from movement in the X- and Y-directions, and also inhibits rotation in the Z-axis when the ferrule holder 49 is seated against the housing 20, but small movements may occur. Alignment feature 49P and the notch 20N may also include a taper for inhibiting movement in Y-direction when the ferrule holder 49 is seated against the housing 20. The geometry of ferrule holder 49 and housing 20 still allows the ferrule 30 to "float" to the desired degree once the ferrule assembly 52 translates rearward in the Z-direction (i.e., translate rearward against the resilient member 50). In other words, once the ears 49E and alignment feature 49P are displaced off of the housing features, then the ferrule holder 49 can translate in the different degrees of freedom to the desired location for precise alignment during mating. However, the internal geometry of connector 10 can also inhibit the maximum displacement of the ferrule holder 49 when translated rearward in the Z-direction. This can advantageous aid in preserving optical performance such as during side pull or other events that the connector may experience.

Figure 20:
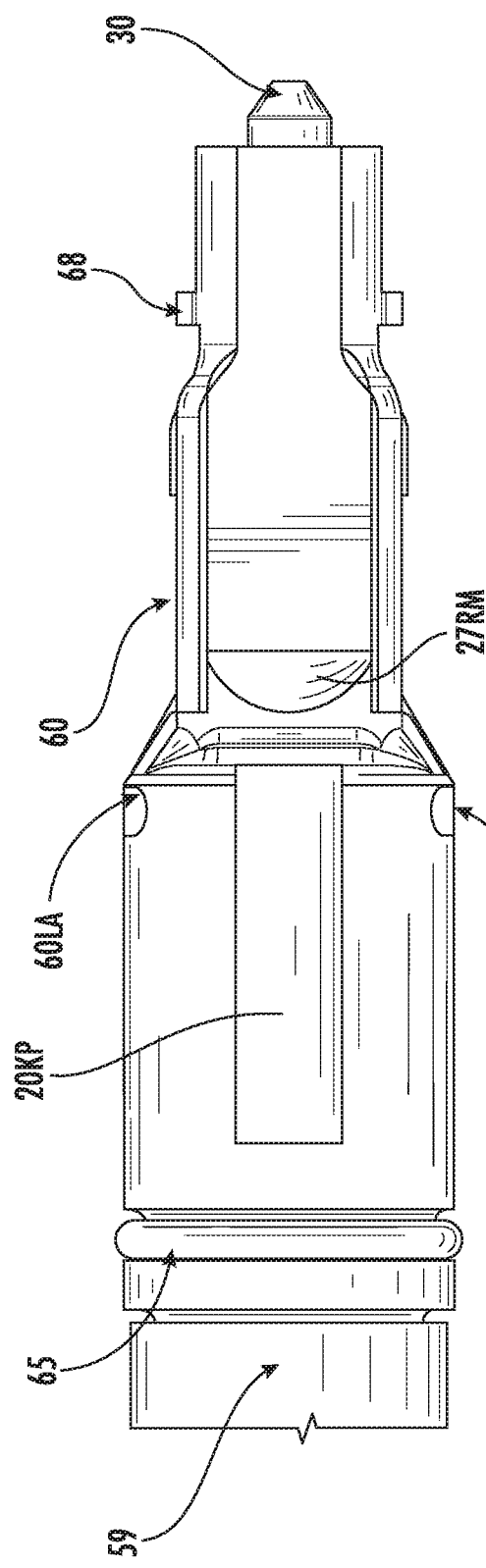
FIG. 20 is a close-up top perspective view of the housing of the fiber optic connector of FIG. 2 with the cap attached.
Figure 22:
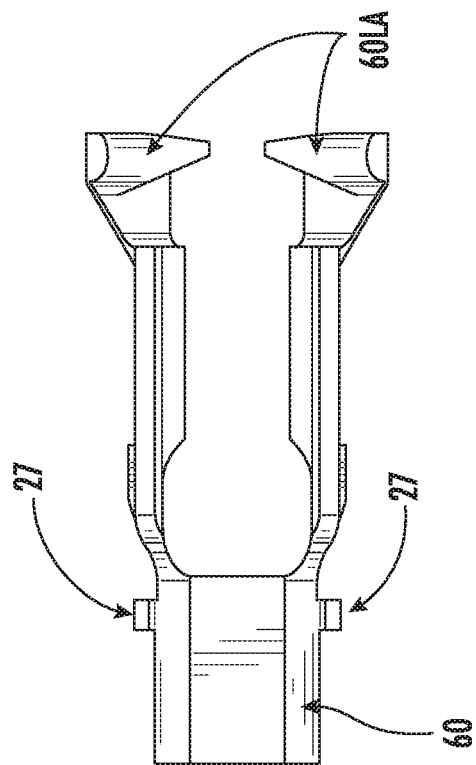
FIGS. 21 and 22 respectively are a rear perspective view and a top view of the cap of the fiber optic connector of FIG. 2.
Figure 21:
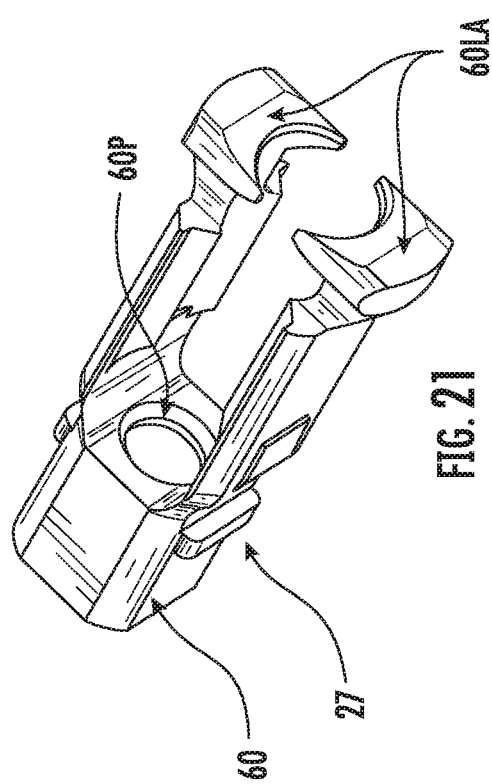

FIG. 20 is a close-up top perspective view of the housing 20 with the cap 60 attached of connector 10 of FIG. 2. FIGS. 21 and 22 respectively are a rear perspective view and a top view showing details of the cap 60. FIG. 23 is a longitudinal sectional view of connector 10 of FIG. 2 depicting the wall details of the cap 60 for controlling the displacement of the ferrule holder 49. Specifically, when cap 60 is attached to housing 20 the internal wall of cap 60 forms a rounded cavity the limits the displacement of ferrule holder 49 as shown. Cap 60 may be attached in any suitable manner such as adhesive, friction-fit, snap-fit, welding or the like as desired. In one embodiment, the cap 60 may be formed from a translucent material. Using a translucent material for cap 60 allows the use of a UV curable epoxy for securing the cap 60 in place.

The concepts of a side-loading ferrule assemblies into a housing and cap on the front end of the housing disclosed herein may be used with other designs of connectors. Variations to the housings 20 such as changing the mating geometry is possible. By way of example, housings 20 may have different retention features or different locking features 20L.

Features on housing of connectors 10 may be selected as desired to form other variations of connectors. FIGS. 24 and 25 are perspective views of portions of alternative housings 20 depicting other locking features 20L that may be used. Likewise, locking or retention features may be selected with other features such as different keying features 20K or keying portions 20KP. These features or portions have a predetermined location with respect to an orientation of housing 20 for aligning the connector form-factor with a respective mating device. Specifically, the housing 20 provides a proper orientation for connection in one orientation, which may be desired for angled ferrules or other reasons. Connector 10 of FIG. 2 has the at least one locking feature 20L disposed about 180 degrees apart from the keying portion 20KP disposed in the rear portion RP, but other arrangements less than 180 degrees apart. Further, housings 20 could comprises a first locking feature and a second locking feature if desired.

Besides housings 20 with different locking features 20L, connectors 10 may use different cable adapters 59, thereby allowing different cable types to be used with connector 10. As discussed earlier, using connectors with a separate cable adapter 59 allows the connector 10 to be used with different types cables by merely changing out and selecting the cable adapter that is suitable for the desired cable 90.

Figure 29:
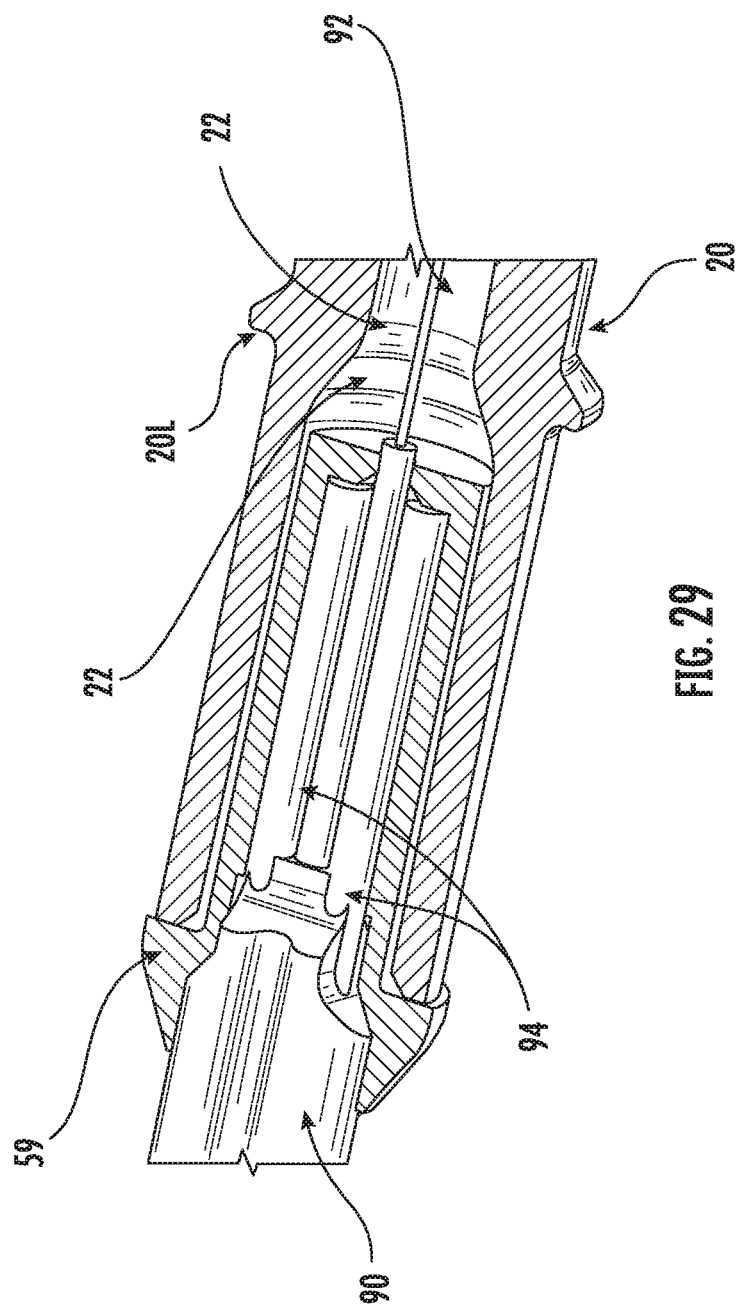
FIG. 29 is a sectional view of the rear portion of the cable assembly of FIG. 28 showing the fiber optic cable within the cable adapter taken in a horizontal direction.

Details of cable adapters 59 for use with connectors 10 are discussed referring to FIGS. 26-29. FIGS. 26 and 27 respectively are a perspective view and a cross-sectional view of another cable adapter 59 for use with connector 10. Like the cable adapter 59 of FIG. 2, the cable adapter 59 of this embodiment that fits into a rear opening 21A of the housing 20. This cable adapter 59 is used with a housing 20 that has a locking feature configured as a shoulder on the rear portion RP in FIGS. 28 and 29. FIG. 28 is a vertical longitudinal sectional view and FIG. 29 is a horizontal sectional view of the rear portion RP of cable assembly 100 showing a representative cable 90 disposed within the cable adapter 59.

As depicted, cable adapters 59 may comprise an aperture 59A, a recessed surface 59R, a shoulder 59S, a passageway 59P, a cable saddle 59C and/or a cable adapter key 59K as desired for any particular embodiment of cable adapter 59. Generally speaking, cable adapter 59 comprises passageway 59P from a cable adapter front end 59F to a cable adapter rear end 59R. Passageway 59P allows the optical fiber 92 of cable 90 to pass therethrough. Shoulder 59S allows cable adapter 59 to have a snug-fit within the passageway 22 of housing 20 and inhibits adhesive from wicking or flowing forward of the shoulder 59S. Any adhesive or epoxy used for securing cable adapter 59 may wick around the recessed surface 59R for creating a sufficient bonding area and any excessive adhesive or epoxy may flow into the aperture 59A. Housings 20 may include one or more apertures 29 for injecting epoxy or adhesive. Other methods may include adding the adhesive or epoxy on the cable adapter before insertion into the housing. For instance, housing 20 may include two apertures 29 such as shown in FIG. 28 so that air may escape as adhesive or epoxy is injected. Additionally, the one or more apertures 29 may be aligned with the apertures 59A of the cable adapter so that the adhesive or epoxy also secures the strength members 94 of cable 90 to the cable adapter 59 that is secured to the housing 20, thereby forming a robust cable/connector attachment and also providing sealing at the rear end. Cable saddle 59C is sized and shaped for the particular cable 90 that is intended to be secured using the cable adapter 59 along with the appropriate components as appropriate such as depicted in FIG. 27. The rear portion of the cable adapter 59 may have a cable bend relief area such as a reverse funnel at entrance to the passageway, flexures or other suitable structure for inhibiting sharp bending of the cable near the rear of the cable adapter 59. Further, cable adapters 59 may or may not include keys 59K as desired for cooperating with features of the housing 20. The rear portion 59R of the cable adapter 59 may also comprises one or more ribs (not shown) suitable for receiving a boot or overmold on the rear portion 59R The ribs aid in the retention of the boot or overmold.

FIGS. 30 and 31 show cable assemblies may also comprises a boot or overmold 259 disposed on the rear portion 59R of cable adapter 59 and a portion of the cable 90 if desired. Further, when assembled a sealing element such as a heat shrink 99 may be disposed over the boot or overmold 259 if used. Placing the sealing element over boot or overmold 259 and a portion of the housing 20 allows for further sealing of the cable jacket to the rear of the connector. This may also improve the bending strain-relief for the cable assembly.

Connector 10 is advantageous since it can be easily and quickly converted into several different second or alternate connector footprints as needed. As an overview, FIG. 32 shows connector 10 used with conversion housing 80 attached to the housing 20 at the front portion FP of connector 10 for converting to an SC connector. Likewise, connector 10 may be converted to a hardened connector as depicted in FIGS. 38-45.

Figure 35:
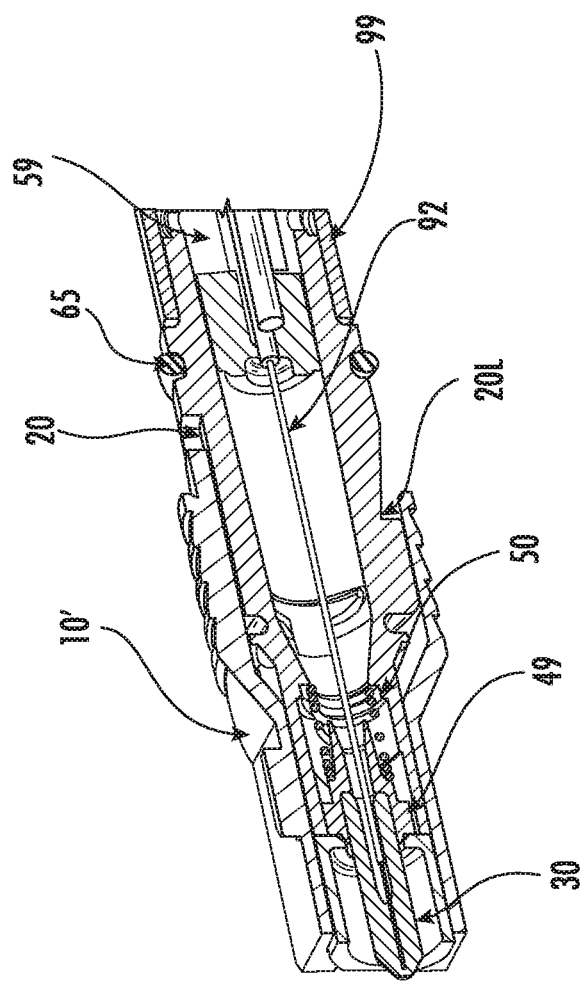
Figure 36:
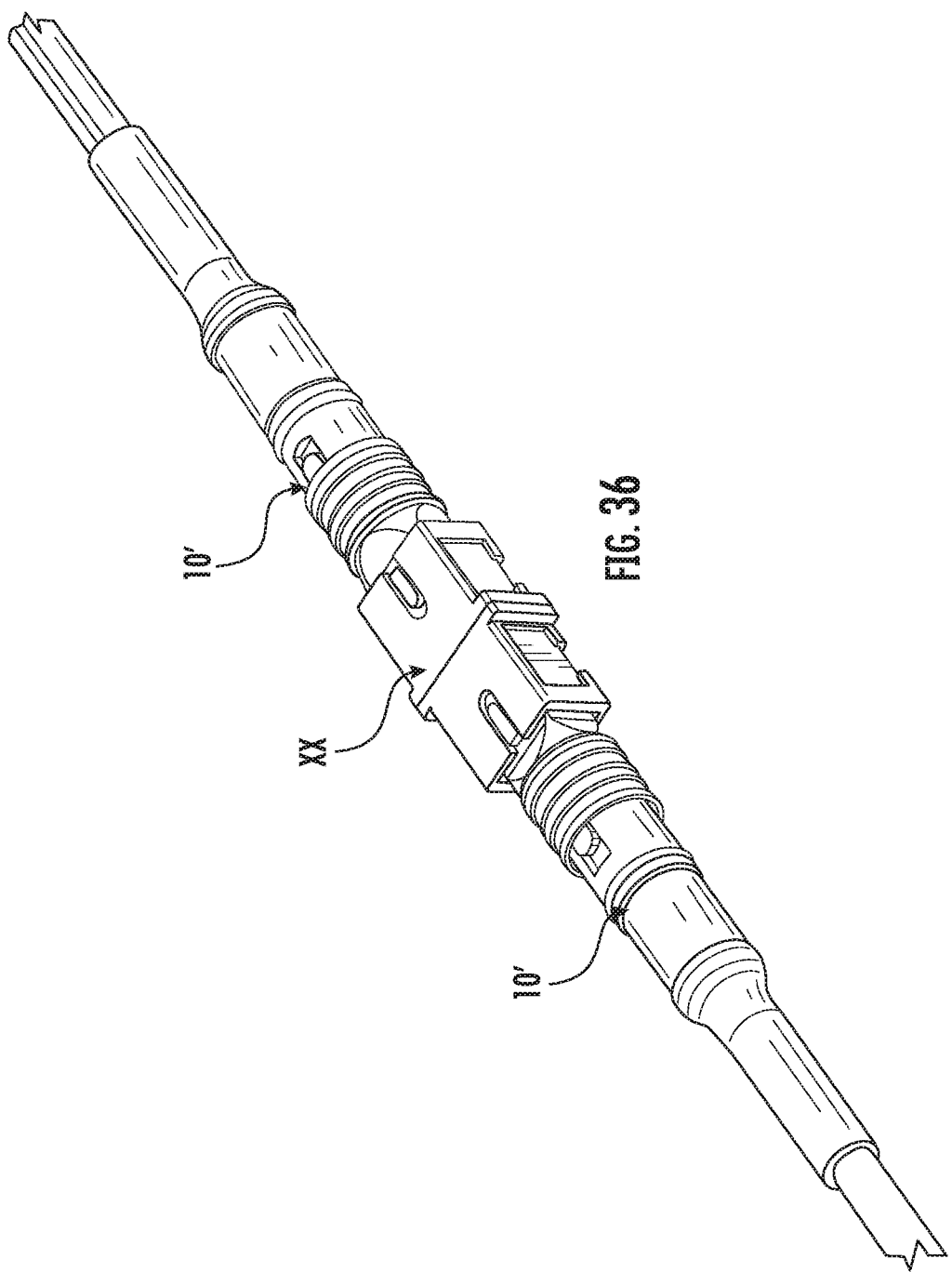
FIG. 36 is a perspective view of showing the converted fiber optic connector of FIGS. 32-35 mated to another fiber optic connector using a standard adapter.
Figure 37:
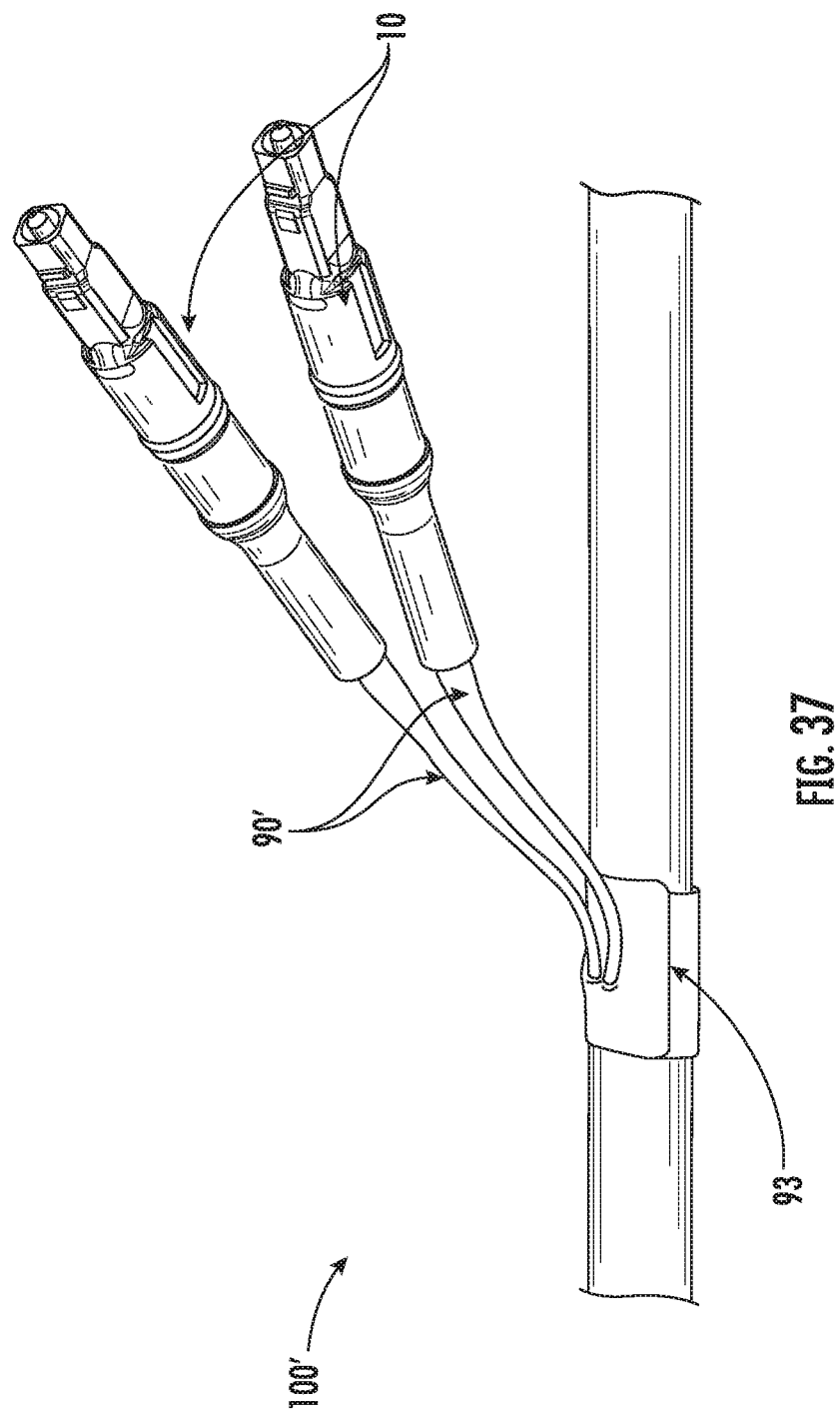
FIG. 37 depicts a distribution cable having a fiber optic connector according to the concepts disclosed disposed on a tether.

FIGS. 32-35 are various views of a conversion housing that may be used with the fiber optic connector concepts disclosed herein for changing the footprint of the fiber optic connector. By way of example, connectors disclosed herein may be converted from a first connector footprint to a second connector footprint. FIG. 32 is a perspective view of an explanatory connector 10' that further comprises a conversion housing 80 attached about the housing 20 and cap 60 at the front end of the connector for changing the connector 10 from a first connector footprint to a second connector footprint 10' as shown in FIG. 33. FIGS. 34 and 35 are a sectional view of the connector 10'. By way of example, the connector 10' may have a first connector footprint such as shown in FIG. 2 and be changed to a second connector footprint such as a SC connector by adding conversion housing 80. Any of the suitable connectors 10 disclosed herein may be converted in a similar manner as described herein. In this embodiment, the changing of the first connector footprint to the second connector footprint comprises the use of a single component for the conversion. This embodiment changes the connector 10 into a connector 10' having a SC footprint by using conversion housing 80 having the footprint of an outer housing of a SC connector. Consequently, connector 10 may be backwards compatible into existing optical networks using SC footprints. FIG. 36 is a perspective view of showing connector 10' mated to another converted connector 10' using a standard adapter Connectors disclosed herein may be portions of other cable assemblies as desired. For instance, FIG. 37 depicts a distribution cable 100' having one or more connectors 10 on tether cables 90' that extend from a mid-span access 93 of a distribution cable. Of course, other suitable assemblies may use the connectors according to the concepts disclosed herein.

Figure 38:
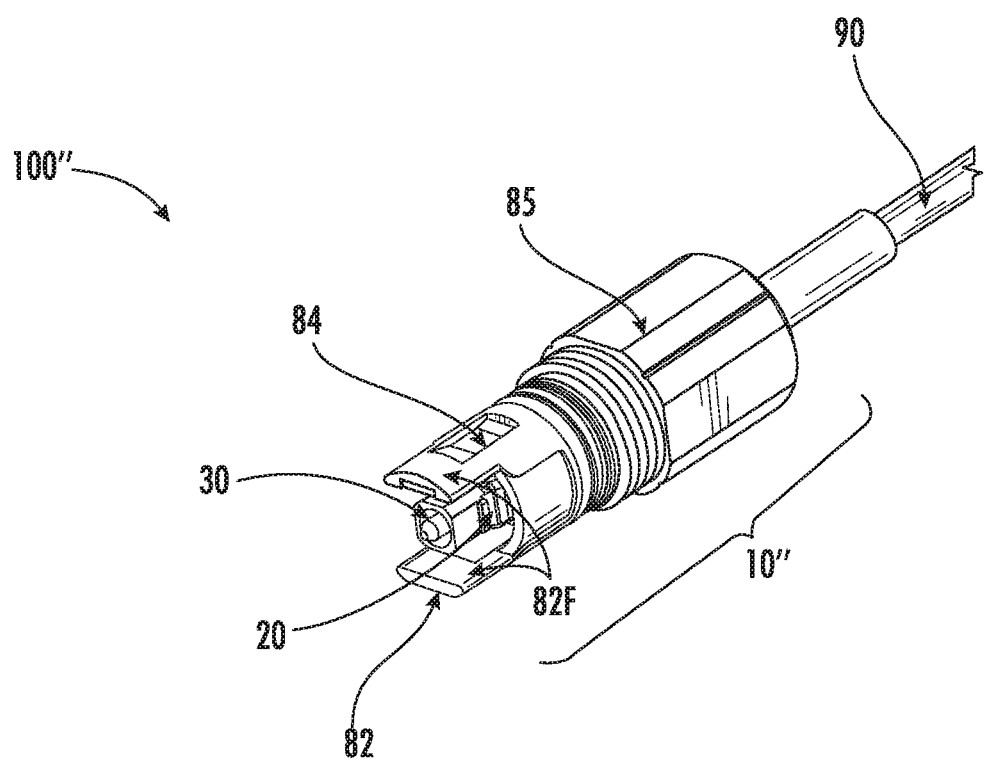
FIG. 38 is a perspective view of the fiber optic connector of FIG. 2 shown with a conversion housing for changing the fiber optic connector from a first connector footprint to a second connector footprint using a plurality of components.
Figure 39:
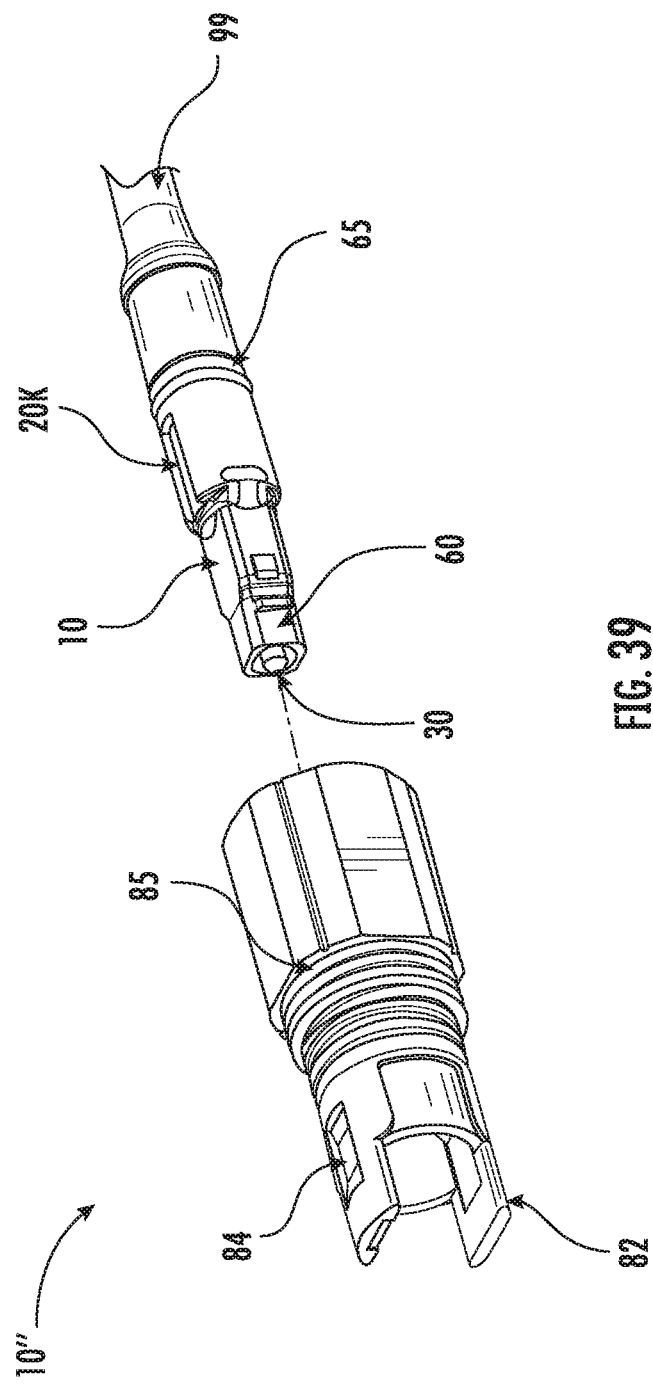
FIG. 39 is a perspective view showing the plurality of components of the conversion housing removed from the fiber optic connector of FIG. 2.

In still other embodiments, the changing of the first connector footprint to the second connector footprint such as a hardened connector footprint may comprise the use of a plurality of components. By way of example, FIGS. 38-43 show details for the conversion of connector 10 into connector 10" that has a hardened connector footprint. Illustratively, FIG. 38 shows connector 10 converted to connector 10" comprising a second connector footprint, and FIG. 39 is a partially exploded view showing the assembly of a plurality of components used for converting to another connector 10" removed from connector 10.

This embodiment of the second connector footprint 10" comprises a hardened connector footprint. Hardened connector footprint means that the connector is suitable for outdoor environments without the need for protection within a closure. Any suitable connector 10 disclosed herein may be used for such a conversion from the first footprint to the second footprint. In this particular embodiment, the plurality of components are suitable for converting connector 10 to a hardened OptiTap® compatible connector; however, the plurality of components may be configured for converting connector 10 into other hardened connectors as desired.

Figure 40:
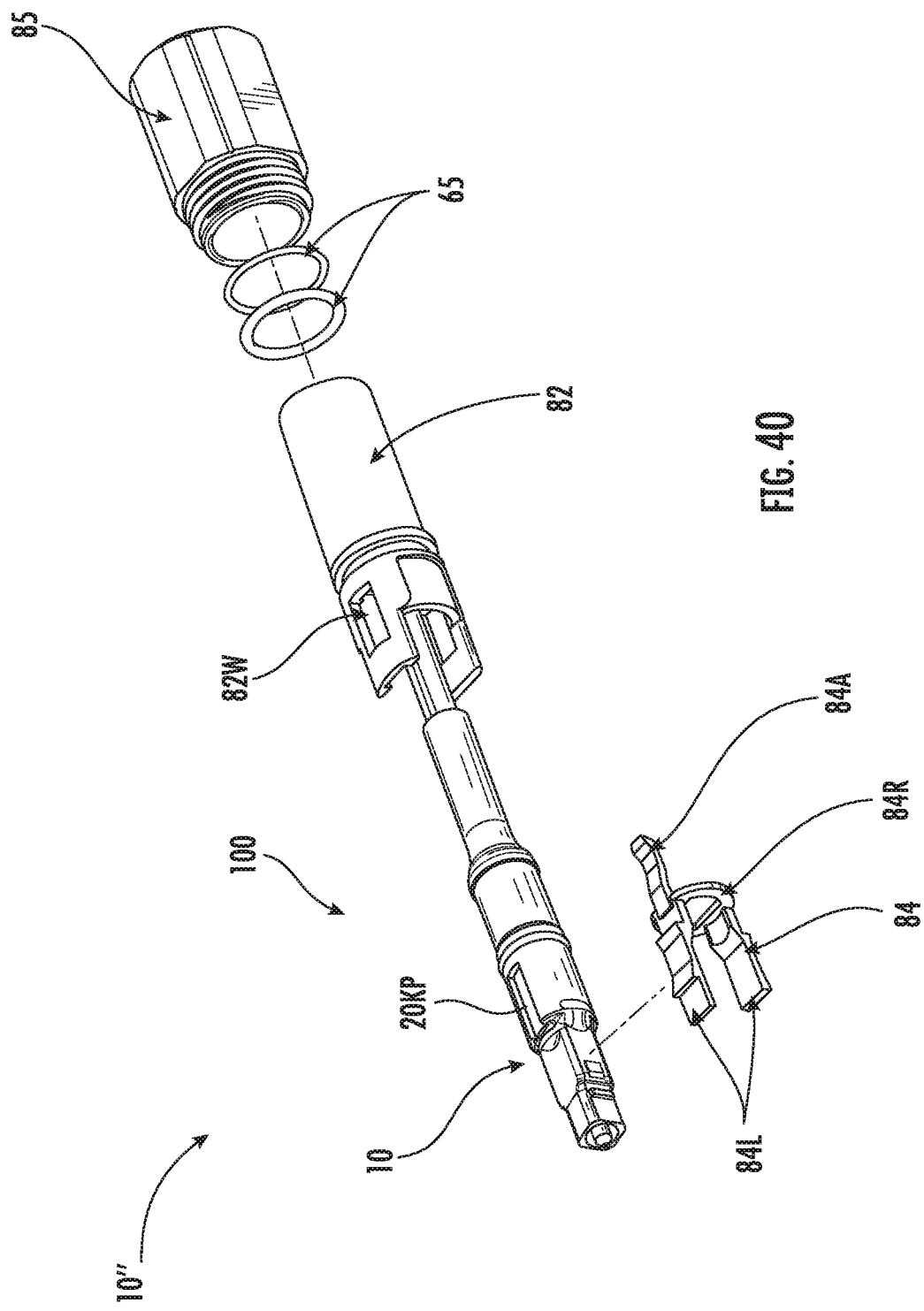
FIG. 40 is a partially exploded view of the plurality of components for the conversion housing of FIG. 38.
Figure 41:
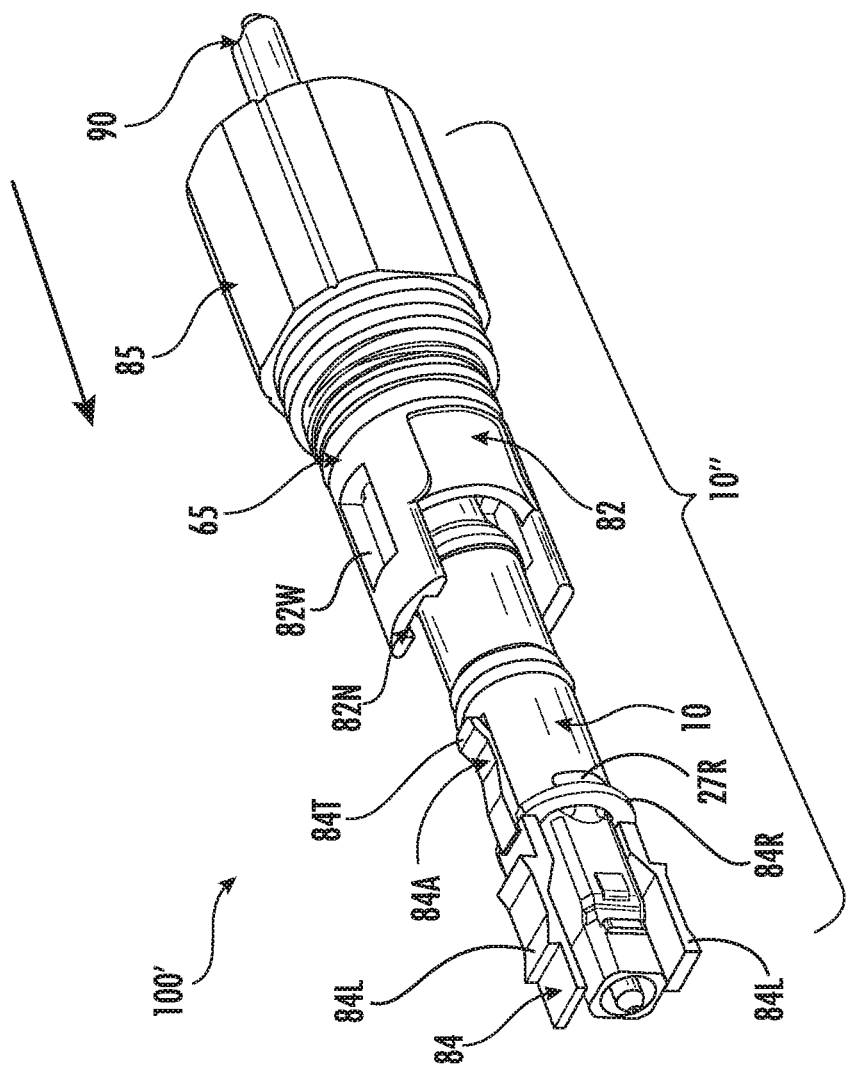
FIG. 41 is a perspective view showing the assembly of the plurality of components of the conversion housing for changing the fiber optic connector of FIG. 2 to a second footprint.

FIGS. 40 and 41 depict cable assembly 100 with connector 10 along with the plurality of components for the conversion to the second footprint 10″ along with depicting the assembly of the components. In this embodiment, the plurality of components for the conversion to the hardened connector comprise a conversion housing 82 configured as a shroud, a retaining member 84 configured as a retaining clip and a coupling nut 85. One or more O-rings 65 may be used with the conversion housing as desired. Boots, heat shrinks or other components may also be used with the conversion housing if desired.

To make the conversion of connector 10 to the hardened connector 10″, the coupling nut 85 and conversion housing or shroud 82 are threaded onto the cable assembly along with any other desired components. Retaining member 84 is aligned with connector 10 from the side and attached to housing 20 as shown in FIG. 41. Specifically, retaining member 84 is aligned and attached to housing by aligning the mounting rim 84R with the mounting features 27MF of housing 20 and seating the retaining member arm 84A in keying portion 20KP of housing 20. Coupling nut 85 may be slid onto shroud 82, and a shroud notch 82N is aligned with the retaining member arm 84 protruding from keying portion 20KP of housing 20 for guiding the shroud 82 onto the retaining structure of retaining member 84 in the correct orientation. Specifically, a protruding tail 84T is formed near the end of retaining member arm 84 for cooperating with the shroud notch 82N. Windows 82W disposed on opposite sides of shroud 82 engage with the forward facing latching arms 84L of retaining member 84 to secure the shroud 82 to connector 10 when slid forward as represented by the arrow shown in FIG. 41. Any other components such as any outer boot of the like can be slid-up into position from the rear as well. Shroud 82 may include an O-ring 65 for sealing during mating.

Figure 43:
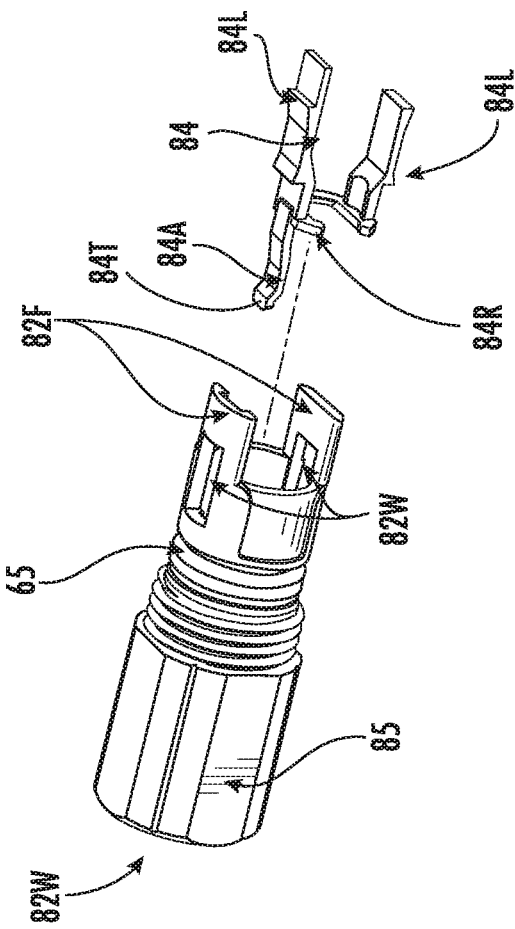
FIGS. 42 and 43 are perspective views showing the construction of the retaining member, shroud and coupling nut of the conversion housing of FIG. 38 of FIGS. 40 and 41.
Figure 42:
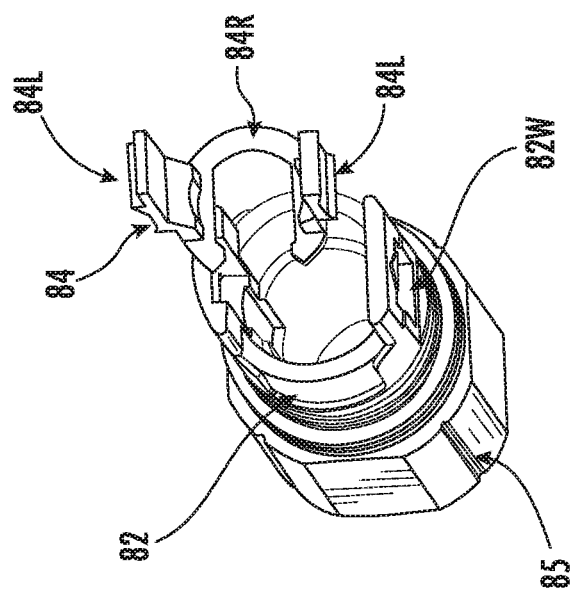
Figure 45:
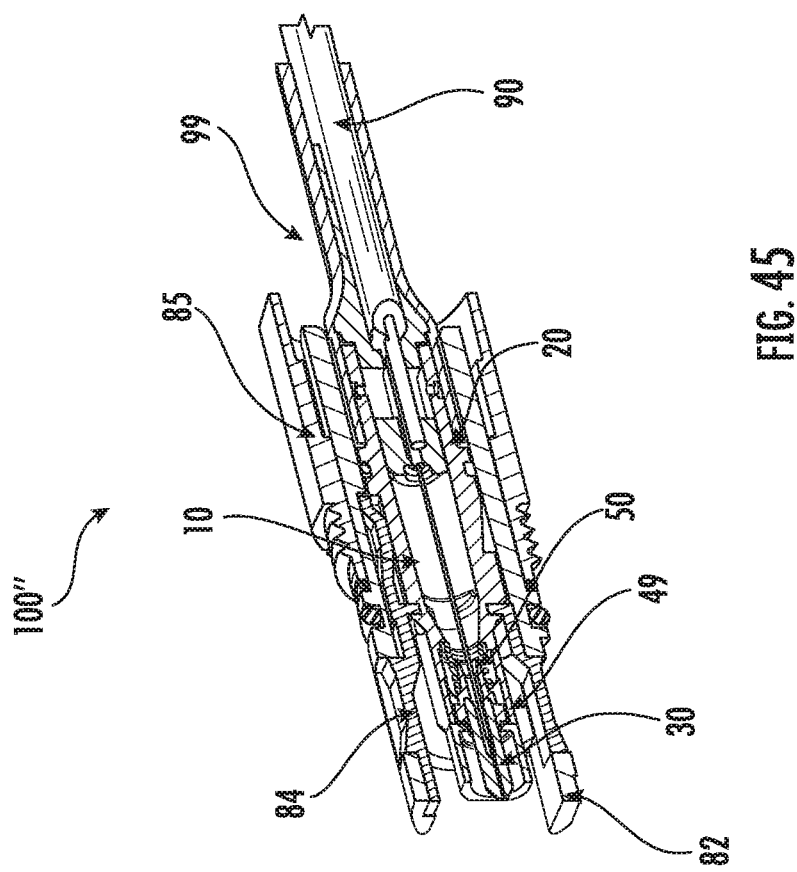
FIGS. 44 and 45 respectively are a cross-sectional view of the conversion housing components as assembled in FIG. 39, and a cross-sectional of the conversion housing components assembled on the fiber optic connector as shown in FIG. 38.
Figure 44:
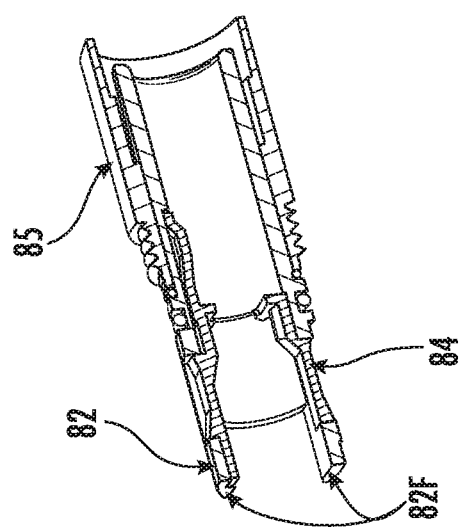

FIGS. 40 and 43 show detailed perspective views of retaining member 84. As depicted, retaining member 84 comprises mounting rim 84R to aid in seating and securing the retaining member 84 to housing 20 of connector 10. As best shown in FIG. 43, mounting rim 84R comprises an opening on one side for sliding the retaining member 84 onto the mounting features 27MF of housing 20 from the side and seating the retaining member 84 on housing 20. Additionally, retaining member 84 also has a forward and rear catches on latching arm 84L that are sized and shaped for cooperating with the windows 82W disposed on opposite sides of shroud 82. Once assembled, retainer member 84 inhibits the shroud 82 from rotating and coming off connector 10. FIGS. 44 and 45 respectively are a cross-sectional view of the conversion housing components assembled, and a cross-sectional view of the conversion housing components assembled on connector 10 showing further details. Connector 100″ may also include a dust cap like the OptiTap connector as known in the art.

Connectors 10 may also have any suitable dust cap 88 for protecting the mating portion from dust, dirt, debris and the like. FIGS. 46-51 depict a first dust cap 88 comprising a skeleton 88a and a skin 88b disposed about a portion of the skeleton 88a. Dust caps 88 comprising a skeleton 88a and a skin 88b allow the use of two different materials for the construction of the dust cap 88. Dust caps 88 may also comprise a pulling eye 88P. FIGS. 46 and 47 show the dust cap 88 being aligned with keying portion 20KP of connector 10 and attached. FIG. 48 is a horizontal sectional view of dust cap 88 disposed on connector 10 and extending past O-ring 65 to seal the mating interface of connector 10.

FIG. 49 is a rear perspective view of the skeleton 88a of dust cap 88 for showing details of the design. FIGS. 50 and 51 respectively are a cross-sectional and a top view of the dust cap 88 with the skin 88b applied to the skeleton 88a. As shown, skeleton 88a comprises an alignment tongue 88T that cooperates with the keying portion 20KP of housing 20, and one or more latches 88L for engaging mounting features 27MF on housing 20. Skeleton 88a also comprises openings 88a that are forward and aligned with latches 88L. Generally speaking, skeleton 88a is formed from a relatively hard material that may flex and provides a frame for skin 88b is formed from a softer material. The dust cap 88 may be aligned and will deform slightly so that latches capture the mounting features 27MF of housing 20 to attach to connector 10. To remove the dust cap 88, the user can squeeze near the openings 88o to slightly deform and allow release of the latches 88L from the housing 20. Dust caps 88 may be formed using a two-shot mold or by other methods.

Figure 53:
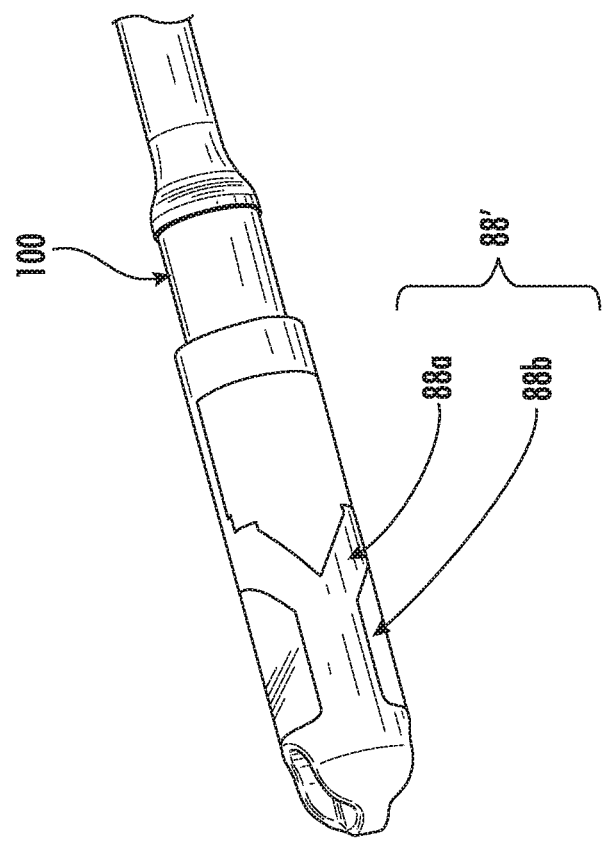
FIG. 53 is a perspective view of a dust cap using the skeleton of FIG. 52 installed on the fiber optic cable.
Figure 52:
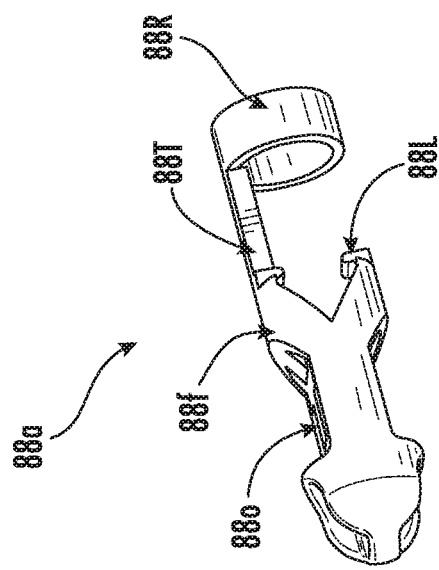
FIG. 52 is a perspective view of another skeleton for a dust cap.

FIGS. 52 and 53 depict another dust cap 88 comprising a skeleton 88a and a skin 88b that is similar to the dust cap of FIGS. 46-51. In this embodiment, the skeleton 88a of dust cap 88 comprises a ring 88R disposed at the end of alignment tongue 88T as shown in FIG. 52. Ring 88R provides further support for the skin 88b at the rear of the dust cap. FIG. 53 shows dust cap 88 attached to connector 10.

FIGS. 54-56 depict yet another dust cap 88 comprising a skeleton 88a and a skin 88b. In this embodiment, the skin 88b is not formed over the skeleton 88a until the skeleton 88a is attached to connector 10 as shown by FIG. 55. In this embodiment, skin 88b is a heat shrink that is threaded onto the cable 90 before skeleton 88a is attached to connector 10. Then, the skin 88B may be slid over a portion of the skeleton 88a from the rear and then heated to complete the dust cap 88 as shown in FIG. 56. Other dust caps may be used with the concepts disclosed herein.

Figure 57:
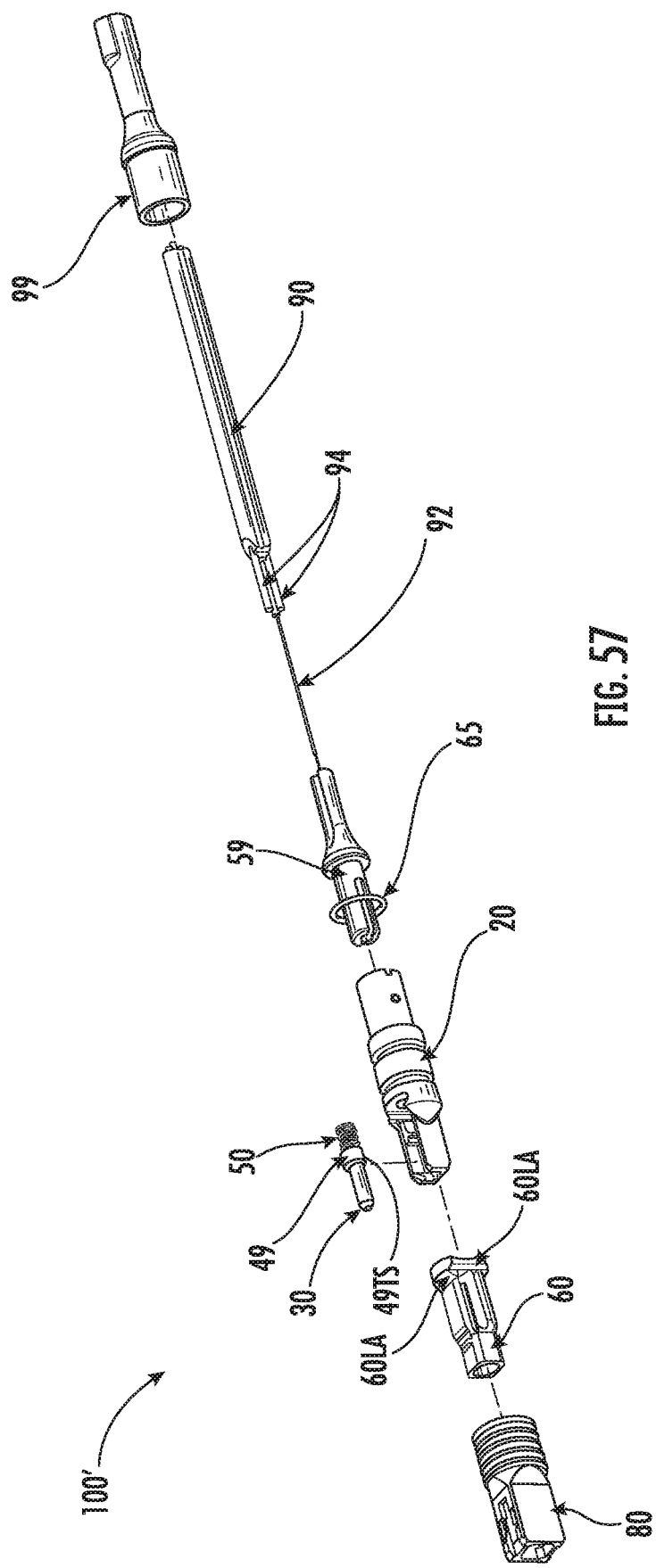
FIG. 57 is a partially exploded view of another fiber optic connector similar to the fiber optic connector of FIG. 2.
Figure 60:
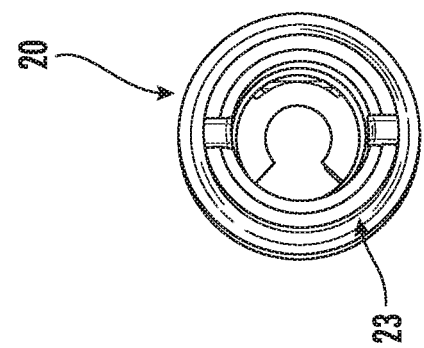
Figure 59:
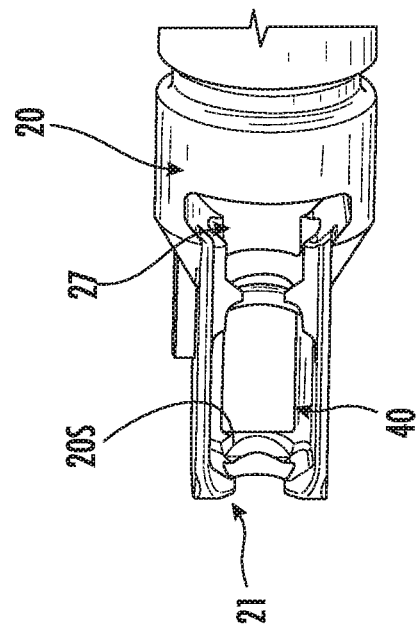
Figure 58:
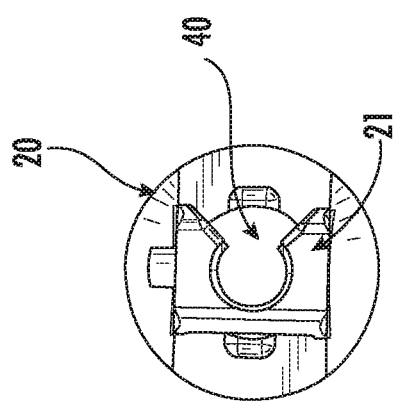
Figure 66:
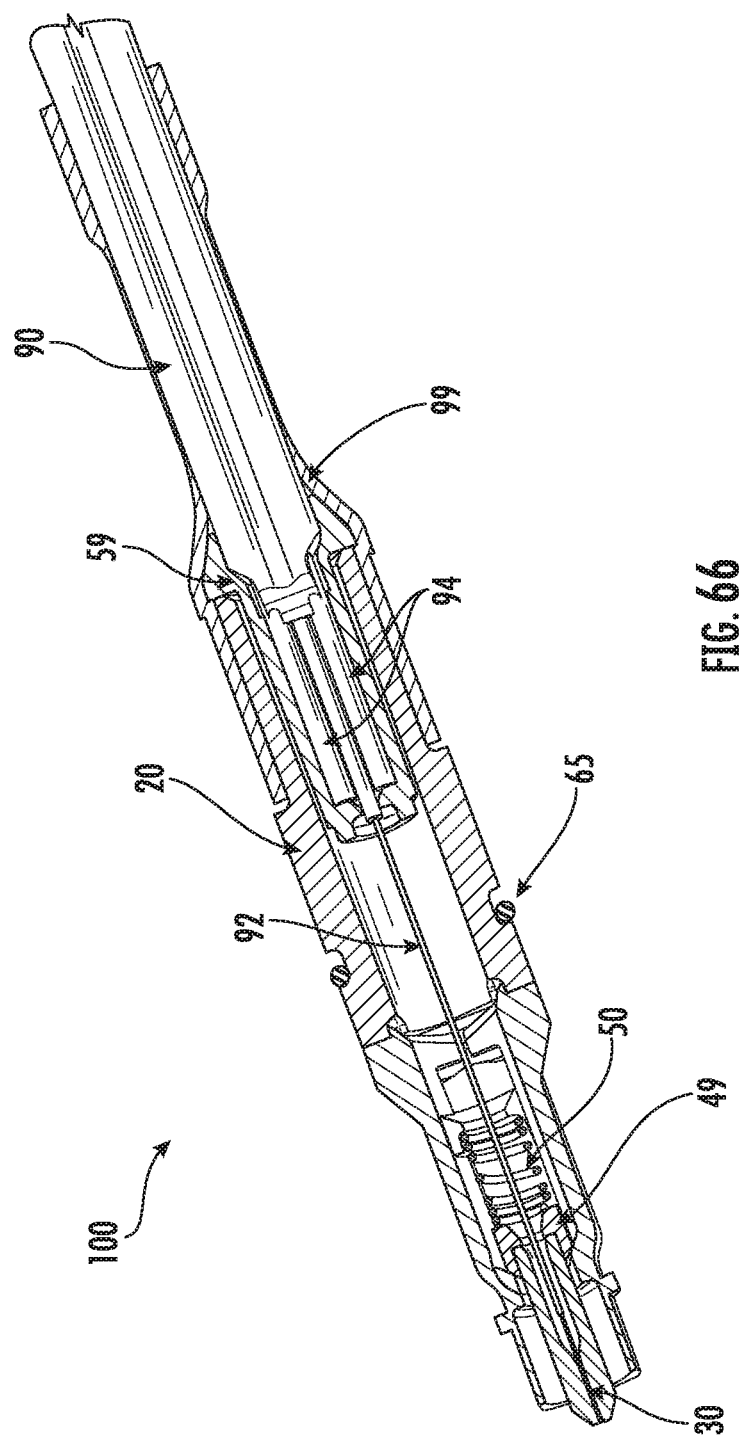
FIG. 66 is a sectional view of the assembled cable assembly having the fiber optic connector of FIG. 57.
Figure 67:
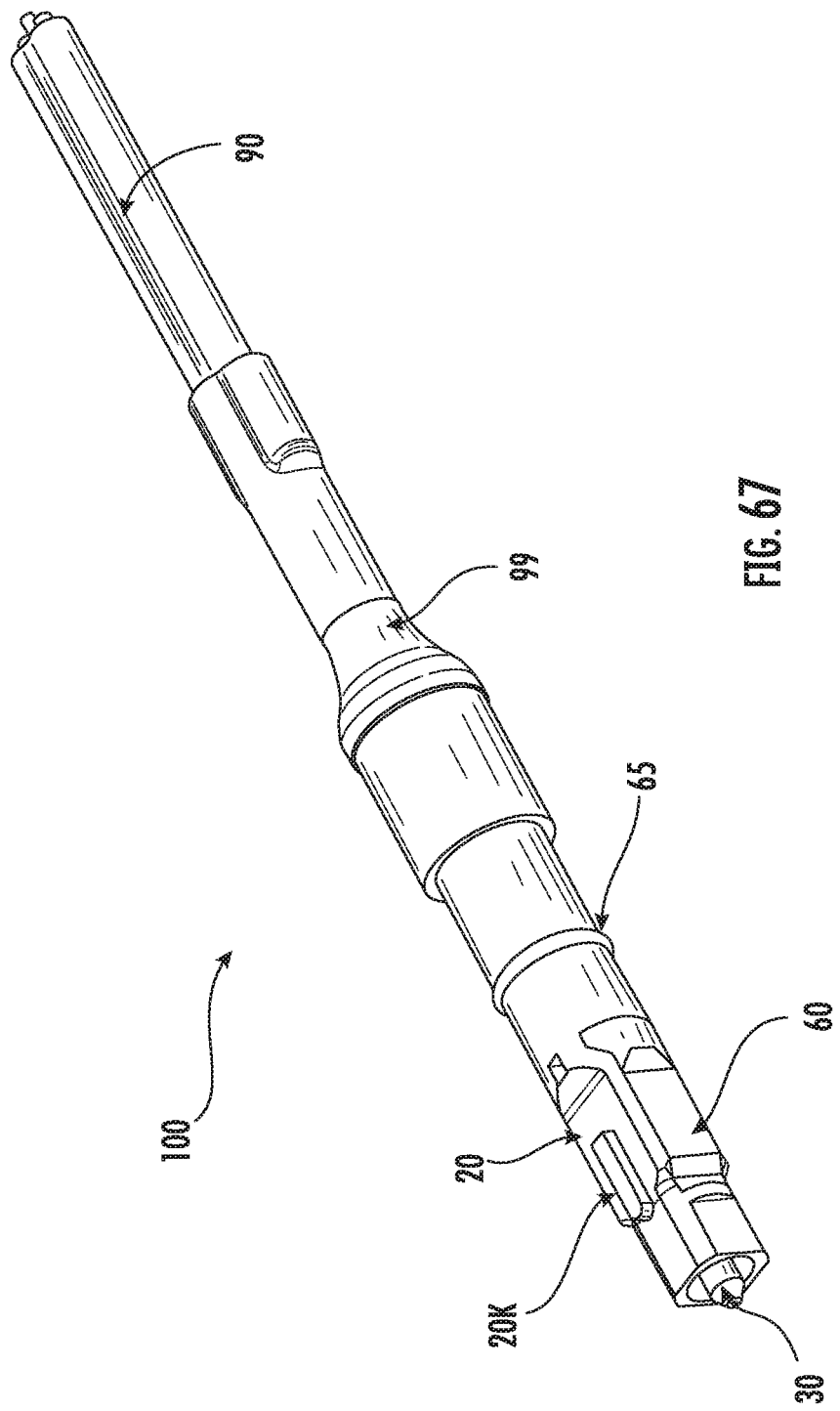

FIGS. 57-66 depict another connector 10 that is similar to connector 10 of FIG. 2 and may use similar connector conversion components, dust caps or other features. Housing 20 of connector 10 shown in FIGS. 57-66 is similar to housing 20 of the fiber optic connector of FIG. 2 but it supports a different ferrule holder 49 as discussed herein, and differences with be described while other details will not be repeated for the sake of brevity. The construction of connector 10 of FIG. 57-66 is similar to that of FIG. 2 where ferrule 30 disposed within a ferrule holder 49 and inserted into a ferrule assembly side pocket 40 of the housing 20; however, the ferrule holder 49 has an alignment feature 49AF configured as a tapered periphery at the front end for cooperating with the features of housing 20. Likewise, housing 20 has a complimentary tapered surface in stop 20S that cooperates with the tapered surface 49TS on the front periphery of ferrule holder 49. Otherwise, connector 10 of FIGS. 57-66 comprises housing 20, ferrule assembly 52 and cap 60 as shown in FIG. 57 similar to connector 10 of FIG. 2.

FIGS. 58-61 are various views showing details of the front end of the housing 20 for connector 10 depicted in FIG. 57. FIGS. 62 and 63 are perspective views of the ferrule assembly 52 assembled into the housing 20 of connector 10 of FIG. 57. FIGS. 64 and 65 are sectional views of the front end of the assembled connector 10 of FIG. 57 showing the cooperation of tapered surface 49TS configured at the front periphery of ferrule holder 49 cooperating with the tapered stop surface 20S of housing 20 at Z=0 for aligning and seating the ferrule assembly 52 during manufacturing. FIG.

66 is a sectional view of the assembled cable assembly 100 comprising the connector 10 of FIG. 57.

In this embodiment, connector 10 comprising a keying feature 20K disposed on a front portion FP of housing 20 as shown in FIG. 63. Unlike keying portion 20KP on the rear portion RP of housing 20, keying feature 20K of housing 20 has a predetermined location on the front portion FP housing 20 for aligning the form-factor of the housing with a respective mating device. For instance, the housing 20 or keying feature 20K provides a proper orientation for connection in one orientation, which may be desired for connectors having angled ferrules. In this embodiment, keying feature 20K ensures correct rotational orientation of the connector 10 during insertion and mating with another device. Keying features 20K may be used with a keying portion 20KP or not as desired.

Figure 71:
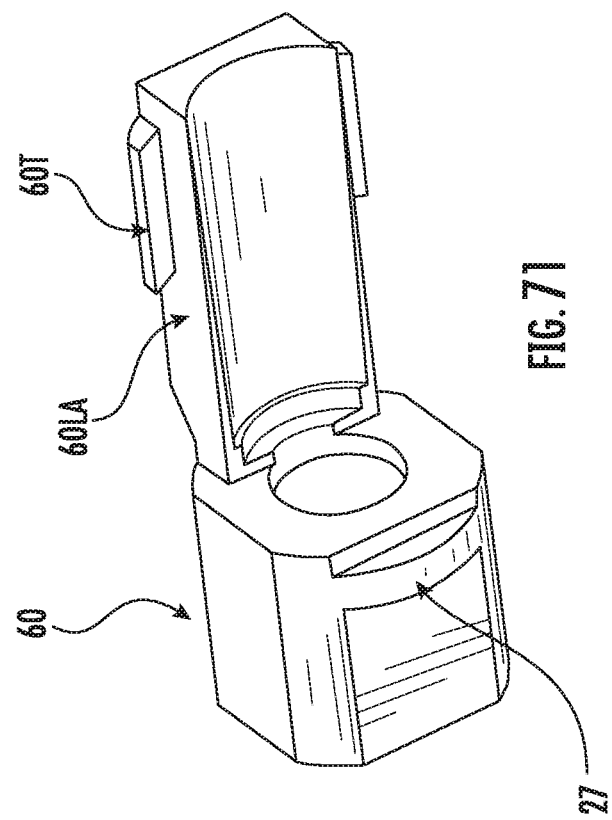
FIG. 71 is a perspective view showing details of the cap for the fiber optic connector of FIGS. 67-70.
Figure 70:
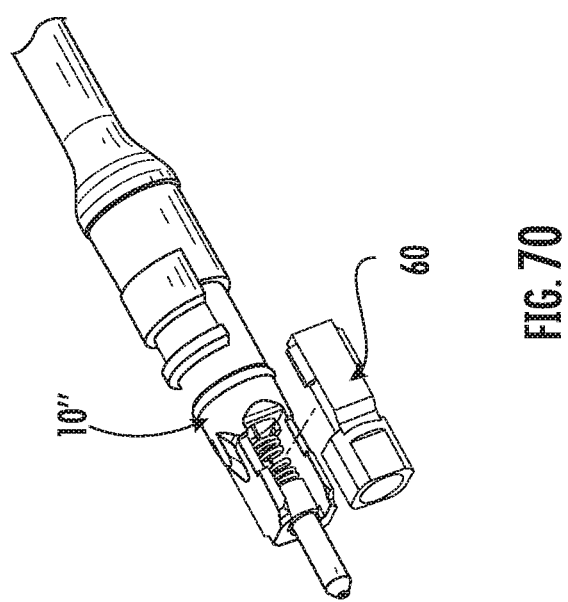

Still other variations of the concept are possible. FIGS. 67-70 are perspective views of yet another connector 10 similar to the connector 10 of FIG. 57, except it uses a a different cap 60. FIG. 71 is a perspective view showing details of cap 60 for connector 10 of FIGS. 67-70. In this embodiment, cap 60 only covers one side of the front portion FP of housing 20. As best shown in FIG. 71, cap 60 only has one latch arm 60LA that comprises tabs 60T on opposite sides for securing the cap 60 to housing 20 for covering the ferrule assembly side pocket 40.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic connector, comprising:
 a ferrule assembly comprising a ferrule comprising at least one fiber bore, a ferrule holder and a resilient member, wherein the ferrule holder comprises two alignment features disposed on a first side of ferrule holder, and a third alignment feature configured as an alignment protrusion disposed on a second side that is opposite the first side of ferrule holder;
 a housing comprising a rear end and a front end with a longitudinal passageway extending from the rear end to the front end, the housing comprising a front portion and a rear portion, wherein the front portion comprises a ferrule assembly side-loading pocket; and
 a cap, wherein the cap covers the ferrule assembly side-loading pocket when attached to the housing.

2. The fiber optic connector of claim 1, wherein the two alignment features comprises one or more tapered surfaces.

3. A fiber optic connector, comprising:
 a ferrule assembly comprising a ferrule comprising at least one fiber bore, a ferrule holder and a resilient member, wherein the ferrule holder comprises two alignment features disposed on a first side of ferrule holder, and a third alignment feature configured as an alignment protrusion disposed on a second side that is opposite the first side of ferrule holder;
 a housing comprising a rear end and a front end with a longitudinal passageway extending from the rear end to the front end, the housing comprising a front portion and a rear portion, wherein the front portion comprises a ferrule assembly side-loading pocket; and
 a cap, wherein the cap comprises at least one latch arm, and the cap covers the ferrule assembly side-loading pocket when attached to the housing.

4. The fiber optic connector of claim 3, wherein the third alignment feature is disposed in the middle of the second side of ferrule holder and is different than the alignment features disposed on the first side.

5. A fiber optic connector, comprising:
 a ferrule assembly comprising a ferrule comprising at least one fiber bore, a ferrule holder and a resilient member, wherein the ferrule holder comprises two alignment features disposed on a first side of ferrule holder, and a third alignment feature configured as an alignment protrusion disposed on a second side that is opposite the first side of ferrule holder;
 a housing comprising a rear end and a front end with a longitudinal passageway extending from the rear end to the front end, the housing comprising a front portion and a rear portion, wherein the front portion comprises a ferrule assembly side-loading pocket; and
 a cap, wherein the cap covers the ferrule assembly side-loading pocket when attached to the housing.

6. The fiber optic connector of claim 5, wherein the housing further comprises a transition region disposed between the front portion and the rear portion of the housing.

7. The fiber optic connector of claim 5, wherein housing further comprises a keying portion comprising a female key.

8. The fiber optic connector of claim 7, wherein the keying portion extends into the transition region.

9. The fiber optic connector of claim 5, wherein housing further comprises at least one locking feature.

10. The fiber optic connector of claim 5, wherein housing further comprises at least one locking feature, and a keying portion comprising a female key.

11. The fiber optic connector of claim 10, wherein the at least one locking feature is disposed about 180 degrees from the keying portion.

12. The fiber optic connector of claim 10, wherein the at least one locking feature is disposed less than 180 degrees from the keying portion.

13. The fiber optic connector of claim 5, wherein the rear portion of the housing further comprises a keying portion and at least one locking feature integrally formed in the rear portion of the housing.

14. A fiber optic connector, comprising:
 a ferrule assembly comprising a ferrule comprising at least one fiber bore, a ferrule holder and a resilient member, wherein the ferrule holder comprises asymmetric alignment features comprising two alignment features disposed on a first side of ferrule holder, and a third alignment feature configured as an alignment protrusion disposed on a second side that is opposite the first side of ferrule holder;
 a housing comprising a rear end and a front end with a longitudinal passageway extending from the rear end to the front end, the housing comprising a front portion, a rear portion and a transition region disposed between the front portion and the rear portion of the housing, wherein the front portion comprises a ferrule assembly side-loading pocket, and the rear portion of the housing comprises a keying portion that extends into a portion of the transition region, and at least one locking feature integrally formed in the rear portion of the housing, and the at least one locking feature is disposed about 180 degrees from the keying portion; and a cap, wherein the cap covers the ferrule assembly side-loading pocket when attached to the housing.

15. A fiber optic connector, comprising:

a ferrule assembly comprising a ferrule comprising at least one fiber bore, a ferrule holder and a resilient member, wherein the ferrule holder comprises asymmetric alignment features, wherein the asymmetric alignment features comprise two alignment features having respective tapered surfaces disposed on a first side of ferrule holder, and a third alignment feature configured as an alignment protrusion disposed on a second side that is opposite the first side of ferrule holder;

a housing comprising a rear end and a front end with a longitudinal passageway extending from the rear end to the front end, the housing comprising a front portion, a rear portion and transition region disposed between the front portion and the rear portion of the housing, the front portion of the housing comprising a ferrule assembly side-loading pocket, and wherein the rear portion of the housing comprises a female key that extends into a portion of the transition region, and at least one locking feature integrally formed in the rear portion of the housing, and wherein the at least one locking feature is disposed about 180 degrees from the female key; and a cap, wherein the cap covers the ferrule assembly side-loading pocket when attached to the housing.

16. The fiber optic connector of claim 15, wherein the third alignment feature is disposed in the middle of the second side of ferrule holder and is different than the alignment features disposed on the first side.

17. The fiber optic connector of claim 15, wherein the ferrule assembly is configured to cooperate with the housing for inhibiting the rotation of the ferrule subassembly with respect to the housing at Z=0.

18. The fiber optic connector of claim 15, wherein housing comprises an open passageway to the longitudinal passageway of the housing.

19. The fiber optic connector of claim 15, wherein the housing comprises one or more apertures.

20. The fiber optic connector of claim 15, wherein the at least one locking feature is a ramp comprising a ledge.

21. The fiber optic connector of claim 15, wherein the at least one locking feature is a notch, a groove, a shoulder or a scallop.

22. The fiber optic connector of claim 20, wherein the at least one locking feature provides a predetermined retention force of 50 pounds or more.

23. The fiber optic connector of claim 15, wherein a part of the rear portion of the housing comprises a round cross-section and a part of the front portion of the housing comprises a non-round cross-section.

24. The fiber optic connector of claim 15, further comprising a male key.

25. The fiber optic connector of claim 15, wherein the front portion of housing comprises another cross-section portion.

26. The fiber optic connector of claim 25, wherein the another cross-section portion comprises a SC footprint or a SC compatible footprint.

27. The fiber optic connector of claim 15, further comprising a cable adapter.

28. The fiber optic connector of claim 27, wherein an opening at the rear end of the housing is sized for receiving a portion of a cable assembly.

29. The fiber optic connector of claim 15, further comprising an O-ring.

30. The fiber optic connector of claim 29, wherein the O-ring is disposed rearward of the at least one locking feature.

31. The fiber optic connector of claim 15, further comprising a dust cap.

32. The fiber optic connector of claim 15, further comprising a conversion housing, wherein the conversion housing cooperates with the housing for changing the fiber optic connector from the first connector footprint to a second connector footprint.

33. The fiber optic connector of claim 32, wherein the second footprint comprises a hardened connector footprint.

34. The fiber optic connector of claim 32, wherein the changing from the first connector footprint to the second connector footprint comprises a single component.

35. The fiber optic connector of claim 32, wherein the changing from the first connector footprint to the second connector footprint comprises a plurality of components.

36. The fiber optic connector of claim 32, wherein the second connector footprint is a SC connector footprint or a SC compatible connector footprint.

37. The fiber optic connector of claim 32, wherein the changing from the first connector footprint to the second connector footprint comprises a shroud, a retaining member, and a coupling nut.

38. The fiber optic connector of claim 32, the second connector footprint is an OptiTap® compatible footprint.

39. The fiber optic connector of claim 27, wherein the retaining member is a retaining clip.

40. The fiber optic connector of claim 15 being a portion of a cable assembly.

41. The fiber optic connector of claim 15 being a portion of a distribution cable.

42. The fiber optic connector of claim 15, further comprising a fiber optic cable comprising at least one strength element, the at least one strength element of the fiber optic cable being attached to a portion of the fiber optic connector.

43. A fiber optic cable assembly, comprising:

a ferrule assembly comprising a ferrule comprising at least one fiber bore, a ferrule holder and a resilient member, wherein the ferrule holder comprises asymmetric alignment features, wherein the asymmetric alignment features comprise two alignment features having respective tapered surfaces disposed on a first side of ferrule holder, and a third alignment feature configured as an alignment protrusion disposed on a second side that is opposite the first side of ferrule holder;

a housing comprising a rear end and a front end with a longitudinal passageway extending from the rear end to the front end, the housing comprising a front portion, a rear portion and transition region disposed between the front portion and the rear portion of the housing, wherein the front portion of the housing comprising a ferrule assembly side-loading pocket, and wherein the rear portion of the housing comprises a female key that extends into a portion of the transition region, and at least one locking feature integrally formed in the rear portion of the housing, and the at least one locking feature is disposed about 180 degrees from the female key;

a cap covers the ferrule assembly side-loading pocket when attached to the housing;

a cable adapter sized for fitting into the rear opening of the housing; and a cable comprising an optical fiber, and the cable being attached to the cable adapter.

\* \* \* \* \*